(12) United States Patent
Shimizu et al.

(10) Patent No.: US 12,522,593 B2
(45) Date of Patent: Jan. 13, 2026

(54) AZACYCLOALKYL CARBONYL CYCLIC AMINE COMPOUND

(71) Applicants: Alivexis, Inc., Tokyo (JP); Astellas Pharma Inc., Tokyo (JP)

(72) Inventors: Takafumi Shimizu, Tokyo (JP); Yoh Terada, Tokyo (JP); Takeo Urakami, Tokyo (JP); William Sinko, Delaware, CA (US); Jun Maeda, Tokyo (JP); Tsubasa Watanabe, Tokyo (JP); Hiroaki Yamagishi, Tokyo (JP)

(73) Assignees: Alivexis, Inc., Tokyo (JP); Astellas Pharma Inc., Tokyo (JP)

( * ) Notice: Subject to any disclaimer, the term of this patent is extended or adjusted under 35 U.S.C. 154(b) by 0 days.

(21) Appl. No.: 18/970,835

(22) Filed: Dec. 5, 2024

(65) Prior Publication Data

US 2025/0163041 A1 May 22, 2025

Related U.S. Application Data

(63) Continuation of application No. PCT/JP2023/021735, filed on Jun. 12, 2023.

(60) Provisional application No. 63/410,421, filed on Sep. 27, 2022, provisional application No. 63/351,580, filed on Jun. 13, 2022.

(51) Int. Cl.

| | | |
|---|---|---|
| C07D 413/14 | (2006.01) |
| A61K 31/438 | (2006.01) |
| A61K 31/4545 | (2006.01) |
| A61K 31/506 | (2006.01) |
| A61K 31/5377 | (2006.01) |
| A61K 31/5386 | (2006.01) |
| C07D 401/14 | (2006.01) |
| C07D 417/14 | (2006.01) |
| C07D 491/044 | (2006.01) |

(52) U.S. Cl.
CPC ........ *C07D 413/14* (2013.01); *A61K 31/4545* (2013.01); *A61K 31/506* (2013.01); *A61K 31/5377* (2013.01); *C07D 401/14* (2013.01); *C07D 417/14* (2013.01); *C07D 491/044* (2013.01)

(58) Field of Classification Search
CPC ............ C07D 413/14; C07D 401/14; C07D 417/14; C07D 491/044; A61K 31/4545; A61K 31/506; A61K 31/5377; A61K 31/438; A61K 31/5386
USPC ....................................................... 514/210
See application file for complete search history.

(56) References Cited

U.S. PATENT DOCUMENTS

| | | | |
|---|---|---|---|
| 11,970,486 B2 * | 4/2024 | Le Bourdonnec ...... A61P 25/00 |
| 2011/0319412 A1 | 12/2011 | Sakagami et al. |
| 2021/0186984 A1 | 6/2021 | Dipetrillo et al. |

FOREIGN PATENT DOCUMENTS

| | | |
|---|---|---|
| JP | 2001-302633 A | 10/2001 |
| JP | 2017-526716 A | 9/2017 |
| JP | 2019-512547 A | 5/2019 |
| JP | 2019-519575 A | 7/2019 |
| JP | 2021-530470 A | 11/2021 |
| WO | WO 01/25200 A1 | 4/2001 |
| WO | WO 2004/096139 A2 | 11/2004 |
| WO | WO 2007/039781 A2 | 4/2007 |
| WO | WO 2007/039782 A1 | 4/2007 |
| WO | WO 2008/016676 A2 | 2/2008 |
| WO | WO 2008/145681 A2 | 12/2008 |
| WO | WO 2010/013037 A1 | 2/2010 |
| WO | WO 2010/101246 A1 | 9/2010 |
| WO | WO 2010/106081 A1 | 9/2010 |

(Continued)

OTHER PUBLICATIONS

Banerjee, A. et al. "Development of Potent and Selective Cathepsin C Inhibitors Free of Aortic Binding Liability by Application of a Conformational Restriction Strategy." Bioorganic & Medicinal Chemistry Letters, vol. 47, Sep. 1, 2021, pp. 1-7.

(Continued)

*Primary Examiner* — Jared Barsky
*Assistant Examiner* — Liyuan Mou
(74) *Attorney, Agent, or Firm* — FENWICK & WEST LLP

(57) ABSTRACT

Provided is an azacycloalkylcarbonyl cyclic amine compound which is useful as an active ingredient in a pharmaceutical composition for a treatment of a neutrophil associated inflammatory disease. The azacycloalkylcarbonyl cyclic amine compound of the present invention is a compound of Formula (I) or a salt thereof.

[Chem. 1]

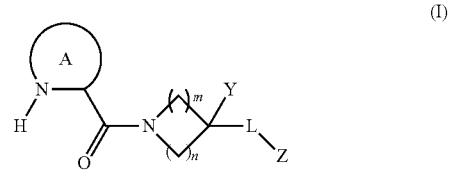

(I)

(in the formula, Ring A represents azacycloalkyl which may have a substituent and may be spiro-fused; Y represents alkyl which may have a substituent, cycloalkyl which may have a substituent, or the like; L represents a nitrogen-containing aromatic heterocycle or the like; Z represents cycloalkyl which may have a substituent, an aromatic hydrocarbon ring which may have a substituent, a non-aromatic (Continued)

heterocycle which may have a substituent, or the like; and m and n each independently represent an integer of 1 or 2.)

30 Claims, No Drawings

(56) References Cited

FOREIGN PATENT DOCUMENTS

| WO | WO 2011/031934 A1 | 3/2011 |
|---|---|---|
| WO | WO 2011/075634 A1 | 6/2011 |
| WO | WO 2011/112685 A1 | 9/2011 |
| WO | WO 2012/109415 A1 | 8/2012 |
| WO | WO 2014/091443 A1 | 6/2014 |
| WO | WO 2014/127350 A1 | 8/2014 |
| WO | WO 2014/140075 A1 | 9/2014 |
| WO | WO 2015/032943 A1 | 3/2015 |
| WO | WO 2015/110826 A1 | 7/2015 |
| WO | WO 2015/175855 A1 | 11/2015 |
| WO | WO 2016/038007 A1 | 3/2016 |
| WO | WO 2017/158616 A1 | 9/2017 |
| WO | WO 2018/002848 A1 | 1/2018 |
| WO | WO 2018/081167 A1 | 5/2018 |
| WO | WO 2019/018795 A1 | 1/2019 |
| WO | WO 2019/084157 A1 | 5/2019 |
| WO | WO 2019/209948 A1 | 10/2019 |
| WO | WO 2020/001392 A1 | 1/2020 |
| WO | WO 2022/224180 A1 | 10/2022 |

OTHER PUBLICATIONS

Chalmers, J. D. et al. "Dipeptidyl Peptidase 1 Inhibition as a Potential Therapeutic Approach in Neutrophil-Mediated Inflammatory Disease." Frontiers in Immunology, vol. 14, Dec. 14, 2023, pp. 1-17.

Chen, X. et al. "Discovery and In Vivo Anti-Inflammatory Activity Evaluation of a Novel Non-peptidyl Non-covalent Cathepsin C Inhibitor." Journal of Medicinal Chemistry, vol. 64, No. 16, Aug. 10, 2021, pp. 11857-11885.

Chen, X. et al. "Identification of Novel Indolinone Derivatives as CTSC Inhibitors to Treat Inflammatory Bowel Disease by Modulating Inflammatory Factors." European Journal of Medicinal Chemistry, vol. 280, Dec. 15, 2024, pp. 1-26.

Chen, X. et al. "Non-peptidyl Non-covalent Cathepsin C InhibitoEEr Bearing a Unique Thiophene-Substituted Pyridine: Design, Structure-Activity Relationship and Anti-Inflammatory Activity In Vivo." European Journal of Medicinal Chemistry, vol. 236, Jun. 5, 2022, pp. 1-20.

Database STN Registry. "RN:1587779-28-9." Apr. 21, 2014, pp. 1.
Database STN Registry. "RN:1590540-90-1." Apr. 25, 2014, pp. 1.
Database STN Registry. "RN:2036778-47-7." Nov. 24, 2016, pp. 1.
Database STN Registry. "RN:2037252-30-3." Nov. 24, 2016, pp. 1.

Docevska, M. et al. "Cathepsin C: Structure, Function, and Pharmacological Targeting." Rare Disease and Orphan Drugs Journal, vol. 2, No. 14, Jul. 26, 2023, pp. 1-17.

Doyle, K. et al. "Discovery of Second Generation Reversible Covalent DPP1 Inhibitors Leading to an Oxazepane Amidoacetonitrile Based Clinical Candidate (AZD7986)." Journal of Medicinal Chemistry, vol. 59, No. 20, Oct. 2, 2016, pp. 9457-9472.

Furber, M. et al. "Cathepsin C Inhibitors: Property Optimization and Identification of a Clinical Candidate." Journal of Medicinal Chemistry, vol. 57, No. 6, Mar. 4, 2014, pp. 2357-2367.

Guarino, C. et al. "Prolonged Pharmacological Inhibition of Cathepsin C Results in Elimination of Neutrophil Serine Proteases." Biochemical Pharmacology, vol. 131, May 1, 2017, pp. 52-67.

Guay, D. et al. "Design and Synthesis of Dipeptidyl Nitriles as Potent, Selective, and Reversible Inhibitors of Cathepsin C." Bioorganic & Medicinal Chemistry Letters, vol. 19, No. 18, Sep. 15, 2009, pp. 5392-5396.

Huang, L-L. et al. "3D-QSAR, Molecular Docking and Molecular Dynamics Simulations of Oxazepane Amidoacetonitrile Derivatives as Novel DPPI Inhibitors." Journal of Molecular Structure, vol. 1168, Sep. 15, 2018, pp. 223-233.

Käck, H. et al. "DPP1 Inhibitors: Exploring the Role of Water in the S2 Pocket of DPP1 with Substituted Pyrrolidines." ACS Medicinal Chemistry Letters, vol. 10, No. 8, Jul. 15, 2019, pp. 1222-1227.

Korkmaz, B. et al. "Lung Protection by Cathepsin C Inhibition: A New Hope for COVID-19 and ARDS?" Journal of Medicinal Chemistry, vol. 63, No. 22, Jul. 21, 2020, pp. 13258-13265.

Korkmaz, B. et al. "Structure-Based Design and In Vivo Anti-Arthritic Activity Evaluation of a Potent Dipeptidyl Cyclopropyl Nitrile Inhibitor of Cathepsin C." Biochemical Pharmacology, vol. 164, Jun. 2019, pp. 349-367.

Korkmaz, B. et al. "Therapeutic Targeting of Cathepsin C: from Pathophysiology to Treatment." Pharmacology & Therapeutics, vol. 190, Oct. 2018, pp. 202-236.

Lainé, D. et al. "Discovery of Novel Cyanamide-Based Inhibitors of Cathepsin C." ACS Medicinal Chemistry Letters, vol. 2, No. 2, Nov. 10, 2010, pp. 142-147.

Nishibata, Y. et al. "Cathepsin C Inhibition Reduces Neutrophil Serine Protease Activity and Improves Activated Neutrophil-Mediated Disorders." Nature Communications, vol. 15, Aug. 22, 2024, pp. 1-14.

PCT International Search Report, PCT Application No. PCT/JP2023/021735, Aug. 22, 2023, eight pages.

Tromsdorf, N. et al. "E-64c-Hydrazide Based Cathepsin C Inhibitors: Optimizing the Interactions with the S1'-S2' Area." ChemMedChem, vol. 18, No. 18, Sep. 15, 2023, pp. 1-8.

Yao, W. et al. "Discovery of a Potent, Selective, and Orally Active Human Epidermal Growth Factor. Receptor-2 Sheddase Inhibitor for the Treatment of Cancer." Journal of Medicinal Chemistry, vol. 50, No. 4, Jan. 26, 2007, pp. 603-606.

\* cited by examiner

AZACYCLOALKYL CARBONYL CYCLIC AMINE COMPOUND

TECHNICAL FIELD

The present invention relates to an azacycloalkylcarbonyl cyclic amine compound which is useful as an active ingredient in a pharmaceutical composition, for example, a pharmaceutical composition for a treatment of a neutrophil associated inflammatory disease.

Priority is claimed on United States Provisional Patent Application No. U.S. 63/351,580, filed with the United States Patent and Trademark Office Jun. 13, 2022, and U.S. Provisional Patent Application No. 63/410,421 filed with the United States Patent and Trademark Office Sep. 27, 2022, the contents of which are incorporated herein by reference.

BACKGROUND ART

Cathepsin C (CTSC), which is also known as dipeptidyl peptidase 1 (DPP1; EC 3.4.14.1), is a lysosomal cysteine exopeptidase that functions as a tetramer consisting of four identical subunits belonging to the papain family.

CTSC is constitutively expressed in many tissues, and particularly, is most prominently expressed in lungs, placenta, spleen, and kidneys. It is considered that CTSC is a major intracellular processing enzyme which cleaves two residues from N-terminal of proteins and peptides, and it is suggested that CTSC is an essential enzyme for an activation of granule serine proteases in neutrophil elastase (NE), cathepsin G (CTSG), proteinase 3 (PR3), neutrophil serine protease 4 (NSP4), mast cells (chymase and tryptase), and cytotoxic T lymphocytes and natural killer cells (granzymes A and B).

Neutrophils are produced in a bone marrow, are released to a periphery after maturation, and exhibit migration to inflammatory cytokines, bacteria, and fungal components, and with powerful antibacterial functions such as accumulation, phagocytosis, degranulation, and neutrophil extracellular traps (NET) in inflamed areas, the neutrophils play a major role in a defense mechanism in infectious diseases. In this case, the neutrophil serine proteases (NE, CTSG, PR3, and NSP4) play an important role in the antibacterial function of the neutrophils due to their proteolytic activity, but on the other hand, it is also known that an excessive release of proteases to an outside of a cell accompanying the activation of the neutrophils causes a destruction of living tissues in addition to the original role of the bactericidal action. In particular, it is known that an excessive degradation of extracellular matrix such as collagen, fibronectin, and laminin due to the overexpression of NE is involved in pathogenesis of various inflammatory diseases (for example, bronchiectasis, cystic fibrosis, acute respiratory distress syndrome, bronchitis, emphysema, and the like).

From pathophysiological functions of the granule serine proteases reported so far, it is considered that CTSC, which is a major enzyme controlling them, is a therapeutic target for the neutrophil associated inflammatory disease.

As a compound having the CTSC inhibitory effect, for example, compounds disclosed in Patent Documents 1 to 6 and Non-Patent Document 1 have been known.

CITATION LIST

Patent Documents

[Patent Document 1] PCT International Publication No. WO2011/112685

[Patent Document 2] PCT International Publication No. WO2011/075634

[Patent Document 3] PCT International Publication No. WO2015/110826

[Patent Document 4] PCT International Publication No. WO2012/109415

[Patent Document 5] PCT International Publication No. WO2015/032943

[Patent Document 6] PCT International Publication No. WO2014/140075

[Non-Patent Document 1] Pharmacology & Therapeutics, 2018, vol. 190, pp. 202 to 236

SUMMARY OF INVENTION

Technical Problem

An object of the present invention is to provide an azacycloalkylcarbonyl cyclic amine compound having a CTSC inhibitory effect, which is useful as an active ingredient in a pharmaceutical composition for a treatment of a neutrophil associated inflammatory disease.

Solution to Problem

The present invention has the following aspects.
[1] A compound of Formula (I) or a salt thereof,

[Chem. 1]

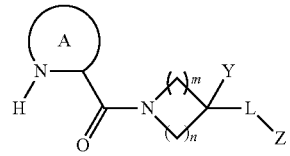

(1)

(in the formula,
Ring A represents azacycloalkyl which may have a substituent and may be spiro-fused with $C_{3-6}$ cycloalkyl or a saturated heterocycle having 3 to 6 ring members;
Y represents hydrogen, alkyl which may have a substituent, $C_{3-6}$ cycloalkyl which may have a substituent, an aromatic hydrocarbon ring which may have a substituent, a non-aromatic heterocycle which may have a substituent, an aromatic heterocycle which may have a substituent, or —N($R^{Y1}$)—$R^{Y2}$;
one of $R^{Y1}$ and $R^{Y2}$ represents $C_{1-4}$ alkyl which may have a substituent, and the other represents $C_{1-4}$ alkyl which may have a substituent, —C(=O)—($C_{1-4}$ alkyl), or —S(=O)$_2$—($C_{1-4}$ alkyl);
L represents a nitrogen-containing aromatic heterocycle which may have a substituent, a nitrogen-containing aromatic heterocycle-($C_{1-2}$ alkylene) which may have a substituent, —C(=O)—N($R^{L1}$)—, —C(=O)—N($R^{L1}$)—($C_{1-2}$ alkylene), —C(=O)—, or a nitrogen-containing aromatic heterocycle-C(=O)— which may have a substituent;
$R^{L1}$ represents hydrogen, or $C_{1-4}$ alkyl which may have a substituent;
Z represents cycloalkyl which may have a substituent, an aromatic hydrocarbon ring which may have a substituent, a non-aromatic heterocycle which may have a substituent, an aromatic heterocycle which may have a substituent, or —O-(alkyl which may have substituent), in which in a case where L is —C(=O)— or a nitrogen-containing aromatic heterocycle-C(=O)— which may have a substituent, Z represents cyclic amino which may have a substituent; and m and n each independently represent an integer of 1 or 2).

[2] The compound according to [1] or the salt thereof, wherein the Ring A is piperidinyl which may have a substituent and may be spiro-fused with $C_{3-6}$ cycloalkyl or a saturated heterocycle having 3 to 6 ring members.

[3] The compound according to [2] or the salt thereof, wherein the Ring A is 9-hydroxy-6-azaspiro[3.5]nonan-7-yl which may have a substituent, 4-hydroxy-5,5-dimethylpiperidin-2-yl which may have a substituent, or 1-oxa-6-azaspiro[3.5]nonan-7-yl which may have a substituent.

[4] The compound according to [3] or the salt thereof, wherein the Ring A is (7S,9R)-9-hydroxy-6-azaspiro[3.5]nonan-7-yl, (2S,4R)-4-hydroxy-5,5-dimethylpiperidin-2-yl, or (4R,7S)-1-oxa-6-azaspiro[3.5]nonan-7-yl.

[5] The compound according to any one of [1] to [4] or the salt thereof, wherein m is 2 and n is 2.

[6] The compound according to any one of [1] to [5] or the salt thereof, wherein L is a nitrogen-containing aromatic heterocycle which may have a substituent.

[7] The compound according to [6] or the salt thereof, wherein L is 1,2,4-oxadiazole or tetrazole.

[8] The compound according to any one of [1] to [7] or the salt thereof, wherein Y is alkyl which may have a substituent or $C_{3-6}$ cycloalkyl which may have a substituent.

[9] The compound according to any one of [1] to [8] or the salt thereof, wherein Z is cycloalkyl which may have a substituent or a non-aromatic heterocycle which may have a substituent.

[10] The compound according to [9] or the salt thereof, wherein Z is cyclobutyl, cyclohexyl, or tetrahydropyranyl, each of which is substituted with 2 or 3 substituents selected from the group consisting of fluoro and methyl.

[11] The compound according to any one of [1] to [7] or the salt thereof, wherein Y is hydrogen.

[12] The compound according to [11] or the salt thereof, wherein Z is phenyl which may be substituted with 1 to 3 substituents selected from the group consisting of fluoro, methyl, and trifluoromethyl.

[13] The compound according to [1] or the salt thereof, which is a compound of Formula (Ia) or a salt thereof or a compound of Formula (Ib) or a salt thereof,

[Chem. 2]

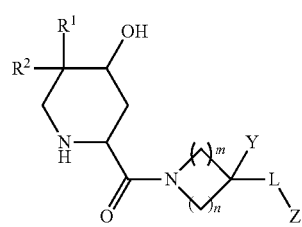

(Ia)

[Chem. 3]

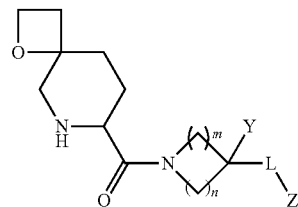

(Ib)

(in Formula (Ia) and Formula (Ib), $R^1$ and $R^2$ each represent methyl, or $R^1$ and $R^2$ together with a carbon atom adjacent thereto form cyclobutane:

[Chem. 4]

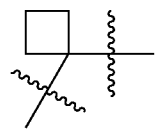

(in the formula, a wavy line represents a bonding point with a remaining portion of a molecule);

Y represents hydrogen, $C_{1-4}$ alkyl which may have a substituent, $C_{3-6}$ cycloalkyl which may have a substituent, an aromatic hydrocarbon ring which may have a substituent, a non-aromatic heterocycle which may have a substituent, or an aromatic heterocycle which may have a substituent;

L represents a nitrogen-containing aromatic heterocycle which may have a substituent, a nitrogen-containing aromatic heterocycle-($C_{1-2}$ alkylene) which may have a substituent, —C(=O)—N($R^{L1}$)—, —C(=O)—N($R^{L1}$)—($C_{1-2}$ alkylene), —C(=O)—, or a nitrogen-containing aromatic heterocycle-C(=O)— which may have a substituent;

$R^{L1}$ represents hydrogen, or $C_{1-4}$ alkyl which may have a substituent;

Z represents $C_{3-6}$ cycloalkyl which may have a substituent, an aromatic hydrocarbon ring which may have a substituent, a non-aromatic heterocycle which may have a substituent, an aromatic heterocycle which may have a substituent, or —O-(alkyl which may have substituent), in which in a case where L is —C(=O)— or a nitrogen-containing aromatic heterocycle-C(=O)— which may have a substituent, Z represents cyclic amino which may have a substituent; and m and n each independently represent an integer of 1 or 2).

[14] The compound according to [1] or the salt thereof, which is a compound of Formula (Iaa) or a salt thereof or a compound of Formula (Ibb) or a salt thereof,

[Chem. 5]

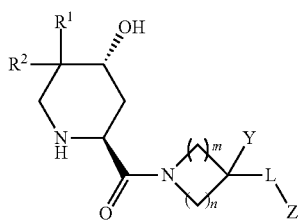

(Iaa)

[Chem. 6]

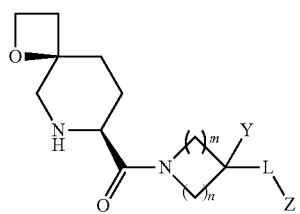

(Ibb)

(in Formula (Iaa) and Formula (Ibb), $R^1$ and $R^2$ each represent methyl, or $R^1$ and $R^2$ together with a carbon atom adjacent thereto form cyclobutane:

[Chem. 7]

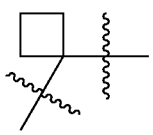

(in the formula, a wavy line represents a bonding point with a remaining portion of a molecule);

Y represents hydrogen, $C_{1-4}$ alkyl which may have a substituent, $C_{3-6}$ cycloalkyl which may have a substituent, an aromatic hydrocarbon ring which may have a substituent, a non-aromatic heterocycle which may have a substituent, or an aromatic heterocycle which may have a substituent;

L represents a nitrogen-containing aromatic heterocycle which may have a substituent, a nitrogen-containing aromatic heterocycle-($C_{1-2}$ alkylene) which may have a substituent, —C(=O)—N($R^{L1}$)—, —C(=O)—N($R^{L1}$)—($C_{1-2}$ alkylene), —C(=O)—, or a nitrogen-containing aromatic heterocycle-C(=O)— which may have a substituent;

$R^{L1}$ represents hydrogen, or $C_{1-4}$ alkyl which may have a substituent;

Z represents $C_{3-6}$ cycloalkyl which may have a substituent, an aromatic hydrocarbon ring which may have a substituent, a non-aromatic heterocycle which may have a substituent, an aromatic heterocycle which may have a substituent, or —O-(alkyl which may have substituent), in which in a case where L is —C(=O)— or a nitrogen-containing aromatic heterocycle-C(=O)— which may have a substituent, Z represents cyclic amino which may have a substituent; and m and n each independently represent an integer of 1 or 2).

[15] The compound according to [13] or [14] or the salt thereof,
wherein Y is hydrogen, $C_{1-4}$ alkyl which may be substituted with 1 to 5 halogens, or $C_{3-6}$ cycloalkyl; L is a nitrogen-containing aromatic heterocycle which may have a substituent, or a nitrogen-containing aromatic heterocycle-($C_{1-2}$ alkylene) which may have a substituent; and Z is $C_{3-6}$ cycloalkyl which may have a substituent, phenyl which may have a substituent, a non-aromatic heterocycle which may have a substituent, or an aromatic heterocycle which may have a substituent.

[16] The compound according to [13] or [14] or the salt thereof,
wherein Y is hydrogen, $C_{1-4}$ alkyl which may be substituted with 1 to 5 halogens, or $C_{3-6}$ cycloalkyl; L is a nitrogen-containing aromatic heterocycle or a nitrogen-containing aromatic heterocycle-($C_{1-2}$ alkylene); and Z is $C_{3-6}$ cycloalkyl, phenyl, a non-aromatic heterocycle, or an aromatic heterocycle, where the $C_{3-6}$ cycloalkyl, the phenyl, the non-aromatic heterocycle, and the aromatic heterocycle in Z may be each substituted with one or more substituents selected from the group consisting of halogen, —OH, amino, cyano, nitro, —C(=O)—($C_{1-4}$ alkyl), —C(=O)—OH, —C(=O)—O—($C_{1-4}$ alkyl), —C(=O)-amino, $C_{1-4}$ alkyl which may be substituted with halogen, and —O—($C_{1-4}$ alkyl which may be substituted with halogen).

[17] The compound according to [16] or the salt thereof,
wherein L is pyrrole, pyrazole, imidazole, 1,3-oxazole, 1,3-thiazole, 1,2,4-oxadiazole, 1,3,4-oxadiazole, 1,2,4-thiadiazole, 1,3,4-thiadiazole, 1,2,3-triazole, 1,2,4-triazole, tetrazole, pyridine, pyridazine, pyrimidine, or pyrazine.

[18] A pharmaceutical composition comprising the compound according to any one of [1] to [17] or the salt thereof, and a pharmaceutically acceptable excipient.

[19] The pharmaceutical composition according to [18], which is a pharmaceutical composition for a treatment of a neutrophil associated inflammatory disease.

[20] Use of the compound according to any one of [1] to [17] or the salt thereof for manufacturing a pharmaceutical composition for a treatment of a neutrophil associated inflammatory disease.

[21] Use of the compound according to any one of [1] to [17] or the salt thereof for a treatment of a neutrophil associated inflammatory disease.

[22] The compound according to any one of [1] to [17] or the salt thereof for a treatment of a neutrophil associated inflammatory disease.

[23] A method for treating a neutrophil associated inflammatory disease comprising administering an effective amount of the compound according to any one of [1] to [17] or the salt thereof to a subject.

The "subject" is a human or other animal in need of treatment, and in one aspect, a human in need of treatment.

In the present specification, unless otherwise specified, in a case where a symbol in one chemical formula is also used in other chemical formulae, the same symbol has the same meaning.

Advantageous Effects of Invention

The azacycloalkylcarbonyl cyclic amine compound or the salt thereof according to the embodiment of the present invention (also simply referred to as an "azacycloalkylcarbonyl cyclic amine compound according to the embodiment of the present invention" or each of a "compound of Formula (I)", a "compound of Formula (Ia)", a "compound of Formula (Ib)", a "compound of Formula (Iaa)", and a "compound of Formula (Ibb)"; in addition, the azacycloalkylcarbonyl cyclic amine compound according to the embodiment the present invention includes each of the compound of Formula (I), the compound of Formula (Ia), the compound of Formula (Ib), the compound of Formula (Iaa), and the compound of Formula (Ibb)) has a CTSC inhibitory effect, and can be used as an active ingredient of a pharmaceutical composition for a treatment of a neutrophil associated inflammatory disease, which includes gastrointestinal inflammatory disease, glomerulonephritis, chronic obstructive pulmonary disease (COPD), bronchiectasis, rheumatoid arthritis, multiple sclerosis, anti-neutrophil cytoplasmic antibody (ANCA)-related vasculitis, and the like.

DESCRIPTION OF EMBODIMENTS

In the present specification, "may have a substituent" means that it is unsubstituted or has one or more substituents. In a case of having a substituent, as long as it is acceptable as a chemical structure, it may have a plurality of substituents. In a case of having a plurality of substituents, the respective substituents may be the same or different from each other.

In a group described as "which may have a substituent" other than alkyl which may have a substituent, examples of an allowable substituent include groups shown in the following S1 group. In the following description of the S1 group, "$C_{1-4}$ alkyl" may be substituted with 1 to 5 groups selected from the group consisting of a fluoro, —OH, —O—($C_{1-4}$ alkyl), and amino.

The S1 group is a group consisting of
(1) halogen,
(2) —OH, —O—($C_{1-4}$ alkyl), —O—($C_{3-6}$ cycloalkyl), —O—C(=O)—($C_{1-4}$ alkyl), —O—C(=O)—($C_{3-6}$ cycloalkyl), oxo(=O), —SH, —S—($C_{1-4}$ alkyl), and —S(=O)$_2$—($C_{1-4}$ alkyl),
(3) amino, cyano, and nitro,
(4) —C(=O)—($C_{1-4}$ alkyl), —C(=O)—OH, —C(=O)—O—($C_{1-4}$ alkyl), and —C(=O)-amino,
(5) an aromatic hydrocarbon ring which may be substituted with 1 to 3 substituents selected from halogen, —OH, —O—($C_{1-4}$ alkyl), and $C_{1-4}$ alkyl,
(6) $C_{3-6}$ cycloalkyl which may be substituted with 1 to 3 substituents selected from halogen, —OH, —O—($C_{1-4}$ alkyl), and $C_{1-4}$ alkyl,
(7) an aromatic heterocycle which may be substituted with 1 to 3 substituents selected from halogen, —OH, —O—($C_{1-4}$ alkyl), and $C_{1-4}$ alkyl,
(8) a non-aromatic heterocycle which may be substituted with 1 to 3 substituents selected from halogen, —OH, —O—($C_{1-4}$ alkyl), and $C_{1-4}$ alkyl, and
(9) $C_{1-4}$ alkyl and —O—($C_{1-4}$ alkyl) which may be substituted with 1 to 5 groups selected from the group consisting of the above-described groups of (1) to (8).

Examples of an allowable substituent in the alkyl which may have a substituent include the groups described in (1) to (8) mentioned in the S1 group.

In the present specification, the "alkyl" includes linear alkyls and branched alkyls of $C_{1-10}$.

Examples of the $C_{1-4}$ alkyl include methyl, ethyl, n-propyl, isopropyl, n-butyl, sec-butyl, and tert-butyl, and one aspect is methyl or ethyl and another aspect is methyl.

The "cycloalkyl" is $C_{3-10}$ cycloalkyl, and may have a crosslinked structure. Examples of the cycloalkyl include cyclopropyl, cyclobutyl, cyclopentyl, cyclohexyl, cycloheptyl, cyclooctyl, bicyclo[1.1.1]pentyl, bicyclo[2.2.1]heptyl, bicyclo[4.1.0]heptyl, bicyclo[2.2.2]octyl, bicyclo[3.2.1]octyl, and bicyclo[4.3.1]nonyl, and one aspect is cyclopropyl, cyclobutyl, cyclopentyl, cyclohexyl, cycloheptyl, cyclooctyl, or bicyclo[1.1.1]pentyl and another aspect is cyclopropyl, cyclobutyl, cyclopentyl, cyclohexyl, cycloheptyl, or cyclooctyl.

Examples of the $C_{3-6}$ cycloalkyl include cyclopropyl, cyclobutyl, cyclopentyl, and cyclohexyl, and one aspect is cyclopropyl or cyclobutyl.

The "azacycloalkyl" is cycloalkyl in which at least one carbon atom forming a ring structure of the cycloalkyl is replaced with a nitrogen atom. Examples of the azacycloalkyl include azetidinyl, pyrrolidinyl, piperidinyl, azepanyl, azabicyclo[2.2.1]heptyl, and azabicyclo[2.2.2]octyl, and one aspect is piperidinyl.

The "aromatic hydrocarbon ring" is an aromatic hydrocarbon ring of $C_{6-14}$. One aspect of a monovalent group of the aromatic hydrocarbon ring is phenyl or naphthyl, and another aspect thereof is phenyl.

The "non-aromatic heterocycle" is a monocyclic or bicyclic non-aromatic heterocycle having 3 to 10 ring members, which has 1 to 4 identical or different heteroatoms selected from the group consisting of nitrogen, oxygen, and sulfur. Some of bonds constituting the non-aromatic heterocycle may be an unsaturated bond. A part of the bicyclic non-aromatic heterocycle may have aromaticity. Examples thereof include an aspect in which a monocyclic non-aromatic heterocycle having 5 or 6 ring members is fused with a benzene ring, a pyrrole ring, a furan ring, a thiophene ring, a pyrazole ring, an imidazole ring, an oxazole ring, a thiazole ring, or a pyridine ring and an aspect in which at least a part of an unsaturated hydrocarbon ring is fused with a pyrrole ring, a furan ring, a thiophene ring, a pyrazole ring, an imidazole ring, an oxazole ring, a thiazole ring, or a pyridine ring. Examples of the monovalent group of the non-aromatic heterocycle include aziridinyl, azetidinyl, pyrrolidinyl, piperidinyl, dihydropyridyl, oxetanyl, tetrahydrofuryl, dihydrofuryl, tetrahydropyranyl, dihydropyranyl, tetrahydrothienyl, tetrahydrothiopyranyl, dihydrothiopyranyl, piperazinyl, dihydropyrazyl, morpholinyl, thiomorpholinyl, dihydroindolyl, dihydroisoindolyl, dihydrobenzofuryl, dihydroisobenzofuryl, tetrahydrobenzoxazolyl, dihydrofuropyridyl, dihydropyrazolomorpholinyl, pyridinodioxanyl, dihydroazabenzofuryl, dihydroazaisobenzofuryl, and dihydroazaindolyl.

The "aromatic heterocycle" is a monovalent group of a monocyclic or bicyclic aromatic heterocycle having 5 to 10 ring members, which has 1 to 4 identical or different heteroatoms selected from the group consisting of nitrogen, oxygen, and sulfur. Examples of the monovalent group of the aromatic heterocycle include pyrrolyl, furyl, thienyl, pyrazolyl, imidazolyl, oxazolyl, thiazolyl, triazolyl, oxadiazolyl, thiadiazolyl, tetrazolyl, pyridyl, pyridazinyl, pyrimidinyl, pyrazyl, indolyl, isoindolyl, benzofuryl, benzothienyl, indazolyl, benzimidazolyl, benzoxazolyl, benzothiazolyl, quinolyl, isoquinolyl, cinnolinyl, quinazolinyl, quinoxalyl, pyrrolopyridyl, and imidazolopyridyl.

The "nitrogen-containing aromatic heterocycle" is an aromatic heterocycle having at least one nitrogen as an element forming a ring structure of the aromatic heterocycle. Examples of the nitrogen-containing aromatic heterocycle include pyrrole; pyrazole; imidazole; oxazole including 1,3-oxazole; thiazole including 1,3-thiazole; oxadiazole including 1,2,4-oxadiazole and 1,3,4-oxadiazole; thiadiazole including 1,2,4-thiadiazole and 1,3,4-thiadiazole; triazole including 1,2,3-triazole and 1,2,4-triazole; tetrazole; pyridine; pyridazine; pyrimidine; and pyrazine, and one aspect is 1,2,4-oxadiazole or tetrazole.

The "cyclic amino" is a monovalent group of a non-aromatic heterocycle or an aromatic heterocycle which has at least one nitrogen as an element forming a ring structure of the non-aromatic heterocycle or the aromatic heterocycle, and has a bonding site on at least one nitrogen atom forming the ring structure of the non-aromatic heterocycle or the aromatic heterocycle. Examples of the cyclic amino include azetidin-1-yl, pyrrolidin-1-yl, piperidin-1-yl, morpholin-4-yl, thiomorpholin-4-yl, and piperazin-1-yl, and one aspect is azetidin-1-yl, pyrrolidin-1-yl, piperidin-1-yl, or morpholin-4-yl.

The "saturated heterocycle" is a non-aromatic heterocycle which does not have an unsaturated bond in bonds constituting the non-aromatic heterocycle, in some aspects, the monocyclic non-aromatic heterocycle. Examples of the saturated heterocycle include aziridine, azetidine, pyrrolidine, oxirane, oxetane, and tetrahydrofuran, and one aspect is oxetane.

The "alkylene" includes linear alkylenes and branched alkylenes of $C_{1-10}$.

Examples of the $C_{1-2}$ alkylene include methylene, ethylene, and methylmethylene, and one aspect is methylene or methylmethylene.

The "halogen" is fluoro, chloro, bromo, and iodo, and one aspect is fluoro or chloro and another aspect is fluoro.

The "amino" includes —$NH_2$ and a group in which one or two hydrogens of —$NH_2$ are substituted with a $C_{1-4}$ alkyl. In addition, the $C_{1-4}$ alkyl substituted with hydrogen of —$NH_2$ may be substituted with —OH, —O—($C_{1-4}$ alkyl), —$NH_2$, —NH($C_{1-4}$ alkyl), or —N($C_{1-4}$ alkyl)($C_{1-4}$ alkyl).

In Formula (I), Ring A is azacycloalkyl, and may have a substituent and may be spiro-fused with $C_{3-6}$ cycloalkyl or a saturated heterocycle having 3 to 6 ring members.

One aspect of the azacycloalkyl includes azetidinyl, pyrrolidinyl, piperidinyl, azepanyl, azabicyclo[2.2.1]heptyl, or azabicyclo[2.2.2]octyl; and another aspect thereof is piperidinyl.

The Ring A which is azacycloalkyl may be spiro-fused with $C_{3-6}$ cycloalkyl or a saturated heterocycle having 3 to 6 ring members. Examples of the azacycloalkyl spiro-fused with $C_{3-6}$ cycloalkyl or a saturated heterocycle having 3 to 6 ring members include 6-azaspiro[3.5]nonyl including 6-azaspiro[3.5]nonan-7-yl; 1-oxa-6-azaspiro[3.5]nonyl including 1-oxa-6-azaspiro[3.5]nonan-7-yl; and 5-azaspiro[2.5]octyl including 5-azaspiro[2.5]octan-6-yl, and one aspect is 6-azaspiro[3.5]nonan-7-yl or 1-oxa-6-azaspiro[3.5]nonan-7-yl.

Examples of an allowable substituent in the Ring A include the groups described in the S1 group above; and one aspect is the groups described in (1) or (2) mentioned in the S1 group above or $C_{1-4}$ alkyl which may be substituted with 1 to 5 groups selected from the group consisting of the groups described in (1) or (2); and another aspect is halogen, —OH, or $C_{1-4}$ alkyl.

One aspect of the azacycloalkyl which may have a substituent and may be spiro-fused with $C_{3-6}$ cycloalkyl or a saturated heterocycle having 3 to 6 ring members is piperidinyl which may have a substituent and may be spiro-fused with cyclobutane or oxetane; another aspect thereof is piperidinyl which may be substituted with 1 to 5 groups selected from the group consisting of halogen, —OH, and $C_{1-4}$ alkyl and may be spiro-fused with cyclobutane or oxetane; still another aspect thereof is 6-azaspiro[3.5]nonan-7-yl, 5,5-dimethylpiperidin-2-yl, or 1-oxa-6-azaspiro[3.5]nonan-7-yl, each of which may be substituted with 1 to 5 groups selected from the group consisting of halogen, —OH, and $C_{1-4}$ alkyl; and still another aspect thereof is 9-hydroxy-6-azaspiro[3.5]nonan-7-yl, 4-hydroxy-5,5-dimethylpiperidin-2-yl, or 1-oxa-6-azaspiro[3.5]nonan-7-yl.

One aspect of the azacycloalkyl which may have a substituent and may be spiro-fused with $C_{3-6}$ cycloalkyl or a saturated heterocycle having 3 to 6 ring members is 9-hydroxy-6-azaspiro[3.5]nonan-7-yl; another aspect thereof is 4-hydroxy-5,5-dimethylpiperidin-2-yl; still another aspect thereof is 1-oxa-6-azaspiro[3.5]nonan-7-yl; still another aspect thereof is (7S,9R)-9-hydroxy-6-azaspiro[3.5]nonan-7-yl; still another aspect thereof is (2S,4R)-4-hydroxy-5,5-dimethylpiperidin-2-yl; and still another aspect thereof is (4R,7S)-1-oxa-6-azaspiro[3.5]nonan-7-yl.

Here, in a case where the Ring A is (7S,9R)-9-hydroxy-6-azaspiro[3.5]nonan-7-yl, the compound of Formula (I) is represented by the following general formula.

[Chem. 8]

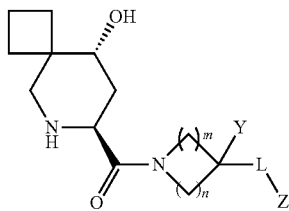

In addition, in a case where the Ring A is (2S,4R)-4-hydroxy-5,5-dimethylpiperidin-2-yl, the compound of Formula (I) is represented by the following general formula.

[Chem. 9]

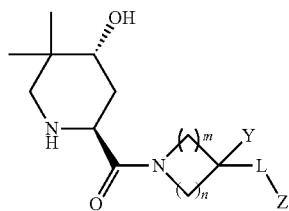

In addition, in a case where the Ring A is (4R,7S)-1-oxa-6-azaspiro[3.5]nonan-7-yl, the compound of Formula (I) is represented by the following general formula.

[Chem. 10]

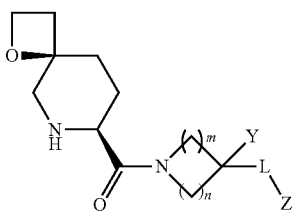

In Y, examples of an allowable substituent in the $C_{3-6}$ cycloalkyl which may have a substituent, the aromatic hydrocarbon ring which may have a substituent, the non-aromatic heterocycle which may have a substituent, and the aromatic heterocycle which may have a substituent include the groups mentioned in the S1 group described above, and one aspect is halogen, —OH, amino, cyano, nitro, —C(=O)—($C_{1-4}$ alkyl), —C(=O)—OH, —C(=O)—O—($C_{1-4}$ alkyl), —C(=O)-amino, $C_{1-4}$ alkyl which may be substituted with halogen, or —O—($C_{1-4}$ alkyl which may be substituted with halogen); another aspect is halogen or $C_{1-4}$ alkyl which may be substituted with halogen; and still another aspect is fluoro or methyl.

In Y, examples of an allowable substituent in the alkyl which may have a substituent include the groups described in (1) to (8) mentioned in the S1 group above; and one aspect is halogen; and another aspect is fluoro.

One aspect of Y is hydrogen, alkyl which may have a substituent, or $C_{3-6}$ cycloalkyl which may have a substituent; another aspect thereof is hydrogen; and still another aspect is alkyl which may have a substituent, or $C_{3-6}$ cycloalkyl which may have a substituent.

One aspect of the alkyl which may have a substituent and the $C_{3-6}$ cycloalkyl which may have a substituent is $C_{1-4}$ alkyl which may have a substituent or $C_{3-6}$ cycloalkyl; another aspect thereof is $C_{1-4}$ alkyl which may be substituted 1 to 5 halogens, or cyclopropyl; and still another aspect thereof is isopropyl, trifluoromethyl, or cyclopropyl.

One aspect of Y is hydrogen, another aspect thereof is isopropyl, still another aspect thereof is trifluoromethyl, and still another aspect thereof is cyclopropyl.

One aspect of $R^{Y1}$ and $R^{Y2}$ is that one of $R^{Y1}$ and $R^{Y2}$ is $C_{1-4}$ alkyl and the other is $C_{1-4}$ alkyl, —C(=O)—($C_{1-4}$ alkyl), or —S(=O)$_2$—($C_{1-4}$ alkyl); and another aspect thereof is that one of $R^{Y1}$ and $R^{Y2}$ is methyl and the other is methyl, —C(=O)-methyl, or —S(=O)$_2$-methyl.

One aspect of L is a nitrogen-containing aromatic heterocycle which may have a substituent, a nitrogen-containing aromatic heterocycle-($C_{1-2}$ alkylene) which may have a substituent, —C(=O)—N($R^{L1}$)—, or —C(=O)—N($R^{L1}$)—($C_{1-2}$ alkylene), and in this case, Z represents cycloalkyl which may have a substituent, an aromatic hydrocarbon ring which may have a substituent, a non-aromatic heterocycle which may have a substituent, an aromatic heterocycle which may have a substituent, cyclic amino which may have a substituent, or —O-(alkyl which may have substituent).

Another aspect of L is —C(=O)— or a nitrogen-containing aromatic heterocycle-C(=O)— which may have a substituent, and in this case, Z represents a cyclic amino which may have a substituent.

One aspect of L is a nitrogen-containing aromatic heterocycle which may have a substituent or a nitrogen-containing aromatic heterocycle-($C_{1-2}$ alkylene) which may have a substituent; another aspect thereof is —C(=O)—N($R^{L1}$)— or —C(=O)—N($R^{L1}$)—($C_{1-2}$ alkylene); and still another aspect thereof is —C(=O)— or a nitrogen-containing aromatic heterocycle-C(=O)— which may have a substituent.

One aspect of the nitrogen-containing aromatic heterocycle which may have a substituent or the nitrogen-containing aromatic heterocycle-($C_{1-2}$ alkylene) which may have a substituent is a nitrogen-containing aromatic heterocycle which may have a substituent; another aspect thereof is a nitrogen-containing aromatic heterocycle; still another aspect thereof is pyrrole, pyrazole, imidazole, oxazole, thiazole, oxadiazole, thiadiazole, triazole, tetrazole, pyridine, pyridazine, pyrimidine, or pyrazine; still another aspect thereof is 1,2,4-oxadiazole or tetrazole; and still another aspect thereof is 1,2,4-oxadiazol-3,5-diyl or 2H-tetrazol-2,5-diyl.

One aspect of —C(=O)—N($R^{L1}$) or —C(=O)—N($R^{L1}$)—($C_{1-2}$ alkylene) is —C(=O)—NH—, —C(=O)—N(—CH$_3$)—, —C(=O)—NH—CH$_2$—, —C(=O)—N(—CH$_3$)—CH$_2$—, or —C(=O)—NH—CH(—CH$_3$)—.

One aspect of —C(=O)— or the nitrogen-containing aromatic heterocycle-C(=O)— which may have a substituent is —C(=O)— or (1,2,4-oxadiazole)-C(=O)—; and another aspect thereof is —C(=O)—.

In Z, examples of an allowable substituent in the cycloalkyl which may have a substituent, the aromatic hydrocarbon ring which may have a substituent, the non-aromatic heterocycle which may have a substituent, the aromatic heterocycle which may have a substituent, and the cyclic amino which may have a substituent include the groups mentioned in the S1 group described above, and one aspect is halogen, —OH, amino, cyano, nitro, —C(=O)—($C_{1-4}$ alkyl), —C(=O)—OH, —C(=O)—O—($C_{1-4}$ alkyl), —C(=O)-amino, $C_{1-4}$ alkyl which may be substituted with halogen, or —O—($C_{1-4}$ alkyl which may be substituted with halogen); another aspect is halogen or $C_{1-4}$ alkyl which may be substituted with halogen; and still another aspect is fluoro, methyl, or trifluoromethyl.

In Z, examples of an allowable substituent in —O-(alkyl which may have substituent) include the groups described in (1) to (8) mentioned in the S1 group above; and one aspect is halogen; and another aspect is fluoro.

In the cyclic amino which may have a substituent in Z, the non-aromatic heterocycle which has a bonding site on at least one nitrogen atom forming the ring structure of the non-aromatic heterocycle may be spiro-fused with a ring selected from the group consisting of cyclopropane, cyclobutane, oxirane, and oxetane.

One aspect of Z is the cycloalkyl which may have a substituent, the aromatic hydrocarbon ring which may have a substituent, the non-aromatic heterocycle which may have a substituent, —O-(alkyl which may have substituent), or the cyclic amino which may have a substituent; another aspect thereof is the cycloalkyl which may have a substituent or the non-aromatic heterocycle which may have a substituent; still another aspect thereof is the aromatic hydrocarbon ring which may have a substituent; still another aspect thereof is —O-(alkyl which may have substituent); and still another aspect thereof is the cyclic amino which may have a substituent.

One aspect of the cycloalkyl which may have a substituent or the non-aromatic heterocycle which may have a substituent is cycloalkyl or non-aromatic heterocycle, each of which may be substituted with 1 to 5 substituents selected from the group consisting of fluoro, methyl, and trifluoromethyl; another aspect thereof is cyclopropyl, cyclobutyl, cyclopentyl, cyclohexyl, cycloheptyl, cyclooctyl, bicyclo[1.1.1]pentyl, tetrahydrofuryl, or tetrahydropyranyl, each of which may be substituted with 1 to 5 substituents selected from the group consisting of fluoro, methyl, and trifluoromethyl; still another aspect thereof is cyclobutyl, cyclohexyl, bicyclo[1.1.1]pentyl, tetrahydrofuryl, or tetrahydropyranyl, each of which may be substituted with 1 to 3 substituents selected from the group consisting of fluoro and methyl; still another aspect thereof is cyclobutyl, cyclohexyl, or tetrahydropyranyl, each of which is substituted with 2 or 3 substituents selected from the group consisting of fluoro and methyl; and still another aspect thereof is 3,3-difluorocyclobutan-1-yl, 4,4-difluorocyclohexan-1-yl, or 5,5-difluorotetrahydro-2H-pyran-2-yl.

One aspect of the cycloalkyl which may have a substituent is cyclobutyl, cyclopentyl, or cyclohexyl, each of which may be substituted with 1 to 3 substituents selected from the group consisting of fluoro, methyl, and trifluoromethyl; another aspect thereof is cyclobutyl, cyclopentyl, or cyclohexyl, each of which may be substituted with 1 to 3 fluoro; and still another aspect thereof is cyclobutyl or cyclohexyl, each of which may be substituted with 1 to 3 fluoro.

One aspect of the non-aromatic heterocycle which may have a substituent is tetrahydrofuran or tetrahydropyran, each of which may be substituted with 1 to 3 substituents selected from the group consisting of fluoro, methyl, and trifluoromethyl; another aspect thereof is tetrahydrofuran or tetrahydropyran, each of which may be substituted with 1 to 3 fluoro; and still another aspect thereof is tetrahydro-2H-pyran which may be substituted with 1 to 3 fluoro.

One aspect of the aromatic hydrocarbon ring which may have a substituent is phenyl which may have a substituent; another aspect thereof is phenyl which may be substituted with 1 to 3 substituents selected from the group consisting of fluoro, methyl, and trifluoromethyl; still another aspect thereof is fluorophenyl; and still another aspect of is 4-fluorophenyl.

One aspect of —O-(alkyl which may have substituent) is —O—($C_{1-4}$ alkyl which may have substituent); another aspect thereof is —O—($C_{1-4}$ alkyl which may be substituted with 1 to 5 fluoro); still another aspect thereof is —O-(2,2,2-trifluoroethyl) or —O-(trifluoromethyl); and still another aspect thereof is —O-(2,2,2-trifluoroethyl).

One aspect of the cyclic amino which may have a substituent is cyclic amino which may be substituted with 1 to 5 substituents selected from the group consisting of fluoro, methyl, and trifluoromethyl; and another aspect thereof is azetidin-1-yl, pyrrolidin-1-yl, piperidin-1-yl, morpholin-4-yl, or 4-oxa-7-azaspiro[2.5]octan-7-yl, each of which may be substituted with 1 to 5 substituents selected from the group consisting of fluoro, methyl, and trifluoromethyl.

One aspect of m and n is that m is 2 and n is 2; and another aspect thereof is that m is 1 and n is 1.

Aspects of the compound of Formula (I) are shown below. The following aspects may be read as aspects of the compounds of Formula (Ia), Formula (Ib), Formula (Iaa), and Formula (Ibb) as long as the following aspects are not inconsistent with Formula (Ia), Formula (Ib), Formula (Iaa), and Formula (Ibb).

(1A) compound of Formula (I), in which the azacycloalkyl is piperidinyl (1A-1) compound of Formula (I), in which the azacycloalkyl which may be spiro-fused with the $C_{3-6}$ cycloalkyl or the saturated heterocycle having 3 to 6 ring members is piperidinyl, 6-azaspiro[3.5]nonyl, 1-oxa-6-azaspiro[3.5]nonyl, or 5-azaspiro[2.5]octyl (1A-2) compound of Formula (I), in which the azacycloalkyl which may be spiro-fused with the $C_{3-6}$ cycloalkyl or the saturated heterocycle having 3 to 6 ring members is piperidinyl, 6-azaspiro[3.5]nonan-7-yl, or 1-oxa-6-azaspiro[3.5]nonan-7-yl (1A-3) compound of Formula (I), in which the Ring A is 9-hydroxy-6-azaspiro[3.5]nonan-7-yl, 4-hydroxy-5,5-dimethylpiperidin-2-yl, or 1-oxa-6-azaspiro[3.5]nonan-7-yl (1A-4) compound of Formula (I), in which the Ring A is 9-hydroxy-6-azaspiro[3.5]nonan-7-yl (1A-5) compound of Formula (I), in which the Ring A is (7S,9R)-9-hydroxy-6-azaspiro[3.5]nonan-7-yl (1A-6) compound of Formula (I), in which the Ring A is 4-hydroxy-5,5-dimethylpiperidin-2-yl (1A-7) compound of Formula (I), in which the Ring A is (2S,4R)-4-hydroxy-5,5-dimethylpiperidin-2-yl (1A-8) compound of Formula (I), in which the Ring A is 1-oxa-6-azaspiro[3.5]nonan-7-yl (1A-9) compound of Formula (I), in which the Ring A is (4R,7S)-1-oxa-6-azaspiro[3.5]nonan-7-yl (2A) compound of Formula (I), in which Y is hydrogen (2B) compound of Formula (I), in which Y is the alkyl which may have a substituent or the $C_{3-6}$ cycloalkyl which may have a substituent (2B-1) compound of Formula (I), in which Y is the $C_{1-4}$ alkyl which may have a substituent or the $C_{3-6}$ cycloalkyl (2B-2) compound of Formula (I), in which Y is the $C_{1-4}$ alkyl which may be substituted with 1 to 5 halogen or cyclopropyl (2B-3) compound of Formula (I), in which Y is isopropyl, trifluoromethyl, or cyclopropyl (2B-4) compound of Formula (I), in which Y is isopropyl (2B-5) compound of Formula (I), in which Y is trifluoromethyl (2B-6) compound of Formula (I), in which Y is cyclopropyl (3A) compound of Formula (I), in which L is the nitrogen-containing aromatic heterocycle which may have a substituent or the nitrogen-containing aromatic heterocycle-($C_{1-2}$ alkylene) which may have a substituent (3A-1) compound of Formula (I), in which L is the nitrogen-containing aromatic heterocycle which may have a substituent (3A-2) compound of Formula (I), in which L is the nitrogen-containing aromatic heterocycle (3A-3) compound of Formula (I), in which L is 1,2,4-oxadiazole or tetrazole (3A-4) compound of Formula (I), in which L is 1,2,4-oxadiazol-3,5-diyl (3A-5) compound of Formula (I), in which L is 2H-tetrazol-2,5-diyl (3B) compound of Formula (I), in which L is —C(=O)—N($R^{L1}$)— or —C(=O)—N($R^{L1}$)—($C_{1-2}$ alkylene)

(3B-1) compound of Formula (I), in which L is —C(=O)—NH—, —C(=O)—N(—CH$_3$)—, —C(=O)—NH—CH$_2$—, —C(=O)—N(—CH$_3$)—CH$_2$—, or —C(=O)—NH—CH(—CH$_3$)—

(3C) compound of Formula (I), in which L is —C(=O)— or nitrogen-containing aromatic heterocycle-C(=O)— which may have a substituent (3C-1) compound of Formula (I), in which L is —C(=O)— or (1,2,4-oxadiazole)-C(=O)—

(3C-2) compound of Formula (I), in which L is —C(=O)—

(4A) compound of Formula (I), in which Z is the cycloalkyl which may have a substituent or the non-aromatic heterocycle which may have a substituent (4A-1) compound of Formula (I), in which Z is the cycloalkyl or the non-aromatic heterocycle, each of which may be substituted with 1 to 5 substituents selected from the group consisting of fluoro, methyl, and trifluoromethyl (4A-2) compound of Formula (I), in which Z is cyclopropyl, cyclobutyl, cyclopentyl, cyclohexyl, cycloheptyl, cyclooctyl, bicyclo[1.1.1]pentyl, tetrahydrofuryl, or tetrahydropyranyl, each of which may be substituted with 1 to 5 substituents selected from the group consisting of fluoro, methyl, and trifluoromethyl (4A-3) compound of Formula (I), in which Z is cyclobutyl, cyclohexyl, bicyclo[1.1.1]pentyl, tetrahydrofuryl, or tetrahydropyranyl, each of which may be substituted with 1 to 3 substituents selected from the group consisting of fluoro and methyl (4A-4) compound of Formula (I), in which Z is cyclobutyl, cyclohexyl, or tetrahydropyranyl, each of which is substituted with 2 or 3 substituents selected from the group consisting of fluoro and methyl (4A-5) compound of Formula (I), in which Z is 3,3-difluorocyclobutan-1-yl, 4,4-difluorocyclohexan-1-yl, or 5,5-difluorotetrahydro-2H-pyran-2-yl (4A-6) compound of Formula (I), in which Z is 3,3-difluorocyclobutan-1-yl (4A-7) compound of Formula (I), in which Z is 4,4-difluorocyclohexan-1-yl (4A-8) compound of Formula (I), in which Z is 5,5-difluorotetrahydro-2H-pyran-2-yl (4B) compound of Formula (I), in which Z is the aromatic hydrocarbon ring which may have a substituent (4B-1) compound of Formula (I), in which Z is the phenyl which may have a substituent (4B-2) compound of Formula (I), in which Z is the phenyl which may be substituted with 1 to 3 substituents selected from the group consisting of fluoro, methyl, and trifluoromethyl (4C) compound of Formula (I), in which Z is —O-(alkyl which may have substituent)

(4C-1) compound of Formula (I), in which Z is —O—($C_{1-4}$ alkyl which may be substituted with 1 to 5 fluoro)

(4D) compound of Formula (I), in which Z is the cyclic amino which may have a substituent (4D-1) compound of Formula (I), in which Z is the cyclic amino which may be substituted with 1 to 5 substituents selected from the group consisting of fluoro, methyl, and trifluoromethyl (4D-2) compound of Formula (I), in which Z is azetidin-1-yl, pyrrolidin-1-yl, piperidin-1-yl, morpholin-4-yl, or 4-oxa-7-azaspiro[2.5]octan-7-yl, each of which may be substituted with 1 to 5 substituents selected from the group consisting of fluoro, methyl, and trifluoromethyl (5A) compound of Formula (I), in which m is 2 and n is 2

(5B) compound of Formula (I), in which m is 1 and n is 1

(6) compound of Formula (I) which is defined by a combination of two or more of the compounds of Formula (I) described in (1) to (5B) above In the above-described (1) to (5B), any two or more kinds can be combined as long as there is no contradiction in the chemical structures of the compound of Formula (I).

Examples of the combination described in (6) above include the following aspects. The combination described in (6) above is not limited to the following examples.

(7A) compound of Formula (I), in which the azacycloalkyl is piperidinyl, Y is the alkyl which may have a substituent or the $C_{3-6}$ cycloalkyl which may have a substituent, and m is 2 and n is 2

(7A-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, Y is isopropyl, trifluoromethyl, or cyclopropyl, and m is 2 and n is 2

(7B) compound of Formula (I), in which the azacycloalkyl is piperidinyl, L is the nitrogen-containing aromatic heterocycle, and m is 2 and n is 2

(7B-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, L is 1,2,4-oxadiazole or tetrazole, and m is 2 and n is 2

(7C) compound of Formula (I), in which the azacycloalkyl is piperidinyl, Z is the cycloalkyl which may have a substituent or the non-aromatic heterocycle which may have a substituent, and m is 2 and n is 2

(7C-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, Z is cyclobutyl, cyclohexyl, or tetrahydropyranyl, each of which is substituted with 2 or 3 substituents selected from the group consisting of fluoro and methyl, and m is 2 and n is 2

(7D) compound of Formula (I), in which Y is the alkyl which may have a substituent or the $C_{3-6}$ cycloalkyl which may have a substituent, L is the nitrogen-containing aromatic heterocycle, and m is 2 and n is 2

(7D-1) compound of Formula (I), in which Y is isopropyl, trifluoromethyl, or cyclopropyl, L is 1,2,4-oxadiazole or tetrazole, and m is 2 and n is 2

(7E) compound of Formula (I), in which Y is the alkyl which may have a substituent or the $C_{3-6}$ cycloalkyl which may have a substituent, Z is the cycloalkyl which may have a substituent or the non-aromatic heterocycle which may have a substituent, and m is 2 and n is 2

(7E-1) compound of Formula (I), in which Y is isopropyl, trifluoromethyl, or cyclopropyl, Z is cyclobutyl, cyclohexyl, or tetrahydropyranyl, each of which is substituted with 2 or 3 substituents selected from the group consisting of fluoro and methyl, and m is 2 and n is 2

(7F) compound of Formula (I), in which L is the nitrogen-containing aromatic heterocycle, Z is the cycloalkyl which may have a substituent and the non-aromatic heterocycle which may have a substituent, and m is 2 and n is 2

(7F-1) compound of Formula (I), in which L is 1,2,4-oxadiazole or tetrazole, Z is cyclobutyl, cyclohexyl, or tetrahydropyranyl, each of which is substituted with 2 or 3 substituents selected from the group consisting of fluoro and methyl, and m is 2 and n is 2

(7G) compound of Formula (I), in which the azacycloalkyl is piperidinyl, Y is the alkyl which may have a substituent or the $C_{3-6}$ cycloalkyl which may have a substituent, L is the nitrogen-containing aromatic heterocycle, and m is 2 and n is 2

(7G-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, Y is isopropyl, trifluoromethyl, or cyclopropyl, L is 1,2,4-oxadiazole or tetrazole, and m is 2 and n is 2

(7H) compound of Formula (I), in which the azacycloalkyl is piperidinyl, Y is the alkyl which may have a substituent or the $C_{3-6}$ cycloalkyl which may have a substituent, Z is the cycloalkyl which may have a substituent or the non-aromatic heterocycle which may have a substituent, and m is 2 and n is 2

(7H-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, Y is isopropyl, trifluoromethyl, or cyclopropyl, Z is cyclobutyl, cyclohexyl, or tetrahydropyranyl, each of which is substituted with 2 or 3 substituents selected from the group consisting of fluoro and methyl, and m is 2 and n is 2
(7I) compound of Formula (I), in which the azacycloalkyl is piperidinyl, L is the nitrogen-containing aromatic heterocycle, Z is the cycloalkyl which may have a substituent or the non-aromatic heterocycle which may have a substituent, and m is 2 and n is 2
(7I-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, L is 1,2,4-oxadiazole or tetrazole, Z is cyclobutyl, cyclohexyl, or tetrahydropyranyl, each of which is substituted with 2 or 3 substituents selected from the group consisting of fluoro and methyl, and m is 2 and n is 2
(7J) compound of Formula (I), in which Y is the alkyl which may have a substituent or the $C_{3-6}$ cycloalkyl which may have a substituent, L is the nitrogen-containing aromatic heterocycle, Z is the cycloalkyl which may have a substituent or the non-aromatic heterocycle which may have a substituent, and m is 2 and n is 2
(7J-1) compound of Formula (I), in which Y is isopropyl, trifluoromethyl, or cyclopropyl, L is 1,2,4-oxadiazole or tetrazole, Z is cyclobutyl, cyclohexyl, or tetrahydropyranyl, each of which is substituted with 2 or 3 substituents selected from the group consisting of fluoro and methyl, and m is 2 and n is 2
(7K) compound of Formula (I), in which the azacycloalkyl is piperidinyl, Y is the alkyl which may have a substituent or the $C_{3-6}$ cycloalkyl which may have a substituent, L is the nitrogen-containing aromatic heterocycle, Z is the cycloalkyl which may have a substituent or the non-aromatic heterocycle which may have a substituent, and m is 2 and n is 2
(7K-1) compound of Formula (I), in which the azacycloalkyl spiro-fused with the $C_{3-6}$ cycloalkyl or the saturated heterocycle having 3 to 6 ring members is 6-azaspiro[3.5]nonyl, 1-oxa-6-azaspiro[3.5]nonyl, or 5-azaspiro[2.5]octyl, Y is isopropyl, trifluoromethyl, or cyclopropyl, L is 1,2,4-oxadiazole or tetrazole, Z is cyclobutyl, cyclohexyl, or tetrahydropyranyl, each of which is substituted with 2 or 3 substituents selected from the group consisting of fluoro and methyl, and m is 2 and n is 2
(8A) compound of Formula (I), in which the azacycloalkyl is piperidinyl, Y is hydrogen, L is the nitrogen-containing aromatic heterocycle, Z is the aromatic hydrocarbon ring which may have a substituent, and m is 2 and n is 2
(8A-1) compound of Formula (I), in which the azacycloalkyl is piperidinyl, Y is hydrogen, L is the nitrogen-containing aromatic heterocycle, Z is the phenyl which may be substituted with 1 to 3 substituents selected from the group consisting of fluoro, methyl, and trifluoromethyl, and m is 2 and n is 2
(9A) compound of Formula (I), in which L is —C(=O)—, Z is the cyclic amino which may have a substituent, and m is 2 and n is 2
(9A-1) compound of Formula (I), in which L is —C(=O)—, Z is the cyclic amino which may be substituted with 1 to 5 substituents selected from the group consisting of fluoro, methyl, and trifluoromethyl, and m is 2 and n is 2
(9A-2) compound of Formula (I), in which the azacycloalkyl is piperidinyl, Y is the alkyl which may have a substituent or the $C_{3-6}$ cycloalkyl which may have a substituent, L is —C(=O)—, Z is the cyclic amino which may be substituted with 1 to 5 substituents selected from the group consisting of fluoro, methyl, and trifluoromethyl, and m is 2 and n is 2

Examples of specific compounds included in the present invention include the following compounds or salts thereof.

In the present specification, a compound name named by the molecular structure editor software ChemDraw (manufactured by CambridgeSoft) may be used.

(4-(3-(3,3-Difluorocyclobutyl)-1,2,4-oxadiazol-5-yl)-4-isopropylpiperidin-1-yl)((7S,9R)-9-hydroxy-6-azaspiro[3.5]nonan-7-yl)methanone (Example 1)

(4-(3-(3,3-Difluorocyclobutyl)-1,2,4-oxadiazol-5-yl)-4-(trifluoromethyl)piperidin-1-yl)((7S,9R)-9-hydroxy-6-azaspiro[3.5]nonan-7-yl)methanone (Example 2)

(4-(5-(3,3-Difluorocyclobutyl)-1,2,4-oxadiazol-3-yl)-4-(trifluoromethyl)piperidin-1-yl)((7S,9R)-9-hydroxy-6-azaspiro[3.5]nonan-7-yl)methanone (Example 3)

(4-(5-(4,4-Difluorocyclohexyl)-1,2,4-oxadiazol-3-yl)-4-(trifluoromethyl)piperidin-1-yl)((7S,9R)-9-hydroxy-6-azaspiro[3.5]nonan-7-yl)methanone (Example 31)

(4-(5-(3,3-Difluorocyclobutyl)-1,2,4-oxadiazol-3-yl)-4-(trifluoromethyl)piperidin-1-yl)((2S,4R)-4-hydroxy-5,5-dimethylpiperidin-2-yl)methanone (Example 51)

(4-(5-(4,4-Difluorocyclohexyl)-1,2,4-oxadiazol-3-yl)-4-(trifluoromethyl)piperidin-1-yl)((2S,4R)-4-hydroxy-5,5-dimethylpiperidin-2-yl)methanone (Example 56)

(4-(5-(5,5-Difluorotetrahydro-2H-pyran-2-yl)-1,2,4-oxadiazol-3-yl)-4-(trifluoromethyl)piperidin-1-yl)((7S,9R)-9-hydroxy-6-azaspiro[3.5]nonan-7-yl)methanone (Example 63)

(4-(5-(5,5-Difluorotetrahydro-2H-pyran-2-yl)-1,2,4-oxadiazol-3-yl)-4-(trifluoromethyl)piperidin-1-yl)((7S,9R)-9-hydroxy-6-azaspiro[3.5]nonan-7-yl)methanone (Example 64)

(4-(2-(3,3-Difluorocyclobutyl)-2H-tetrazol-5-yl)-4-(trifluoromethyl)piperidin-1-yl)((7S,9R)-9-hydroxy-6-azaspiro[3.5]nonan-7-yl)methanone (Example 67)

(4-Cyclopropyl-4-(5-(4,4-Difluorocyclohexyl)-1,2,4-oxadiazol-3-yl)piperidin-1-yl)((2S,4R)-4-hydroxy-5,5-dimethylpiperidin-2-yl)methanone (Example 80)

(4-(2-(4-Fluorophenyl)-2H-tetrazol-5-yl)piperidin-1-yl)((7S,9R)-9-hydroxy-6-azaspiro[3.5]nonan-7-yl)methanone (Example 89)

(4-(2-(4-Fluorophenyl)-2H-tetrazol-5-yl)piperidin-1-yl)((2S,4R)-4-hydroxy-5,5-dimethylpiperidin-2-yl)methanone (Example 90)

The compound of Formula (I) may have tautomers or geometric isomers depending on the type of substituent. In the present specification, it may be described that the compound of Formula (I) has only one form of isomers, but the present invention also includes other isomers, separated isomers, or mixtures thereof.

In addition, the compound of Formula (I) may have an asymmetric carbon atom or an axial chirality, and optical isomer based on this can exist. The present invention also includes separated optical isomers of the compound of Formula (I) or mixtures thereof.

Furthermore, the present invention also includes a pharmaceutically acceptable prodrug of the compound represented by Formula (I). The pharmaceutically acceptable prodrug is a compound having a group which can be converted into an amino group, a hydroxyl group, a carboxyl group, or the like by solvolysis or under physiological conditions. Examples of a group forming the prodrug include groups described in Prog. Med., 5, pp. 2157 to 2161

(1985) or "Development of pharmaceuticals" (Hirokawa Shoten, 1990), vol. 7, Molecular Design, pp. 163 to 198.

In addition, a salt of the compound of Formula (I) is a pharmaceutically acceptable salt of the compound of Formula (I), and the compound of Formula (I) may form an acid addition salt or a salt with a base depending on the type of substituent. Specific examples thereof include acid addition salts with inorganic acids such as hydrochloric acid, hydrobromic acid, hydroiodic acid, sulfuric acid, nitric acid, and phosphoric acid or organic acids such as formic acid, acetic acid, propionic acid, oxalic acid, malonic acid, succinic acid, fumaric acid, maleic acid, lactic acid, malic acid, mandelic acid, tartaric acid, dibenzoyl tartaric acid, ditoluoyl tartaric acid, citric acid, methanesulfonic acid, ethanesulfonic acid, benzenesulfonic acid, p-toluenesulfonic acid, aspartic acid, and glutamic acid; salts with inorganic bases such as sodium, potassium, magnesium, calcium, and aluminum or organic bases such as methylamine, ethylamine, ethanolamine, lysine, and ornithine; salts with various amino acids such as acetylleucine or amino acid derivatives; and ammonium salts.

Furthermore, the present invention also includes various hydrates, solvates, and crystalline polymorphic substances of the compound of Formula (I) and the salt thereof. In addition, the present invention also includes compounds labeled with various radioactive or non-radioactive isotopes. (Production Method)

The compound of Formula (I) and the salt thereof can be produced by utilizing various known synthetic methods using characteristics based on a basic structure thereof or the type of substituent. In this case, depending on a type of functional group, it may be effective in terms of producing technology to replace the functional group with an appropriate protective group (group which can be easily converted to the functional group) at a stage from a raw material to an intermediate. Examples of such a protective group include protective groups described in "Greene's Protective Groups in Organic Synthesis (4th edition, 2006)" written by P. G. M. Wuts and T. W. Greene, and the protective group may be appropriately selected and used according to reaction conditions. In such a method, a desired compound can be obtained by introducing the protective group, carrying out the reaction, and then removing the protective group as necessary.

In addition, the prodrug of the compound of Formula (I) can be produced by, same as the above-described protective group, introducing a specific group at the stage from the raw material to the intermediate, or by further carrying out the reaction with the obtained compound of Formula (I). The reaction can be carried out by applying a method known to those skilled in the art, such as ordinary esterification, amidation, and dehydration.

Hereinafter, a typical method for producing the compound of Formula (I) will be described. Each production method can also be carried out with reference to documents added to the description. The production method according to the present invention is not limited to examples shown below.

[Chem. 11]

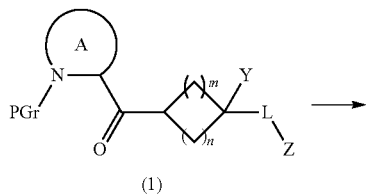

(1)

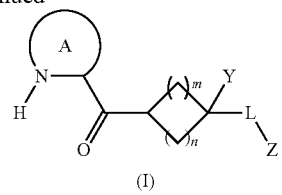

(I)

With regard to a compound represented by Formula (1), in which the nitrogen atom of the ring A in Formula (I) is protected by a protective group (PGr), (hereinafter, referred to as a "compound (1)"; the same applies to compounds represented by other formulae), the present production method is a method for producing the compound of Formula (I) according to the present invention by removing the protective group of the compound.

Examples of the protective group PGr in the compound (1) include groups which can be commonly used as a protective group for an aliphatic amino group, including tert-butyloxycarbonyl and 9-fluorenylmethyloxycarbonyl.

The removal of the protective group is carried out by using a reagent depending on the type of protective group to be used in a catalytic amount, an equal amount, or an excess amount, and under temperature, time, and solvent conditions suitable for removing the protective group to be used.

For example, in a case where tert-butyloxycarbonyl is used as the protective group or a case where 9-fluorenylmethyloxycarbonyl is used as the protective group, the protective group can be removed by applying the conditions described in "Greene's Protective Groups in Organic Synthesis (4th edition, 2006)".

[Chem. 12]

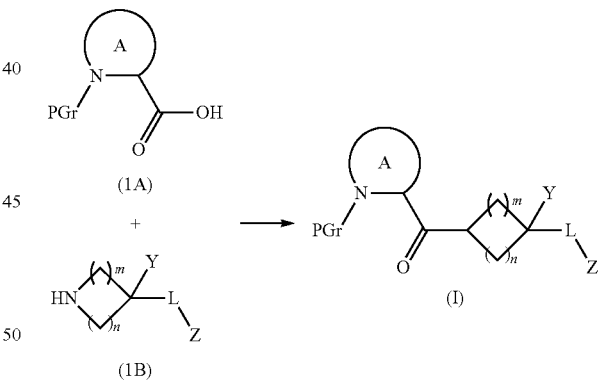

The compound (1) can be produced by an amidation reaction between a compound (1A) and a compound (1B), or by a reaction similar thereto.

In the reaction, a mixture of the compound (1A) and the compound (1B) in equivalent amounts or in an excess amount of one is stirred in the presence of a condensing agent in a reaction-inert solvent from cooling to heating, preferably at −20° C. to 60° C., for usually 0.1 hour to 5 days.

Examples of the solvent used here are not particularly limited, but include aromatic hydrocarbons such as benzene, toluene, and xylene; halogenated hydrocarbons such as dichloromethane, 1,2-dichloroethane, and chloroform; ethers such as diethyl ether, tetrahydrofuran, dioxane, and dimethoxyethane; N,N-dimethylformamide, dimethylsulfoxide, ethyl acetate, acetonitrile, water, and a mixture thereof.

Examples of the condensing agent include dicyclohexylcarbodiimide, 1,1'-carbonyldiimidazole, 1-(3-dimethylaminopropyl)-3-ethylcarbodiimide, 1-[bis(dimethylamino)methylene]-1H-1,2,3-triazolo[4,5-b]pyridinium 3-oxide hexafluorophosphate, (1-cyano-2-ethoxy-2-oxoethylideneaminooxy)dimethylamino-morpholino-carbenium hexafluorophosphate, diphenylphosphoryl azide, phosphorus oxychloride, but the condensing agent is not limited thereto.

It may be preferable to use an additive (for example, 1-hydroxybenzotriazole and the like) for the reaction. It may be advantageous for the reaction to proceed smoothly that the reaction is carried out in the presence of organic bases such as triethylamine, N,N-diisopropylethylamine, and N-methylmorpholine or inorganic bases such as potassium carbonate, sodium carbonate, and potassium hydroxide.

In addition, a carboxylic acid which is the compound (1A) can be converted into a reactive derivative and then reacted with the compound (1B). Examples of the reactive derivative of the carboxylic acid include acid halides obtained by reacting with a halogenating agent such as phosphorus oxychloride and thionyl chloride; mixed acid anhydrides obtained by reacting with isobutyl chloroformate or the like; and active esters obtained by condensing with 1-hydroxybenzotriazole or the like. The reaction of these reactive derivatives and the compound (1B) is carried out by stirring in a reaction-inert solvent such as halogenated hydrocarbons, aromatic hydrocarbons, and ethers from cooling to heating, preferably at −20° C. to 60° C., for usually 0.1 hour to 5 days. It may be advantageous for the reaction to proceed smoothly that the reaction is carried out in the presence of organic bases such as triethylamine, N,N-diisopropylethylamine, and N-methylmorpholine.

The compound (1A) and the compound (1B) can be produced by the method shown in Examples or Production Examples described later, or a method similar thereto.

The compound of Formula (I) is isolated and purified as a free compound, a salt thereof, a hydrate, a solvate, or a crystalline polymorphic substance. The salt of the compound of Formula (I) can also be produced by subjecting the compound of Formula (I) to a conventional salt-forming reaction.

The isolation and purification are carried out by applying ordinary chemical operations such as extraction, fractional crystallization, and various fractional chromatography.

Various isomers can be produced by selecting an appropriate raw material compound, or can be separated by utilizing a difference in physicochemical properties between the isomers. For example, optical isomers can be obtained by a general optical resolution method of a racemate (for example, fractional crystallization leading to a diastereomeric salt with an optically active base or acid, chromatography using a chiral column, and the like), and can also be produced from a suitable optically active raw material compound.

In the present specification, the compounds of Formula (Ia), Formula (Ib), Formula (Iaa), and Formula (Ibb) and the salts thereof are included in the compound of Formula (I) and the salt thereof, and examples and aspects of the compounds of Formula (Ia), Formula (Ib), Formula (Iaa), and Formula (Ibb) and the salts thereof can refer to those of the compound of Formula (I) and the salt thereof as long as those of the compound of Formula (I) and the salt thereof are not inconsistent with Formula (Ia), Formula (Ib), Formula (Iaa), and Formula (Ibb).

Pharmacological activity of the compound of Formula (I) is confirmed by the following test.

1. CTSC Inhibition Assay (In Vitro)

A test specimen was evaluated by a CTSC inhibition assay using a fluorescent substrate GF-AFC (Gly-Phe-7-Amino-4-trifluoromethylcoumarin, MP Biomedical, 03AFC03325). Since the GF-AFC is converted by CTSC to aminotrifluoromethylcoumarin having a specific fluorescence wavelength and the produced amount is proportional to CTSC activity, quantitative analysis was performed by measuring a fluorescence intensity with a plate reader. CTSC inhibition assay for each compound was performed using a polystyrene-made non-adhesive surface-treated black 384 well plate under the following conditions.

A human recombinant CTSC (R&D systems, 1071-CY) was dissolved in a CTSC active cocktail (20 ng/mL of human recombinant cathepsin L (R&D systems, 952-CY, 25 mmol/L MES/NaOH (pH: 6.0), 5 mmol/L dithiothreitol (DTT)) so as to be 100 ng/mL and incubated at 18° C. for 30 minutes. The solution was diluted with a CTSC assay buffer (50 mmol/L MES/NaOH (pH: 5.0), 50 mmol/L NaCl, 0.001% Triton X-100, mmol/L DTT) so as to be 2 ng/mL in a case of performing CTSC inhibition assay.

The test specimen was dissolved in dimethylsulfoxide (DMSO) at 10 mmol/L to prepare a stock solution. In a case where a solution in which the stock solution was diluted 15-fold with DMSO was used as the maximum evaluation concentration (0.667 mmol/L), 5-fold dilution was repeated in DMSO from the solution to prepare a serially diluted solution. 248.8 μL of the CTSC assay buffer was added to 1.12 μL of the serially diluted sample prepared in the DMSO to prepare a solution of a CTSC inhibition assay compound.

The final composition of the CTSC inhibition assay mixture was 0.66 ng/mL activated CTSC, 50 mmol/L MES/NaOH (pH: 5.0), 50 mmol/L NaCl, 0.001% Triton X-100, 5 mmol/L DTT, 30 μmol/L GF-AFC, and 0.15% DMSO, and the procedure was as follows. That is, 4 μL of the compound solution and 4 μL of the 2 ng/mL activated CTSC solution were mixed with each other in a 384 well plate and incubated at 25° C. for 30 minutes. Thereafter, 4 μL of the GF-AFC solution dissolved in the CTSC assay buffer was added to the mixture so as to be 90 μmol/L. After mixing to be uniform, a fluorescence emission intensity at 505 nm in a case of being excited at 390 nm after incubating at 25° C. for 1 hour was measured with a plate reader. A 4-parameter regression analysis was performed with GraphPad Prism (manufactured by GraphPad Software) from a plot of the fluorescence intensity at 505 nm and the sample concentration, and an $IC_{50}$ value was calculated.

Results of test compounds of Formula (I) are shown in Table 1 as $IC_{50}$ (nM) values for which 50% inhibition concentration is calculated based on CTSC inhibition (%). In the table, Ex indicates an example number.

TABLE 1

| Ex | $IC_{50}$ (nM) |
| --- | --- |
| 1 | 1.63 |
| 2 | 2.36 |
| 3 | 1.52 |
| 4 | 4.85 |
| 5 | 1.08 |
| 6 | 1.19 |
| 7 | 10.43 |

TABLE 1-continued

| Ex | IC$_{50}$ (nM) |
|---|---|
| 8 | 1.60 |
| 9 | 5.09 |
| 10 | 39.33 |
| 11 | 7.73 |
| 12 | 1.03 |
| 13 | 1.70 |
| 14 | 1.35 |
| 15 | 1.90 |
| 16 | 3.17 |
| 17 | 1.01 |
| 18 | 3.12 |
| 19 | 1.23 |
| 20 | 0.83 |
| 21 | 2.51 |
| 22 | 1.03 |
| 23 | 88.75 |
| 24 | 151.3 |
| 25 | >200 |
| 26 | >200 |
| 27 | 0.24 |
| 28 | 253.9 |
| 29 | 1.47 |
| 30 | >1000 |
| 31 | 0.31 |
| 32 | 25.52 |
| 33 | 2.62 |
| 34 | >1000 |
| 35 | 3.39 |
| 36 | 1.88 |
| 37 | 28.36 |
| 38 | >200 |
| 39 | 13.31 |
| 40 | 19.62 |
| 41 | 18.48 |
| 42 | 7.19 |
| 43 | >100 |
| 44 | 2.74 |
| 45 | 1.88 |
| 46 | 53.55 |
| 47 | 4.52 |
| 48 | 3.07 |
| 49 | 4.43 |
| 50 | 1.53 |
| 51 | 8.28 |
| 52 | 8.16 |
| 53 | 18.68 |
| 54 | 3.88 |
| 55 | 4.40 |
| 56 | 2.06 |
| 57 | 3.57 |
| 58 | 2.55 |
| 59 | 3.61 |
| 60 | 4.09 |
| 61 | 5.72 |
| 62 | 6.39 |
| 63 | 1.85 |
| 64 | 0.69 |
| 65 | 4.15 |
| 66 | 1.05 |
| 67 | 3.25 |
| 68 | 2.92 |
| 69 | 1.73 |
| 70 | 1.63 |
| 71 | 3.73 |
| 72 | 2.48 |
| 73 | 3.28 |
| 74 | 0.87 |
| 75 | 2.21 |
| 76 | 187.45 |
| 77 | 3.79 |
| 78 | 5.68 |
| 79 | 2.17 |
| 80 | 1.86 |
| 81 | 1.31 |
| 82 | 0.93 |
| 83 | 1.47 |
| 84 | 1.25 |
| 85 | 2.51 |
| 86 | 1.43 |
| 87 | 3.54 |
| 88 | 0.13 |
| 89 | 1.45 |
| 90 | 4.34 |
| 91 | 0.84 |
| 92 | 2.76 |
| 93 | 3.92 |
| 94 | 0.37 |
| 95 | 3.02 |
| 96 | 1.89 |
| 97 | 1.79 |
| 98 | 4.15 |
| 99 | 4.15 |
| 100 | 5.40 |
| 101 | 1.93 |
| 102 | 9.48 |
| 103 | 2.41 |
| 104 | 1.46 |
| 105 | 2.53 |

2. Intracellular CTSC Inhibition Assay (In Vitro)

A test specimen was evaluated by a degree of cell death in a case where a substrate LLOMe (L-Leucyl-L-Leucine methyl ester, hydrobromide salt, Sigma, 555045152) was added to U937 cells. The LLOMe is taken up into the cells by endocytosis and cleaved by CTSC. A product thereof induces lysosomal damage in cells and causes cell death in leukocytes and the like. Therefore, since the degree of cell death correlates with an amount of degradation of LLOMe, that is, with CTSC activity, by quantitatively analyzing the cell death, CTSC inhibitory activity of the test specimen in the cell was determined. CTSC inhibition assay was performed using a polystyrene-made white 384 well plate.

As the test specimen, a stock solution dissolved in DMSO was prepared so as to be 0.2 mmol/L, and in a case where a solution in which the stock solution was diluted 50-fold with a RPMI-1640 medium including 10% FBS was used as the maximum evaluation concentration (4000 nmol/L), a serially diluted solution was prepared by diluting the solution 3-fold with the medium. Thereafter, a 4-fold concentrated test specimen solution with the target final concentration was prepared.

U937 cells were cultured in a RPMI-1640 medium including 10% FBS, and diluted to prepare 90,000 cells/mL of cell suspension on the day of assay. 10 µL of the cell suspension was seeded per well. Next, 10 µL of the test specimen solution having a concentration 4 times the target final concentration was added thereto, and the mixture was allowed to stand for 30 minutes. Thereafter, 20 µL of a 300 µmol/L LLOMe solution dissolved in a RPMI-1640 medium including 10% FBS was added thereto, and the cells were cultured for 3 hours. After completion of the culture, 40 µL of CellTiter-Glo (registered trademark) reagent (Promega, G7570) was added to each well and mixed. After 15 minutes, 20 µL of the reaction solution in each well was transferred to a white 384 well plate, and a chemiluminescence intensity was measured with a plate reader. A 4-parameter regression analysis was performed with GraphPad Prism (manufactured by GraphPad Software) from a plot of the luminescence intensity and the sample concentration, and an IC$_{50}$ value was calculated.

Results of test compounds of Formula (1) are shown in Table 2 as IC$_{50}$ (nM) values for which 50% inhibition concentration is calculated based on CTSC inhibition (%). In the table, Ex indicates an example number.

TABLE 2

| Ex | IC$_{50}$ (nM) |
|---|---|
| 1 | 0.49 |
| 2 | 0.89 |
| 3 | 0.49 |
| 4 | 5.64 |
| 5 | 1.01 |
| 6 | 1.06 |
| 7 | 23.56 |
| 8 | 1.62 |
| 9 | 11.36 |
| 10 | 162.5 |
| 11 | 11.5 |
| 12 | 0.34 |
| 13 | 0.19 |
| 14 | 4.00 |
| 15 | 790.55 |
| 16 | 19.23 |
| 17 | 21.44 |
| 18 | 2.33 |
| 19 | 0.98 |
| 20 | 226.6 |
| 21 | 4.78 |
| 22 | 20.78 |
| 23 | 60.92 |
| 24 | >1000 |
| 25 | >200 |
| 26 | 473.6 |
| 27 | 132.95 |
| 28 | 596.2 |
| 29 | 11.32 |
| 30 | >1000 |
| 31 | 0.22 |
| 32 | 8.84 |
| 33 | 7.50 |
| 34 | >333 |
| 35 | 6.54 |
| 36 | 0.71 |
| 37 | 10.13 |
| 38 | 123.9 |
| 39 | 7.18 |
| 40 | 37.91 |
| 41 | 6.95 |
| 42 | 2.28 |
| 43 | 57.25 |
| 44 | 4.24 |
| 45 | 0.17 |
| 46 | 42.5 |
| 47 | 1.53 |
| 48 | 4.00 |
| 49 | 0.35 |
| 50 | 0.80 |
| 51 | 0.86 |
| 52 | 10.22 |
| 53 | 11.32 |
| 54 | 1.46 |
| 55 | 3.79 |
| 56 | 0.71 |
| 57 | 0.55 |
| 58 | 0.56 |
| 59 | 0.70 |
| 60 | 1.39 |
| 61 | 1.75 |
| 62 | 1.62 |
| 63 | 1.01 |
| 64 | 0.74 |
| 65 | 30.11 |
| 66 | 0.46 |
| 67 | 1.41 |
| 68 | 5.44 |
| 69 | 1.44 |
| 70 | 1.10 |
| 71 | 5.63 |
| 72 | 0.31 |
| 73 | 4.05 |
| 74 | 0.38 |
| 75 | 5.01 |
| 76 | >111 |
| 77 | >333 |
| 78 | 128.95 |
| 79 | 0.75 |
| 80 | 0.65 |
| 81 | 13.71 |
| 82 | 0.25 |
| 83 | 0.23 |
| 84 | 1.92 |
| 85 | 4.12 |
| 86 | 1.06 |
| 87 | 4.02 |
| 88 | 8.48 |
| 89 | 0.60 |
| 90 | 0.54 |
| 91 | 0.54 |
| 92 | 3.62 |
| 93 | 0.77 |
| 94 | 3.86 |
| 95 | 0.20 |
| 96 | 0.37 |
| 97 | 3.26 |
| 98 | 3.80 |
| 99 | 1.12 |
| 100 | 3.48 |
| 101 | 0.96 |
| 102 | 9.46 |
| 103 | 0.50 |
| 104 | 0.61 |
| 105 | 3.97 |

As a result of the above-descried tests, a CTSC inhibitory effect is confirmed in some compounds of Formula (I). Therefore, the compound of Formula (I) can be used for a treatment of a neutrophil associated inflammatory disease. Examples of the neutrophil associated inflammatory disease include diseases such as rheumatoid arthritis, multiple sclerosis, cystic fibrosis (CF), non-cystic fibrosis, idiopathic pulmonary fibrosis, chronic obstructive pulmonary disease (COPD), bronchiectasis, asthma, chronic bronchitis, acute lung injury (ALI), acute respiratory distress syndrome (ARDS), alpha-1-antitrypsin deficiency (AATD), gastrointestinal inflammatory disease (inflammatory bowel disease, ulcerative colitis, and the like), glomerulonephritis, lupus nephritis, ANCA-related vasculitis (granulomatosis with polyangiitis (GPA), microscopic polyangiitis (MPA), and the like), hidradenitis suppurativa, palmoplantar pustulosis, chronic sinusitis, and neutrophil dermatosis (Sweet syndrome, Bechet's disease, and the like).

A pharmaceutical composition containing one or two or more kinds of the compound of Formula (I) or the salt thereof as an active ingredient can be prepared according to a commonly used method using a pharmaceutically acceptable excipient, that is, an excipient commonly used in the related art, for example, a pharmaceutical excipient or a pharmaceutical carrier.

An administration may be in either form of oral administration by tablets, pills, capsules, granules, powders, liquids, and the like or parenteral administration by injectables such as intra-articular, intravenous, and intramuscular, suppositories, eye drops, eye ointments, transdermal solutions, ointments, transdermal patches, transmucosal fluids, transmucosal patches, inhalants, and the like.

As a solid composition for the oral administration, tablets, powders, granules, or the like are used. In such solid compositions, one or two or more kinds of active ingredients are mixed with at least one inert excipient. The composition may contain inert additives, for example, lubricants or disintegrants, stabilizers, and solubilizers according to conventional methods. The tablets or pills may be sugar-coated or may be coated with a gastrosoluble or enteric-soluble film as necessary.

A liquid composition for the oral administration includes pharmaceutically acceptable emulsions, solutions, suspensions, syrups, elixirs, or the like, and includes a commonly used inert diluent such as purified water and ethanol. The liquid composition may contain auxiliary agents such as a solubilizer, a wetting agent, and a suspension, sweetening agents, flavoring agents, fragrance agents, or preservatives in addition to the inert diluent.

Injectables for the parenteral administration contain sterile aqueous or non-aqueous solutions, suspensions, or emulsions. The aqueous solvent includes, for example, distilled water for injection or saline. The non-aqueous solvent includes alcohols such as ethanol. Such a composition may further contain tonicity agents, preservatives, wetting agents, emulsifiers, dispersants, stabilizers, or solubilizers. These agents are sterilized, for example, by filtration through a bacterial retention filter, formulation of a fungicide, or irradiation. In addition, these agents can also be used to produce a sterile solid composition which is dissolved or suspended in sterile water or sterile injectable solvent prior to use.

In a case of normal oral administration, a daily applied dose is approximately 0.001 to 100 mg/kg with respect to body weight, and one aspect thereof is appropriately 0.01 to 30 mg/kg and another aspect thereof is appropriately 0.1 to 10 mg/kg. In addition, the administration is performed once or in 2 to 4 divided doses. In a case of intravenous administration, a daily applied dose can be approximately 0.0001 to 10 mg/kg with respect to body weight. In addition, the administration can be performed once to multiple times a day. In addition, with a transmucosal agent, approximately 0.001 to 100 mg/kg with respect to body weight can be administered once to multiple times a day. The applied dose is appropriately determined according to each individual case in consideration of symptoms, age, gender, and the like.

Although it depends on the route of administration, dosage form, site of administration, and types of excipients and additives, the pharmaceutical composition according to the present invention contains one or more compounds of Formula (I) or salts thereof, which are the active ingredient, in an amount of 0.010% to 100% by weight, and one aspect of the amount is 0.010% to 50% by weight.

The compound of Formula (I) can be used in combination with various therapeutic or prophylactic agents for diseases for which the above-described compound of Formula (I) is effective. The combined preparation may be administered simultaneously, separately and consecutively, or at desired time intervals. The preparations to be administered simultaneously may be a mixture, or may be prepared individually.

EXAMPLE

Hereinafter, the method for producing the compound of Formula (I) will be described based on Examples. The present invention is not limited to compounds described in Examples below. In addition, a method for producing a raw material compound is shown as Production Examples.

The method for producing the compound of Formula (I) is not limited to the production methods of Examples shown below, and the compound of Formula (I) can be produced by a combination of these production methods or a method which is obvious to those skilled in the art.

A concentration mol/L is expressed as M.

Production Example 1

Under a nitrogen atmosphere, cyclobutanecarbonitrile (33.8 g, 416 mmol) was added to a tetrahydrofuran (THF) solution (450 mL) of THF solution of 2.0 M diisopropylamide lithium (187 mL, 375 mmol), which had been cooled to −78° C., and the reaction solution was stirred for 30 minutes at the same temperature. A THF solution (50 mL) of (R)-2-(2,2-dimethyl-1,3-dioxolan-4-yl)acetaldehyde (30 g, 208 mmol) was added dropwise to the reaction solution, and the reaction solution was stirred at −78° C. for 45 minutes. A saturated aqueous solution of ammonium chloride was added to the reaction solution, and the mixture was slowly returned to room temperature and stirred for 15 minutes. The mixture was diluted with water and extracted with ethyl acetate. The organic layer was washed with saturated brine, dried over anhydrous sodium sulfate, and concentrated under reduced pressure. The residue was purified by silica gel column chromatography (20% ethyl acetate/petroleum ether) to obtain 1-(2-((R)-2,2-dimethyl-1,3-dioxolan-4-yl)-1-hydroxyethyl)cyclobutane-1-carbonitrile (15.5 g, 43%) as a liquid.

Production Example 2

Under a nitrogen atmosphere, benzyl bromide (15.94 g, 93 mmol) and then a N,N-dimethylformamide (DMF) solution (50 mL) of 1-(2-((R)-2,2-dimethyl-1,3-dioxolan-4-yl)-1-hydroxyethyl)cyclobutane-1-carbonitrile (21 g, 93 mmol) were sequentially added to a DMF suspension (300 mL) of sodium hydride (60%, 3.73 g, 93 mmol), which had been cooled to 0° C. The reaction mixture was slowly returned to room temperature, and stirred for 3 hours. After cooling the reaction mixture to 10° C., a saturated aqueous solution of ammonium chloride was added thereto. The organic layer was extracted with ethyl acetate and washed with 10% aqueous solution of sodium hydrogen carbonate and saturated brine. The organic layer was dried over anhydrous sodium sulfate, and concentrated under reduced pressure. The residue was purified by silica gel column chromatography (15% ethyl acetate/petroleum ether) to obtain 1-(1-(benzyloxy)-2-((R)-2,2-dimethyl-1,3-dioxolan-4-yl)ethyl)cyclobutane-1-carbonitrile (25.0 g, 84%) as a liquid.

Production Example 3

Under a nitrogen atmosphere, a THF solution (350 mL) of 1-(1-(benzyloxy)-2-((R)-2,2-dimethyl-1,3-dioxolan-4-yl)ethyl)cyclobutane-1-carbonitrile (35 g, 111 mmol) was cooled to 0° C., and after adding sodium bis(2-methoxyethoxy) aluminum hydride (Red-Al) (60% toluene solution, 131 mL, 388 mmol), the mixture was slowly returned to room temperature and stirred at room temperature for 3 hours. After cooling the reaction solution to 0° C., sodium sulfate decahydrate (110.0 g) was gradually added thereto. The mixture was returned to room temperature and stirred for 15 minutes. The mixture was filtered through cerite, and the solid was washed with ethyl acetate. The collected filtrate was concentrated under reduced pressure.

THF (700 mL) was added to the obtained residue, the mixture was cooled to 0° C., and under a nitrogen atmosphere, diisopropylethylamine (DIPEA) (23.60 mL, 131 mmol) and 2-nitrobenzenesulfonyl chloride (29.1 g, 131 mmol) were sequentially added thereto. The reaction mixture was returned to room temperature and stirred for 2 hours. A 10% aqueous solution of sodium hydrogen carbonate was added to the reaction mixture, and the mixture was extracted with ethyl acetate. The organic layer was washed with saturated brine, dried over anhydrous sodium sulfate, and concentrated under reduced pressure.

THF (250 mL) and hydrochloric acid (1.5 N, 250 mL, 375 mmol) were added to the obtained residue under a nitrogen atmosphere at room temperature, and the mixture was stirred for 16 hours. Water (250 mL) was added to the reaction solution, and the mixture was extracted with ethyl acetate. The organic layer was washed with saturated aqueous solution of sodium hydrogen carbonate and saturated brine. After drying over anhydrous sodium sulfate and concentrating under reduced pressure, the residue was purified by silica gel column chromatography (60% ethyl acetate/petroleum ether) to obtain N-((1-((3R)-1-(benzyloxy)-3,4-dihydroxybutyl)cyclobutyl)methyl)-2-nitrobenzene sulfonamide (34.1 g, 66%) as a liquid.

Production Example 4

Under a nitrogen atmosphere, imidazole (5.00 g, 73.4 mmol) and tert-butyldimethylchlorosilane (11.06 g, 73.4 mmol) were sequentially added to a dichloromethane (DCM) solution (400 mL) of N-((1-((3R)-1-(benzyloxy)-3,4-dihydroxybutyl)cyclobutyl)methyl)-2-nitrobenzene sulfonamide (34.1 g, 73.4 mmol), which had been cooled to 0° C., and the reaction solution was returned to room temperature and stirred for 12 hours. Ice-cold water (300 mL) was added to the reaction solution, and the mixture was extracted with DCM. The organic layer was washed with saturated brine, and after drying over anhydrous sodium sulfate and concentrating under reduced pressure, the residue was purified by silica gel column chromatography (20% ethyl acetate/petroleum ether) to obtain N-((1-((3R)-1-(benzyloxy)-4-((tert-butyldimethylsilyl)oxy)-3-hydroxybutyl)cyclobutyl)methyl)-2-nitrobenzene sulfonamide (39.0 g, 91%) as a liquid.

Production Example 5

Under a nitrogen atmosphere, diethyl azodicarboxylate (16.0 mL, 101 mmol) was added to a THF solution (400 mL) of N-((1-((3R)-1-(benzyloxy)-4-((tert-butyldimethylsilyl)oxy)-3-hydroxybutyl)cyclobutyl)methyl)-2-nitrobenzene sulfonamide (39.0 g, 67.4 mmol) and triphenylphosphine (26.5 g, 101 mmol), which had been cooled to 0° C., and the reaction solution was returned to room temperature and stirred for 3 hours.

Ice-cold water (300 mL) was added to the reaction solution, and the mixture was extracted with ethyl acetate. The organic layer was washed with saturated brine, and after drying over anhydrous sodium sulfate and concentrating under reduced pressure, the residue was purified by silica gel column chromatography (15% ethyl acetate/petroleum ether) to obtain (7S)-9-(benzyloxy)-7-(((tert-butyldimethylsilyl)oxy)methyl)-6-((2-nitrophenyl)sulfonyl)-6-azaspiro[3.5]nonane (36 g, 95%) as a liquid.

Production Example 6

Under a nitrogen atmosphere, thioglycolic acid (8.96 mL, 128 mmol) and lithium hydroxide monohydrate (10.78 g, 257 mmol) were added to a DMF solution (300 mL) of (7S)-9-(benzyloxy)-7-(((tert-butyldimethylsilyl)oxy)methyl)-6-((2-nitrophenyl)sulfonyl)-6-azaspiro[3.5]nonane (36 g, 64.2 mmol), which had been cooled to 0° C., and the reaction mixture was returned to room temperature and stirred for 3 hours. Ice-cold water was added to the reaction mixture, and the mixture was extracted with ethyl acetate. The organic layer was washed with ice-cold water and then saturated brine, dried over anhydrous sodium sulfate, and concentrated under reduced pressure.

After adding DCM (200 mL) to the residue under a nitrogen atmosphere, di-tert-butyl dicarbonate (16.8 mL, 72.7 mmol), triethylamine (11.69 mL, 84 mmol), and 4-dimethylaminopyridine (0.683 g, 5.59 mmol) were added thereto, and the reaction mixture was stirred at room temperature for 16 hours. Water (250 mL) was added to the reaction mixture, and the mixture was extracted with DCM. The organic layer was washed with saturated brine, and after drying over anhydrous sodium sulfate and concentrating under reduced pressure, the residue was purified by silica gel column chromatography (15% ethyl acetate/petroleum ether) to obtain tert-butyl (7S)-9-(benzyloxy)-7-(((tert-butyldimethylsilyl)oxy)methyl)-6-azaspiro[3.5]nonane-6-carboxylate (22 g, 72%) as a liquid.

Production Example 7

20% palladium hydroxide/carbon (3.25 g) was added to a methanol solution (250 mL) of tert-butyl (7S)-9-(benzyloxy)-7-(((tert-butyldimethylsilyl)oxy)methyl)-6-azaspiro[3.5]nonane-6-carboxylate (22 g, 46.2 mmol), and the reaction mixture was stirred at room temperature for 16 hours under a hydrogen atmosphere of 1 atm. The reaction mixture was filtered through cerite, the solid was washed with methanol (200 mL), and the filtrate was concentrated under reduced pressure.

DCM (200 mL) was added to the obtained residue, and after cooling to 0° C., imidazole (3.45 g, 50.8 mmol) and tert-butyldimethylchlorosilane (7.6 g, 50.8 mmol) were sequentially added thereto. Thereafter, the reaction solution was returned to room temperature and stirred for 12 hours. Ice-cold water (300 mL) was added to the reaction solution, and the mixture was extracted with DCM. The organic layer was washed with saturated brine, and after drying over anhydrous sodium sulfate and concentrating under reduced pressure, the residue was purified by silica gel column chromatography (30% ethyl acetate/petroleum ether) to obtain tert-butyl (7S)-7-(((tert-butyldimethylsilyl)oxy)methyl)-9-hydroxy-6-azaspiro[3.5]nonane-6-carboxylate (14.5 g, 810%) as a liquid.

Production Example 8

Under a nitrogen atmosphere, Dess-Martin periodinane (19.96 g, 47.1 mmol) was added to a DCM solution (250 mL) of tert-butyl (7S)-7-(((tert-butyldimethylsilyl)oxy)methyl)-9-hydroxy-6-azaspiro[3.5]nonane-6-carboxylate (16.5 g, 42.8 mmol), and the reaction mixture was stirred at room temperature for 3 hours. A saturated aqueous solution (100 mL) of sodium hydrogen carbonate was added to the reaction mixture, and the reaction mixture was stirred for 15 minutes. The reaction mixture was extracted with DCM, the organic layer was washed with saturated brine, and after drying over anhydrous sodium sulfate and concentrating under reduced pressure, the residue was purified by silica gel column chromatography (30% ethyl acetate/petroleum ether) to obtain tert-butyl (S)-7-(((tert-butyldimethylsilyl)oxy)methyl)-9-oxo-6-azaspiro[3.5]nonane-6-carboxylate (15.3 g, 93%) as a liquid.

Production Example 9

Under a nitrogen atmosphere, a cerium chloride heptahydrate (19.44 g, 52.2 mmol) was added to a methanol solution (40 mL) of tert-butyl (S)-7-(((tert-butyldimethylsilyl)oxy)

methyl)-9-oxo-6-azaspiro[3.5]nonane-6-carboxylate (15.3 g, 40.0 mmol), and the reaction mixture was cooled to −78° C. Sodium borohydride (1.823 g, 48.2 mmol) was gradually added to the reaction mixture, the reaction mixture was stirred at −78° C. for 1 hour, and after gradually heating to 0° C., the reaction mixture was stirred for 30 minutes. A 10% aqueous solution (50 mL) of citric acid was added to the reaction mixture, and the mixture was extracted with DCM. The organic layer was washed with saturated brine, dried over anhydrous sodium sulfate, and concentrated under reduced pressure. THF (40 mL) was added to the obtained residue under a nitrogen atmosphere, a THF solution of tetrabutylammonium fluoride (1.0 M, 78 mL, 78 mmol) was added thereto, and the mixture was stirred at room temperature for 12 hours. Ice-cold water (100 mL) was added to the reaction solution, and the mixture was extracted with ethyl acetate. The organic layer was washed with saturated brine, and after drying over anhydrous sodium sulfate and concentrating under reduced pressure, the residue was purified by silica gel column chromatography (30% ethyl acetate/petroleum ether) to obtain tert-butyl (7S,9R)-9-hydroxy-7-(hydroxymethyl)-6-azaspiro[3.5]nonane-6-carboxylate (9.2 g, 84%) as a gum-like solid.

Production Example 10

Under a nitrogen atmosphere, a 1.0 M phosphate buffer ($Na_2HPO_4$:$NaH_2PO_4$=1:1, 11 mL) was added to an acetonitrile solution (20 mL) of tert-butyl (7S,9R)-9-hydroxy-7-(hydroxymethyl)-6-azaspiro[3.5]nonane-6-carboxylate (2.0 g, 7.37 mmol). Sodium chlorite (2.466 g, 27.3 mmol) and 2-hydroxy-2-azaadamantane (0.113 g, 0.737 mmol) were added to the mixture, and the reaction mixture was stirred at room temperature for 16 hours. 2-Methyl-2-butene (4.0 mL) was added to the reaction mixture, and the mixture was stirred for 30 minutes. A 10% aqueous solution of sodium hydrogen carbonate was added to the mixture, and the mixture was extracted with DCM. The aqueous layer was extracted with DCM by adding 1.5 M hydrochloric acid to pH 2. The combined organic layer was washed with saturated brine, and the resultant was dried over anhydrous sodium sulfate and concentrated under reduced pressure to obtain (7S,9R)-6-(tert-butoxycarbonyl)-9-hydroxy-6-azaspiro[3.5]nonane-7-carboxylic acid (1.91 g, 84%) as a white solid.

Production Example 11

Under a nitrogen atmosphere, potassium tert-butoxide (39.27 g, 0.350 mol) was added to a dimethylsulfoxide (DMSO) solution (850 mL) of trimethylsulfoxonium iodide (77.18 g, 0.350 mol), which had been ice-cooled, and the reaction mixture was gradually returned to room temperature and stirred for 1 hour. The reaction mixture was cooled to 10° C., benzyl (S)-2-(((tert-butyldimethylsilyl)oxy)methyl)-5-oxopyrrolidine-1-carboxylate (85 g, 0.233 mol) was added thereto little by little, and the reaction mixture was returned to room temperature and stirred for 1 hour. Ice-cold water (400 mL) was added to the reaction mixture, and the mixture was extracted with ethyl acetate. The organic layer was washed with saturated brine, and after drying over anhydrous sodium sulfate and concentrating under reduced pressure, the residue was purified by silica gel column chromatography (85% ethyl acetate/petroleum ether) to obtain benzyl (S)-(1-(((tert-butyldimethylsilyl)oxy)-6-(dimethyl(oxo)-6-sulfaneylidene)-5-oxohexan-2-yl)carbamate (57 g, 53%) as a reddish brown liquid.

Production Example 12

Under a nitrogen atmosphere, a toluene solution (700 mL) of benzyl (S)-(1-((tert-butyldimethylsilyl)oxy)-6-(dimethyl(oxo)-6-sulfaneylidene)-5-oxohexan-2-yl)carbamate (57 g, 0.127 mol) was degassed for 15 minutes, and an iridium (I) chloride 1,5-cyclooctadiene complex dimer (0.840 g, 0.00125 mol) was added thereto. The reaction mixture was stirred at 80° C. for 2 hours, cooled to room temperature, and concentrated under reduced pressure. Ice-cold water (200 mL) was added to the obtained residue, and the mixture was extracted with ethyl acetate. The organic layer was washed with saturated brine, and after drying over anhydrous sodium sulfate and concentrating under reduced pressure, the residue was purified by silica gel column chromatography (15% ethyl acetate/petroleum ether) to obtain benzyl (S)-2-(((tert-butyldimethylsilyl)oxy)methyl)-5-oxopiperidine-1-carboxylate (26 g, 55%) as a colorless liquid.

Production Example 13

Under a nitrogen atmosphere, potassium tert-butoxide (19.79 g, 0.1619 mol) was added to a tert-butyl alcohol solution (300 mL) of trimethylsulfoxonium iodide (35.64 g, 0.1619 mol), which had been heated to 50° C., and the reaction mixture was stirred for 1 hour. The reaction mixture was cooled to room temperature, and a tert-butyl alcohol solution (100 mL) of benzyl (S)-2-(((tert-butyldimethylsilyl)oxy)methyl)-5-oxopiperidine-1-carboxylate (26 g, 0.0689 mol) was added dropwise thereto. The reaction mixture was heated to 50° C. and stirred for 16 hours. The reaction solution was cooled to room temperature, ice-cold water (200 mL) was added thereto, and the mixture was extracted with ethyl acetate. The organic layer was washed with saturated brine, and after drying over anhydrous sodium sulfate and concentrating under reduced pressure, the residue was purified by silica gel column chromatography (15% ethyl acetate/petroleum ether) to obtain benzyl (4R,7S)-7-(((tert-butyldimethylsilyl)oxy)methyl)-1-oxa-6-azaspiro[3.5]nonane-6-carboxylate (8.0 g, 0.068 mol, 28%, low polar fraction, Production Example 13) as a light brown liquid and benzyl (4S,7S)-7-(((tert-butyldimethylsilyl)oxy)methyl)-1-oxa-6-azaspiro[3.5]nonane-6-carboxylate (3.8 g, 13%, high polar fraction) as a light brown liquid, respectively.

Production Example 15

10% Palladium/carbon (2.0 g) was added to an ethanol solution (80 mL) of (4R,7S)-7-(hydroxymethyl)-1-oxa-6-azaspiro[3.5]nonane-6-carboxylic acid benzyl ester (4.5 g, 15.4 mmol), and the mixture was stirred at room temperature for 8 hours under a hydrogen atmosphere of 1 atm. The solid was removed by filtration through cerite, and the filtrate was concentrated under reduced pressure to obtain ((4R,7S)-1-oxa-6-azaspiro[3.5]nonan-7-yl)methanol (2.4 g).

Production Example 16

1,4-Dioxane (25 mL) and water (40 mL) were added to ((4R,7S)-1-oxa-6-azaspiro[3.5]nonan-7-yl)methanol (2.4 g), the mixture was ice-cooled, and sodium hydrogen carbonate (3.07 g, 36.4 mmol) and 9-fluorenylmethyl chloroformate (3.93 g, 15.2 mmol) were sequentially added thereto. The reaction mixture was heated to room temperature, and stirred for 1 hour. Water was added to the reaction solution, and the mixture was extracted with ethyl acetate. The organic layer was washed with saturated brine, and after drying over anhydrous sodium sulfate and concentrating under reduced pressure, the residue was purified by silica gel column chromatography (25% ethyl acetate/petroleum ether) to obtain (9H-fluoren-9-yl)methyl (4R,7S)-7-(hydroxymethyl)-1-oxa-6-azaspiro[3.5]nonane-6-carboxylate (5.0 g, 86%) as a colorless liquid.

Production Example 18

Under a nitrogen atmosphere, a DCM solution (100 mL) of 1-ethyl-3-(3-dimethylaminopropyl)carbodiimide hydrochloride (12.93 g, 67.5 mmol) was added to a DCM solution (225 mL) of (S)-3-((tert-butoxycarbonyl)amino)-4-((tert-butyldimethylsilyl)oxy)butanoic acid (15 g, 45.0 mmol), 4-dimethylaminopyridine (8.24 g, 67.5 mmol), and 2,2-dimethyl-1,3-dioxane-4,6-dione (6.48 g, 45.0 mmol), which had been cooled to 0° C., and the reaction solution was stirred at room temperature for 3 hours. Water was added to the reaction solution, and the solution was separated. The organic layer was washed successively with 10% aqueous solution of sodium hydrogen sulfate, water, and saturated brine, dried over anhydrous sodium sulfate, and concentrated under reduced pressure. The residue was dissolved in ethyl acetate, and stirred at 80° C. for 4 hours under a nitrogen atmosphere. After concentrating under reduced pressure, the residue was purified by silica gel column chromatography (15% to 20% ethyl acetate/petroleum ether) to obtain tert-butyl (S)-2-(((tert-butyldimethylsilyl)oxy)methyl)-4,6-dioxopiperidine-1-carboxylate (12 g, 33.6 mmol, 74.6%).

Production Example 19

Under a nitrogen atmosphere, methyl iodide (9.93 g, 69.9 mmol) was added to a DMF mixture (100 mL) of tert-butyl (S)-2-(((tert-butyldimethylsilyl)oxy)methyl)-4,6-dioxopiperidine-1-carboxylate (10 g, 28 mmol) and potassium carbonate (11.6 g, 84 mmol), which had been cooled to 0° C., and the reaction solution was stirred for 15 minutes. Water was added to the reaction solution, and the mixture was extracted with ethyl acetate. The organic layer was washed with water and saturated brine, dried over anhydrous sodium sulfate, and concentrated under reduced pressure. The residue was purified by silica gel column chromatography (5% to 10% ethyl acetate/petroleum ether) to obtain tert-butyl (S)-6-(((tert-butyldimethylsilyl)oxy)methyl)-3,3-dimethyl-2,4-dioxopiperidine-1-carboxylate (6.8 g, 17.64 mmol, 63.1%) as a colorless liquid.

Production Example 20

Under a nitrogen atmosphere, a borane dimethyl sulfide complex (12.97 mL, 130 mmol) was added to a tetrahydrofuran solution (100 mL) of tert-butyl (S)-6-(((tert-butyldimethylsilyl)oxy)methyl)-3,3-dimethyl-2,4-dioxopiperidine-1-carboxylate (10 g, 25.9 mmol), which had been cooled to 0° C., and the reaction solution was stirred at room temperature for 24 hours. The reaction solution was cooled to 0° C., and methanol (150 mL) was added thereto to terminate the reaction. The reaction solution was concentrated under reduced pressure, and the residue was diluted with ethyl acetate and washed with water and saturated brine. The organic layer was dried over anhydrous sodium sulfate and concentrated under reduced pressure to obtain tert-butyl (2S)-2-(((tert-butyldimethylsilyl)oxy)methyl)-4-hydroxy-5,5-dimethylpiperidine-1-carboxylate (9.5 g, 15.41 mmol, 59.4%).

Production Example 24

Under a nitrogen atmosphere, a THF solution (30 mL) of benzyl (S)-2-(((tert-butyldimethylsilyl)oxy)methyl)-5-oxopiperidine-1-carboxylate (3 g, 7.95 mmol) was cooled to −78° C., a methyl magnesium bromide-diethyl ether solution (3.0 M, 7.95 mL, 23.84 mmol) was added dropwise thereto, and the reaction mixture was stirred at room temperature for 12 hours. A saturated aqueous solution of ammonium chloride was added to the reaction mixture, and the mixture was extracted with ethyl acetate. The organic layer was washed with water and saturated brine, dried over anhydrous sodium sulfate, and concentrated under reduced pressure. The residue was purified by silica gel column chromatography (50% ethyl acetate/petroleum ether) to obtain benzyl (2S)-2-(((tert-butyldimethylsilyl)oxy)methyl)-5-hydroxy-5-methylpiperidine-1-carboxylate (600 mg, 1.524 mmol, 19.18%).

Production Example 27

Under a nitrogen atmosphere, a THF solution (2 mL) of tert-butyl (2S)-2-(((tert-butyldimethylsilyl)oxy)methyl)-5-hydroxy-5-methylpiperidine-1-carboxylate (200 mg, 0.556 mmol) was cooled to 0° C., and each of acetic acid (167 mg, 2.78 mmol) and a THF solution of tetrabutylammonium fluoride (1 M, 1.112 mL, 1.112 mmol) was added dropwise thereto. The reaction solution was stirred at room temperature for 12 hours, diluted with water, and extracted with methyl tert-butyl ether. The organic layer was dried over anhydrous sodium sulfate, and concentrated under reduced pressure. The residue was purified by silica gel column chromatography (60% to 70% ethyl acetate/petroleum ether) to obtain tert-butyl (2S)-5-hydroxy-2-(hydroxymethyl)-5-methylpiperidine-1-carboxylate (83.5 mg, 0.339 mmol, 60.9%) as a colorless gum-like substance.

Production Example 29

Under a nitrogen atmosphere, DMF (200 mL) was added to 1-(tert-butoxycarbonyl)-4-isopropylpiperidine-4-carboxylic acid (34 g, 125 mmol) and (Z)-3,3-difluoro-N'-hydroxycyclobutane-1-carboxyimideamide (18.81 g, 125 mmol), and the mixture was cooled to 0° C. Thereafter, DIPEA (43.8 mL, 251 mmol) and 1-[bis(dimethylamino)methylene]-1H-1,2,3-triazolo[4,5-b]pyridinium 3-oxide hexafluorophosphate (HATU) (52.4 g, 138 mmol) were added thereto, and the reaction solution was stirred at room temperature for 12 hours. The reaction solution was concentrated under reduced pressure, ethyl acetate was added thereto, and the mixture was washed with water and saturated brine. The organic layer was concentrated under reduced pressure, and the residue was purified by silica gel column chromatography (35% to 45% ethyl acetate/petroleum ether) to obtain tert-butyl (Z)-4-((((amino(3,3-difluorocyclobutyl)methylene)amino)oxy)carbonyl)-4-isopropylpiperidine-1-carboxylate (31 g, 61.3%) as a white solid.

Production Example 30

Under a nitrogen atmosphere, potassium hydroxide (7.93 g, 141 mmol) was added to a DMSO solution (340 mL) of tert-butyl (Z)-4-((((amino(3,3-difluorocyclobutyl)methylene)amino)oxy)carbonyl)-4-isopropylpiperidine-1-carboxylate (57 g, 141 mmol) at room temperature, and the reaction solution was stirred for 12 hours. After adding cooling water to the reaction solution and extracting with petroleum ether, the organic layer was washed with water. The organic layer was concentrated under reduced pressure to obtain tert-butyl 4-(3-(3,3-difluorocyclobutyl)-1,2,4-oxadiazol-5-yl)-4-isopropylpiperidine-1-carboxylate (44 g, 80%) as an off-white solid.

Production Example 31

Under a nitrogen atmosphere, a 4M hydrogen chloride 1,4-dioxane solution (114 mL, 457 mmol) was added to a DCM solution (225 mL) of tert-butyl 4-(3-(3,3-difluorocyclobutyl)-1,2,4-oxadiazol-5-yl)-4-isopropylpiperidine-1-carboxylate (44 g, 114 mmol), which had been cooled to 0° C., and the reaction solution was stirred at room temperature for 3 hours. The reaction solution was concentrated under reduced pressure, DCM was added to the residue, and the mixture was concentrated again under reduced pressure. After repeating this operation 3 times, tert-butyl methyl ether was added to the residue for trituration. The solid was collected by filtration and dried to obtain 3-(3,3-difluorocyclobutyl)-5-(4-isopropylpiperidin-4-yl)-1,2,4-oxadiazole hydrochloride (32.5 g, 88%) as an off-white solid.

Production Example 32

Under a nitrogen atmosphere, DCM (120 mL) was added to 3-(3,3-difluorocyclobutyl)-5-(4-isopropylpiperidin-4-yl)-1,2,4-oxadiazole hydrochloride (22.56 g, 70.1 mmol), and the mixture was cooled to 0° C. Thereafter, DIPEA (24.5 mL, 140.3 mmol), (7S,9R)-6-(tert-butoxycarbonyl)-9-hydroxy-6-azaspiro[3.5]nonane-7-carboxylic acid (20 g, 70.1 mmol), and HATU (31.98 g, 84.12 mmol) were sequentially added thereto, and the reaction mixture was stirred at room temperature for 2 hours. The reaction mixture was concentrated under reduced pressure, ethyl acetate was added to the residue, and the mixture was washed with 10% aqueous solution of sodium hydrogen carbonate and saturated brine. The organic layer was concentrated under reduced pressure, and the residue was purified by silica gel column chromatography (30% to 35% ethyl acetate/petroleum ether) to obtain tert-butyl (7S,9R)-7-(4-(3-(3,3-difluorocyclobutyl)-1,2,4-oxadiazol-5-yl)-4-isopropylpiperidine-1-carbonyl)-9-hydroxy-6-azaspiro[3.5]nonane-6-carboxylate (29 g, 74%) as an off-white solid.

Production Example 37

Under a nitrogen atmosphere, a hydroxylamine aqueous solution (50%, 150 mL, 180 mmol) was added to an ethanol solution (500 mL) of tert-butyl 4-cyano-4-(trifluoromethyl)piperidine-1-carboxylate (50 g, 180 mmol) at room temperature, and the reaction solution was heated to 80° C. and stirred for 16 hours. The reaction solution was cooled to 10° C. and stirred for 1 hour. The precipitated solid was collected by filtration and washed with water to obtain tert-butyl (Z)-4-(N'-hydroxycarbamimidoyl)-4-(trifluoromethyl)piperidine-1-carboxylate (50 g, 89%) as an off-white solid.

Production Example 39

Under a nitrogen atmosphere, a dioxane solution (500 mL) of tert-butyl (Z)-4-(N'-((3,3-difluorocyclobutane-1-carbonyl)oxy) carbamimidoyl)-4-(trifluoromethyl)piperidine-1-carboxylate (66 g, 154 mmol) was stirred at 110° C. for 16 hours. The reaction solution was concentrated under reduced pressure, and the residue was purified by silica gel column chromatography (20% ethyl acetate/petroleum ether) to obtain tert-butyl 4-(5-(3,3-difluorocyclobutyl)-1,2,4-oxadiazol-3-yl)-4-(trifluoromethyl)piperidine-1-carboxylate (60 g, 95%) as an off-white solid.

Production Example 42

Under a nitrogen atmosphere, a sodium hydrosulfide hydrate (240 mg, 3.23 mmol) was added to a mixture of tert-butyl 4-cyano-4-(trifluoromethyl)piperidine-1-carboxylate (200 mg, 0.719 mmol), ammonium chloride (173 mg, 3.23 mmol), and DMF (5 mL), and the reaction mixture was stirred at room temperature for 16 hours. Water was added to the reaction mixture, and the mixture was extracted with ethyl acetate. The organic layer was washed with water and saturated brine, and after drying over anhydrous sodium sulfate and concentrating under reduced pressure, the residue was purified by silica gel column chromatography (ethyl acetate) to obtain tert-butyl 4-carbamothioyl-4-(trifluoromethyl)piperidine-1-carboxylate (170 mg, 0.537 mmol, 74.7%) as a pale yellow solid.

Production Example 43

A mixture of tert-butyl 4-carbamothioyl-4-(trifluoromethyl)piperidine-1-carboxylate (270 mg, 0.864 mmol), 2-bromo-1-(4,4-difluorocyclohexyl)ethane-1-one (208 mg, 0.864 mmol), DIPEA (0.453 mL, 2.59 mmol), and THF (2 mL) was heated in a shielded tube at 80° C. for 16 hours. The reaction mixture was concentrated under reduced pressure, and the residue was purified by silica gel column chromatography (20% ethyl acetate/petroleum ether) to obtain tert-butyl 4-(4-(4,4-difluorocyclohexyl)-4-hydroxy-4,5-dihydrothiazol-2-yl)-4-(trifluoromethyl)piperidine-1-carboxylate (260 mg, 0.550 mmol, 63.7%) as a brown gum-like solid.

Production Example 44

Under a nitrogen atmosphere, a mixture of tert-butyl 4-(4-(4,4-difluorocyclohexyl)-4-hydroxy-4,5-dihydrothiazol-2-yl)-4-(trifluoromethyl)piperidine-1-carboxylate (250 mg, 0.529 mmol), p-toluenesulfonic acid monohydrate (101 mg, 0.529 mmol), and toluene (5.0 mL) was stirred at 110° C. for 16 hours. The reaction mixture was concentrated under reduced pressure, and the residue was purified by silica gel column chromatography (10% methanol/DCM) to obtain 4-(4,4-difluorocyclohexyl)-2-(4-(trifluoromethyl)piperidin-4-yl)thiazole (140 mg, 0.395 mmol, 74.7%) as a yellow solid.

Production Example 45

Under a nitrogen atmosphere, DIPEA (0.138 mL, 0.790 mmol) and (1-cyano-2-ethoxy-2-oxoethylidenaminooxy)dimethylamino-morpholino-carbenium hexafluorophosphate (COMU) (254 mg, 0.593 mmol) were sequentially added to a DCM solution (15 mL) of (4R,7S)-6-(((9H-fluoren-9-yl)methoxy)carbonyl)-1-oxa-6-azaspiro[3.5]nonane-7-carboxylic acid (155 mg, 0.395 mmol), which had been ice-cooled, and the mixture was stirred for 15 minutes. Thereafter, 4-(4,4-difluorocyclohexyl)-2-(4-(trifluoromethyl)piperidin-4-yl)thiazole (140 mg, 0.395 mmol) was added thereto, and the reaction mixture was stirred at room temperature for 3 hours. The reaction mixture was concentrated under reduced pressure, and the residue was diluted with ethyl acetate and washed with water and saturated brine. The organic layer was dried over anhydrous sodium sulfate and concentrated under reduced pressure, and the residue was purified by silica gel column chromatography (55% ethyl acetate/petroleum ether) to obtain (9H-fluoren-9-yl)methyl (4R,7S)-7-(4-(4-(4,4-difluorocyclohexyl)thiazol-2-yl)-4-(trifluoromethyl)piperidine-1-carbonyl)-1-oxa-6-azaspiro[3.5]nonane-6-carboxylate (200 mg, 0.274 mmol, 69.4%) as a light brown solid.

Production Example 46

A DCM solution (20 mL) of 3,3-difluorocyclobutane-1-carboxylic acid (0.801 g, 5.89 mmol) and DIPEA (2.57 mL, 14.72 mmol) was cooled to 0° C., HATU (2.425 g, 6.38 mmol) and tert-butyl (Z)-4-(N'-hydroxycarbamimidoyl)-4-isopropylpiperidine-1-carboxylate (2.0 g, 4.91 mmol) were added thereto, and the reaction solution was stirred at room temperature for 16 hours. The reaction solution was concentrated under reduced pressure, ethyl acetate was added to the residue, and the mixture was washed with water and saturated brine. The organic layer was dried over anhydrous sodium sulfate and concentrated under reduced pressure, and the residue was purified by silica gel column chromatography (ethyl acetate). The obtained product was dissolved in dioxane (15.0 mL) and stirred at 150° C. for 1 hour under microwave (MW) irradiation. The solvent was distilled under reduced pressure to obtain tert-butyl 4-(5-(3,3-difluorocyclobutyl)-1,2,4-oxadiazol-3-yl)-4-isopropylpiperidine-1-carboxylate (1.1 g, 2.85 mmol, 96%) as an off-white solid.

Production Example 52

Under a nitrogen atmosphere, DCM (10 mL) was added to 1-(tert-butoxycarbonyl)-4-(trifluoromethyl)piperidine-4-carboxylic acid (170 mg, 0.571 mmol) and (4,4-difluorohexyl)methaneamine hydrochloride (106 mg, 0.571 mmol), and the mixture was cooled to 0° C. Thereafter, DIPEA (1.20 mL, 1.143 mmol), 1-ethyl-3-(3-dimethylaminopropyl) carbodiimide hydrochloride (142.5 mg, 0.743 mmol), and 1-hydroxybenzotriazole (100.5 mg, 0.743 mmol) were sequentially added thereto. The reaction mixture was stirred at room temperature for 5 hours, and water was added thereto to separate the organic layer and the aqueous layer. The organic layer was dried over anhydrous sodium sulfate and concentrated under reduced pressure, and the residue was purified by silica gel column chromatography (60% to 70% ethyl acetate/petroleum ether) to obtain tert-butyl 4-(((4,4-difluorohexyl)methyl)carbamoyl)-4-(trifluoromethyl)piperidine-1-carboxylate (170 mg, 0.396 mmol, 70.8%) as a white solid.

Production Example 54

Under a nitrogen atmosphere, lithium bis(trimethylsilyl)amide (LHMDS) (1M, THF solution, 3.313 g, 19.8 mmol) was slowly added dropwise to a THF solution (15 mL) of tert-butyl 3-cyanoazetidine-1-carboxylate (3 g, 16.5 mmol), which had been cooled to −78° C. After stirring the reaction mixture at −78° C. for 30 minutes, a THF solution (15 mL) of isopropyl iodide (3.28 g, 19.8 mmol) was slowly added dropwise thereto, and the reaction mixture was stirred at the same temperature for 2 hours and then stirred at room temperature for 1 hour. A saturated aqueous solution of ammonium chloride was added to the reaction mixture, and the mixture was extracted with ethyl acetate. The organic layer was dried over anhydrous sodium sulfate, and concentrated under reduced pressure. The residue was purified by silica gel column chromatography (10% ethyl acetate/petroleum ether) to obtain tert-butyl 3-cyano-3-isopropylazetidine-1-carboxylate (1.8 g, 8.02 mmol, 48.6%).

Production Example 55

Under a nitrogen atmosphere, hydroxylamine hydrochloride (62 mg, 0.89 mmol) and triethylamine (0.2 mL, 1.34 mmol) were added to an ethanol solution (2 mL) of tert-butyl 3-cyano-3-isopropylazetidine-1-carboxylate (100 mg, 0.44 mmol), and the reaction mixture was heated to 80° C. and stirred for 16 hours. The reaction mixture was concentrated under reduced pressure, water was added to the residue, and the mixture was extracted with DCM. The organic layer was dried over anhydrous sodium sulfate and concentrated under reduced pressure to obtain tert-butyl (Z)-3-(N'-hydroxycarbamimidoyl)-3-isopropylazetidine-1-carboxylate (100 mg, 0.39 mmol).

Production Example 59

Under a nitrogen atmosphere, sodium hydride (60%, 105 mg, 2.6 mmol) was added to a DMF solution (10 mL) of tert-butyl 4-(((4,4-difluorohexyl)methyl)carbamoyl)-4-(trifluoromethyl)piperidine-1-carboxylate (700 mg, 1.7 mmol), which had been cooled to 0° C., and the reaction mixture was stirred for 10 minutes. Methyl iodide (0.23 mL, 3.4 mmol) was added to the reaction mixture, and the reaction mixture was stirred at room temperature for 3 hours. A saturated aqueous solution of ammonium chloride was added to the reaction mixture, and the mixture was extracted with ethyl acetate. The organic layer was dried over anhydrous sodium sulfate and concentrated under reduced pressure, and the residue was purified by silica gel column chromatography (40% ethyl acetate/petroleum ether) to obtain tert-butyl 4-(((4,4-difluorohexyl)methyl)(methyl)carbamoyl)-4-(trifluoromethyl)piperidine-1-carboxylate (600 mg, 80%) as an off-white solid.

Production Example 75

A mixture of tert-butyl 4-(2-(4,4-difluorocyclohexane-1-carbonyl)hydrazine-1-carbonyl)-4-isopropylpiperidine-1-carboxylate (0.55 g, 1.275 mmol) and phosphoryl chloride (3 mL, 1.275 mmol) was heated in a shielded tube at 100° C. for 48 hours. The reaction mixture was concentrated under reduced pressure, and the residue was diluted with ethyl acetate and washed successively with 10% aqueous solution of sodium hydrogen carbonate, water, and saturated brine. Thereafter, the organic layer was dried over anhydrous sodium sulfate and concentrated under reduced pressure. The residue was purified by silica gel column chromatography (2% to 3% methanol/DCM) to obtain 2-(4,4-difluorocyclohexane)-5-(4-isopropylpiperidin-4-yl)-1,3,4-oxadiazole (0.14 g, 0.362 mmol, 28.4%) as a light brown solid.

Production Example 101

Under a nitrogen atmosphere, triethylamine (262 mg, 2.58 mmol) was added to a DCM solution (5 mL) of 5-(4,4-difluorocyclohexyl)-3-(4-isopropylpiperidin-4-yl)-1,2,4- oxadiazole hydrochloride (270 mg, 0.862 mmol), which had been cooled to 0° C., and 1-ethyl-3-(3-dimethylaminopropyl)carbodiimide hydrochloride (165 mg, 0.862 mmol), 1-hydroxybenzotriazole (158 mg, 1.034 mmol), and (2S, 4S)-1-(tert-butoxycarbonyl)-4-hydroxypyrrolidine-2-carboxylic acid (200 mg, 0.865 mmol) were added thereto. The reaction mixture was stirred at room temperature for 16 hours, and water was added thereto to separate the liquid. The organic layer was dried over anhydrous sodium sulfate and concentrated under reduced pressure, and the residue was purified by silica gel column chromatography (60% to 70% ethyl acetate/petroleum ether) to obtain tert-butyl (2S, 4S)-2-(4-(5-(4,4-difluorocyclohexyl)-1,2,4-oxadiazol-3-yl)-4-isopropylpiperidine-1-carbonyl)-4-hydroxypyrrolidine-1-carboxylate (140 mg, 0.239 mmol, 27.8%) as a white solid.

Production Example 109

Under a nitrogen atmosphere, Oxone (1.656 g, 5.39 mmol) was added to a DCM solution (10 mL) of tert-butyl (2S,4S)-2-(4-(5-(4,4-difluorocyclohexyl)-1,2,4-oxadiazol-3-yl)-4-isopropylpiperidine-1-carbonyl)-4-(methylthio)pyrrolidine-1-carboxylate (0.3 g, 0.539 mmol), which had been cooled to 0° C., and the reaction mixture was stirred at room temperature for 48 hours. The reaction mixture was filtered through cerite, and the filtrate was concentrated under reduced pressure. The residue was purified by reverse phase high performance liquid chromatography (10 mM ammonium acetate aqueous solution/acetonitrile) to obtain tert-butyl (2S,4S)-2-(4-(5-(4,4-difluorocyclohexyl)-1,2,4-oxadiazol-3-yl)-4-isopropylpiperidine-1-carbonyl)-4-(methylsulfonyl)pyrrolidine-1-carboxylate (0.130 g, 0.217 mmol, 40.3%) as a white solid.

Production Example 114

Under a nitrogen atmosphere, a DCM solution (3.2 mL) of tert-butyl 4-(4-oxa-7-azaspiro[2.5]octane-7-carbonyl)-4-(trifluoromethyl)piperidine-1-carboxylate (0.2 g, 0.510 mmol) was cooled to 0° C., trifluoroacetic acid (0.8 mL, 10.38 mmol) was added thereto, and the reaction solution was slowly returned to room temperature and stirred for 3 hours. The reaction solution was concentrated under reduced pressure to obtain (4-oxa-7-azaspiro[2.5]octan-7-yl)(4-(trifluoromethyl)piperidin-4-yl)methanone trifluoroacetate (0.15 g, 0.438 mmol, 86%).

Production Example 146

Under a nitrogen atmosphere, n-butyllithium-hexane solution (1.6 M, 6.21 mL, 9.93 mmol) was added to a mixture of methyltriphenylphosphonium bromide (3.55 g, 9.93 mmol) in THF (30 mL), which had been cooled to −20° C., and the reaction solution was stirred at 0° C. for 1 hour. A THF solution (10 mL) of benzyl (S)-2-(((tert-butyldimethylsilyl)oxy)methyl)-5-oxopiperidine-1-carboxylate (2.5 g, 6.62 mmol) was added dropwise to the reaction solution at 0° C., and the reaction mixture was stirred at room temperature for 1 hour. Ice-cold water was added to the reaction mixture, and the mixture was extracted with ethyl acetate. The organic layer was dried over anhydrous sodium sulfate, and concentrated under reduced pressure. The residue was purified by silica gel column chromatography (5% to 10% ethyl acetate/petroleum ether) to obtain benzyl (S)-2-(((tert-butyldimethylsilyl)oxy)methyl)-5-methylenepiperidine-1-carboxylate (1.2 g, 3.19 mmol, 48.1%) as a colorless liquid.

Production Example 147

Under a nitrogen atmosphere, a diethylzinc-toluene solution (1.5 M, 9.32 mL, 9.32 mmol) was added to a DCM solution (30 mL) of benzyl (S)-2-(((tert-butyldimethylsilyl)oxy)methyl)-5-methylenepiperidine-1-carboxylate (1.0 g, 2.66 mmol), which had been cooled to −10° C., and diiodomethane (1.718 mL, 21.30 mmol) was added thereto. The reaction mixture was heated to room temperature, and stirred for 16 hours. A saturated aqueous solution of ammonium chloride was added to the reaction mixture, and the mixture was extracted with DCM. The organic layer was dried over anhydrous sodium sulfate and concentrated under reduced pressure to obtain benzyl (S)-6-(((tert-butyldimethylsilyl)oxy)methyl)-5-azaspiro[2.5]octane-5-carboxylate (1 g, 1.785 mmol, 67.1%) as a yellow liquid.

Production Example 148

10% Palladium hydroxide-activated carbon (0.3 g, 0.214 mmol) was added to an ethanol solution (10 mL) of benzyl (S)-6-(((tert-butyldimethylsilyl)oxy)methyl)-5-azaspiro[2.5]octane-5-carboxylate (0.5 g, 1.283 mmol). The reaction mixture was degassed with nitrogen gas, and stirred at room temperature for 16 hours under a hydrogen atmosphere of 1 atm. The solid was filtered off, and the filtrate was concentrated under reduced pressure to obtain (S)-(5-azaspiro[2.5]octan-6-yl)methanol (0.17 g, 1.082 mmol, 84%) as a colorless liquid.

Production Example 173

Under a nitrogen atmosphere, a mixture of ethyl 3-(1-(tert-butoxycarbonyl)-4-(trifluoromethyl)piperidin-4-yl)-1,2,4-oxadiazole-5-carboxylate (100 mg, 0.254 mmol), 3,3-dimethylazetidine hydrochloride (30.9 mg, 0.254 mmol), DIPEA (0.131 mL, 0.763 mmol), and ethanol (3 mL) was stirred at 80° C. for 16 hours. Water was added to the reaction mixture, and the mixture was extracted with ethyl acetate. The organic layer was dried over anhydrous sodium sulfate and concentrated under reduced pressure to obtain tert-butyl 4-(5-(3,3-dimethylazetidine-1-carbonyl)-1,2,4-oxadiazol-3-yl)-4-(trifluoromethyl)piperidine-1-carboxylate (90 mg, 0.208 mmol, 82%) as a white solid.

Production Example 209

Under a nitrogen atmosphere, 1-bromo-2-(2-bromoethoxy)ethane (0.539 g, 2.323 mmol) was added to a mixture of 1-(tert-butyl) 4-methyl 4-aminopiperidine-1,4-dicarboxylate (0.600 g, 2.323 mmol), potassium iodide (0.771 g, 4.65 mmol), and potassium carbonate (0.642 g, 4.65 mmol) in DMF (10 mL) at room temperature, and the reaction mixture was stirred at 100° C. for 24 hours. The reaction mixture was concentrated under reduced pressure, and the residue was diluted with ethyl acetate and washed with water, 1.5 M hydrochloric acid, water, and saturated brine in this order. The organic layer was dried over anhydrous sodium sulfate and concentrated under reduced pressure to obtain 1-(tert-butyl) 4-methyl 4-morpholinopiperidine-1,4-dicarboxylate (250 mg, 2.32 mmol).

Production Example 210

Under a nitrogen atmosphere, sodium hydroxide (0.049 g, 1.218 mmol) was added to a DMSO solution (5 mL) of 1-(tert-butyl) 4-methyl 4-morpholinopiperidine-1,4-dicarboxylate (0.200 g, 0.609 mmol) and 3,3-difluoro-N'-hydroxycyclobutane-1-carboxyimideamide (0.101 g, 0.670 mmol) at room temperature, and the reaction mixture was stirred for 3 hours. Water was added to the reaction mixture, and the mixture was extracted with ethyl acetate. The organic layer was washed with water and saturated brine, dried over anhydrous sodium sulfate, and concentrated under reduced pressure to obtain tert-butyl 4-(3-(3,3-difluorocyclobutyl)-1,2,4-oxadiazol-5-yl)-4-morpholinopiperidine-1-carboxylate (40 mg, 0.44 mmol, 20.8%).

Production Example 213

Under a nitrogen atmosphere, a sodium azide (409 mg, 6.29 mmol) was added to a mixture of tert-butyl 4-cyano-4-(trifluoromethyl)piperidine-1-carboxylate (500 mg, 1.797 mmol), ammonium chloride (336 mg, 6.29 mmol), and DMF (5 mL) at room temperature, and the reaction mixture was heated to 100° C. and stirred for 24 hours. Water was added to the reaction mixture, and the mixture was extracted with ethyl acetate. The organic layer was washed with saturated brine, dried over anhydrous sodium sulfate, and concentrated under reduced pressure to obtain tert-butyl 4-(2H-tetrazol-5-yl)-4-(trifluoromethyl)piperidine-1-carboxylate (430 mg, 1.338 mmol, 74.5%) as a colorless liquid.

Production Example 217

Under a nitrogen atmosphere, potassium carbonate (0.387 g, 2.80 mmol) was added to a DMF solution (5.00 mL) of tert-butyl 4-(2H-tetrazol-5-yl)-4-(trifluoromethyl)piperidine-1-carboxylate (0.3 g, 0.934 mmol) and 3,3-difluorocyclobutyl trifluoromethanesulfonate, and the reaction mixture was stirred at 80° C. for 16 hours. The reaction mixture was diluted with ethyl acetate and washed with cold water and saturated brine. The organic layer was dried over anhydrous sodium sulfate and concentrated under reduced pressure to obtain tert-butyl 4-(2-(3,3-difluorocyclobutyl)-2H-tetrazol-5-yl)-4-(trifluoromethyl)piperidine-1-carboxylate (0.25 g, 0.602 mmol, 64.4%).

Production Example 236

Under a nitrogen atmosphere, a trifluoroacetic anhydride (0.524 mL, 3.70 mmol) was added dropwise to a DCM solution (12 mL) of tert-butyl 4-carbamoyl-4-(4-methyl-1H-pyrazol-1-yl)piperidine-1-carboxylate (570 mg, 1.848 mmol) and pyridine (0.747 mL, 9.24 mmol), which had been cooled to 0° C., and the reaction solution was stirred at room temperature for 3 hours. DCM and water were added to the reaction solution, and the solution was separated. The organic layer was washed with 10% aqueous solution of sodium hydrogen carbonate and saturated brine, dried over anhydrous sodium sulfate, and concentrated under reduced pressure to obtain tert-butyl 4-cyano-4-(4-methyl-1H-pyrazol-1-yl)piperidine-1-carboxylate (500 mg, 1.640 mmol, 89%).

Production Example 256

Under a nitrogen atmosphere, a DCM solution (3 mL) of tert-butyl 4-amino-4-(3-(3,3-difluorocyclobutyl)-1,2,4-oxadiazol-5-yl)piperidine-1-carboxylate (160 mg, 0.446 mmol) and triethylamine (113 mg, 1.116 mmol) was cooled to 0° C., acetyl chloride (35.0 mg, 0.446 mmol) was added thereto, and the reaction solution was stirred at room temperature for 1 hour. The reaction solution was concentrated under reduced pressure, and the residue was diluted with ethyl acetate and washed with water. The organic layer was dried over anhydrous sodium sulfate and concentrated under reduced pressure to obtain tert-butyl 4-acetamido-4-(3-(3,3-difluorocyclobutyl)-1,2,4-oxadiazol-5-yl)piperidine-1-carboxylate (180 mg, 0.356 mmol, 80%) as an off-white solid.

Production Example 257

Under a nitrogen atmosphere, sodium hydride (60%, 32.4 mg, 1.349 mmol) was added to a THF solution (5 mL) of tert-butyl 4-acetamido-4-(3-(3,3-difluorocyclobutyl)-1,2,4-oxadiazol-5-yl)piperidine-1-carboxylate (180 mg, 0.450 mmol), and methyl iodide (77 mg, 0.539 mmol) was added thereto, and the reaction solution was stirred at room temperature for 12 hours. Water was added to the reaction solution, and the mixture was extracted with ethyl acetate. The organic layer was washed with saturated brine, dried over anhydrous sodium sulfate, and concentrated under reduced pressure to obtain tert-butyl 4-(3-(3,3-difluorocyclobutyl)-1,2,4-oxadiazol-5-yl)-4-(N-methylacetamido)piperidine-1-carboxylate (170 mg, 0.384 mmol, 85%) as a yellow liquid.

Production Example 260

Under a nitrogen atmosphere, a DCM solution (5 mL) of tert-butyl 4-amino-4-(3-(3,3-difluorocyclobutyl)-1,2,4-oxadiazol-5-yl)piperidine-1-carboxylate (210 mg, 0.586 mmol) and triethylamine (178 mg, 1.758 mmol) was cooled to 0° C., methanesulfonyl chloride (67.1 mg, 0.586 mmol) was added thereto, and the reaction mixture was stirred at room temperature for 12 hours. The reaction mixture was diluted with DCM and washed with water and saturated brine. The organic layer was dried over anhydrous sodium sulfate and concentrated under reduced pressure to obtain tert-butyl 4-(3-(3,3-difluorocyclobutyl)-1,2,4-oxadiazol-5-yl)-4-(methanesulfonamido)piperidine-1-carboxylate (220 mg, 0.395 mmol, 67.4%) as a yellow liquid.

Production Example 261

Under a nitrogen atmosphere, a DMF solution (6 mL) of tert-butyl 4-(3-(3,3-difluorocyclobutyl)-1,2,4-oxadiazol-5-yl)-4-(methanesulfonamido)piperidine-1-carboxylate (180 mg, 0.412 mmol) was cooled to 0° C., cesium carbonate (161 mg, 0.495 mmol) and methyl iodide (146 mg, 1.031 mmol) were added thereto, and the reaction solution was stirred for 15 minutes and then stirred at room temperature for 12 hours. The reaction solution was diluted with ethyl acetate and washed with water and saturated brine. The organic layer was dried over anhydrous sodium sulfate and concentrated under reduced pressure to obtain tert-butyl 4-[3-(3,3-difluorocyclobutyl)-1,2,4-oxadiazol-5-yl]-4-[methyl(methylsulfonyl)amino]piperidine-1-carboxylate (192 mg, 0.286 mmol, 69.4%).

Production Example 264

Under a nitrogen atmosphere, 2-(thiophen-3-yl)acetonitrile (0.5 g, 4.06 mmol) was added dropwise to a mixture of sodium hydride (60%, 0.357 g, 8.93 mmol) in DMF (5 mL), which had been cooled to 0° C., and the reaction mixture was stirred at room temperature for 1 hour. The reaction mixture was cooled to 0° C. again, a DMF solution (5.00 mL) of tert-butyl bis(2-chloroethyl)carbamate (1.081 g, 4.47 mmol) was added dropwise thereto, and the reaction mixture was stirred at room temperature for 16 hours. Ice-cold water was slowly added to the reaction mixture, and the mixture was extracted with ethyl acetate. The organic layer was washed with saturated brine, dried over anhydrous sodium sulfate, and concentrated under reduced pressure. The residue was purified by silica gel column chromatography (10% to 15% ethyl acetate/petroleum ether) to obtain tert-butyl 4-cyano-4-(thiophen-3-yl)piperidine-1-carboxylate (0.610 g, 2.083 mmol, 51.3%) as a yellow liquid.

Production Example 271

Under a nitrogen atmosphere, a methanol suspension (5 mL) of dimethyl (1-diazo-2-oxopropyl)phosphonate (85 mg, 0.444 mmol) and molecular sieves (4 Å, 100 mg) was cooled to 0° C., potassium carbonate (81 mg, 0.587 mmol) and tert-butyl 4-formyl-4-(trifluoromethyl)piperidine-1-carboxylate (100 mg, 0.356 mmol) were added thereto, and the reaction mixture was stirred in an ice bath for 30 minutes and then stirred at room temperature for 16 hours. A saturated aqueous solution of ammonium chloride was added to the reaction mixture, the solid was removed by filtration through cerite, and the mixture was extracted with ethyl acetate. The organic layer was washed with water and saturated brine, dried over anhydrous sodium sulfate, and concentrated under reduced pressure. The residue was purified by silica gel column chromatography (5% ethyl acetate/ petroleum ether) to obtain tert-butyl 4-ethynyl-4-(trifluoromethyl)piperidine-1-carboxylate (60 mg, 0.216 mmol, 60.9%).

Production Example 272

Under a nitrogen atmosphere, 4-azido-1,1-difluorocyclohexane (349 mg, 2.164 mmol), copper (II) sulfate (11.51 mg, 0.072 mmol), sodium L-ascorbate (42.8 mg, 0.216 mmol) were sequentially added to a mixture of tert-butyl 4-ethynyl-4-(trifluoromethyl)piperidine-1-carboxylate (200 mg, 0.721 mmol) in tert-butyl alcohol (5 mL) and water (5.00 mL), and the reaction mixture was stirred at room temperature for 16 hours. The reaction mixture was diluted with water and extracted with ethyl acetate. The organic layer was dried over anhydrous sodium sulfate and concentrated under reduced pressure to obtain tert-butyl 4-(1-(4,4-difluorocyclohexyl)-1H-1,2,3-triazol-4-yl)-4-(trifluoromethyl)piperidine-1-carboxylate (311 mg, 0.591 mmol, 82%) as an off-white solid.

Production Example 282

Di-µ-hydroxobis[(N,N,N',N'-tetramethylethylenediamine) copper (II)] dichloride (0.442 g, 0.947 mmol) was added to a DCM suspension (50 mL) of tert-butyl 4-(2H-tetrazol-5-yl)piperidine-1-carboxylate (2 g, 7.90 mmol), 4-fluorophenylboronic acid (1.768 g, 12.63 mmol), and potassium carbonate (1.200 g, 8.69 mmol), the reaction vessel was replaced with an oxygen atmosphere, and the mixture was stirred at room temperature for 16 hours under an oxygen atmosphere of 1 atm. The solid was removed by filtration through cerite, the filtrate was washed with water, and the organic layer was dried over anhydrous sodium sulfate and concentrated under reduced pressure. The residue was purified by silica gel column chromatography (12% ethyl acetate/petroleum ether) to obtain tert-butyl 4-(2-(4-fluorophenyl)-2H-tetrazol-5-yl)piperidine-1-carboxylate (1.86 g, 5.35 mmol, 67.8%) as an off-white solid.

Production Example 286

To 1,4-dioxane (6 mL) bubbled with nitrogen gas, 4-bromo-2-(4,4-difluoropiperidin-1-yl)pyridine (0.250 g, 0.902 mmol), 1-(tert-butoxycarbonyl)-1,2,3,6-tetrahydro-4-(4,4,5,5-tetramethyl-1,3,2-dioxaborolan-2-yl)pyridine (0.307 g, 0.992 mmol), potassium carbonate (0.249 g, 1.804 mmol), water (1.5 mL), and [1,1'-bis(diphenylphosphino) ferrocene]palladium (II) dichloride dichloromethane adduct (0.074 g, 0.090 mmol) were added, and the mixture was stirred at 100° C. for 16 hours. The reaction mixture was filtered through cerite, and the solid was washed with ethyl acetate. The filtrate was concentrated under reduced pressure, and the residue was purified by silica gel column chromatography (15% ethyl acetate/petroleum ether) to obtain tert-butyl 2'-(4,4-difluoropiperidin-1-yl)-3,6-dihydro-[4,4'-bipyridine]-1(2H)-carboxylate (0.370 g, 0.885 mmol, 98%) as a yellow liquid.

Production Example 287

A methanol solution (10 mL) of tert-butyl 2'-(4,4-difluoropiperidin-1-yl)-3,6-dihydro-[4,4'-bipyridine]-1(2H)-carboxylate (0.3 g, 0.791 mmol) was bubbled with nitrogen gas for 5 minutes. Thereafter, under a nitrogen atmosphere, 10% palladium/carbon (0.084 g, 0.079 mmol) was added to the mixture. The reaction mixture was stirred at room temperature for 3 hours under a hydrogen atmosphere of 1 atm. The reaction mixture was bubbled with nitrogen gas for 5 minutes and filtered through cerite, and the solid was washed with ethyl acetate. The filtrate was concentrated under reduced pressure to obtain tert-butyl 4-(2-(4,4-difluoropiperidin-1-yl)pyridin-4-yl)piperidine-1-carboxylate (0.3 g, 0.724 mmol, 92%) as a colorless liquid.

Production Example 290

4,4-Difluoropiperidine hydrochloride (0.324 g, 2.058 mmol) and DIPEA (3.00 mL, 17.23 mmol) were added to a shielded tube and stirred for 10 minutes, 2,5-dibromothiazole (0.5 g, 2.058 mmol) was added thereto, and the reaction mixture was stirred at 100° C. for 16 hours. The reaction mixture was concentrated under reduced pressure, and the residue was purified by silica gel column chromatography (6% ethyl acetate/petroleum ether) to obtain 5-bromo-2-(4, 4-difluoropiperidin-1-yl)thiazole (0.340 g, 0.781 mmol, 37.9%) as a white solid.

Production Example 296

Under a nitrogen atmosphere, 4,4-difluoropiperidine hydrochloride (198 mg, 1.261 mmol), DIPEA (0.881 mL, 5.04 mmol), and 4-dimethylaminopyridine (15.41 mg, 0.126 mmol) were added to an ethanol solution (5 mL) of 2,4-dibromopyrimidine (300 mg, 1.261 mmol), which had been ice-cooled, and the mixture was stirred at room temperature for 16 hours. The reaction mixture was concentrated under reduced pressure, and the residue was purified by silica gel column chromatography (30% ethyl acetate/petroleum ether) to obtain 2-bromo-4-(4,4-difluoropiperidin-1-yl)pyrimidine (220 mg, 0.783 mmol, 62.1%) as an off-white solid.

Production Example 311

Under a nitrogen atmosphere, a suspension of tert-butyl 4-ethynylpiperidine-1-carboxylate (50 mg, 0.239 mmol), 1-azido-4-fluorobenzene (32.8 mg, 0.239 mmol), copper (I)

iodide (45.5 mg, 0.239 mmol), and DIPEA (1043 μL, 5.97 mmol) was stirred at room temperature for 16 hours. The reaction mixture was diluted with DCM and filtered through cerite. The filtrate was washed with water, dried over anhydrous sodium sulfate, and concentrated under reduced pressure to obtain tert-butyl 4-(1-(4-fluorophenyl)-1H-1,2,3-triazol-4-yl)piperidine-1-carboxylate (50 mg, 0.144 mmol, 60.4%) as a light brown solid.

Production Example 314

Potassium carbonate (0.436 g, 3.15 mmol) was added to a DMF solution (10.51 mL) of 2,4-dibromopyrimidine (0.5 g, 2.102 mmol) and 4-fluoro-1H-pyrazole (0.163 g, 1.892 mmol), and the reaction mixture was stirred at room temperature for 16 hours under a nitrogen atmosphere. The reaction mixture was diluted with ethyl acetate and washed with ice-cold water. The organic layer was dried over anhydrous sodium sulfate and concentrated under reduced pressure, and the residue was purified by silica gel column chromatography (15% ethyl acetate/petroleum ether) to obtain 2-bromo-4-(4-fluoro-1H-pyrazol-1-yl)pyrimidine (0.3 g, 1.199 mmol, 57.0%) as a white solid.

Production Example 323

Under a nitrogen atmosphere, potassium carbonate (486 mg, 3.51 mmol) was added to a DMF solution (10 mL) of 5-(2,4-difluorophenyl)-2H-tetrazole (320 mg, 1.757 mmol) and tert-butyl 4-bromopiperidine-1-carboxylate (464 mg, 1.757 mmol), and the reaction mixture was stirred at 90° C. for 16 hours. Water was added to the reaction mixture, and the mixture was extracted with ethyl acetate. The organic layer was successively washed with water and saturated brine, dried over anhydrous sodium sulfate, and concentrated under reduced pressure. The residue was purified by silica gel column chromatography (20% ethyl acetate/petroleum ether) to obtain tert-butyl 4-(5-(2,4-difluorophenyl)-2H-tetrazol-2-yl)piperidine-1-carboxylate (290 mg, 0.794 mmol, 45.2%) as a pale yellow liquid.

Example 1

Under a nitrogen atmosphere, a 4M hydrogen chloride 1,4-dioxane solution (157 mL, 630 mmol) was added dropwise to a DCM solution (290 mL) of tert-butyl (7S,9R)-7-(4-(3-(3,3-difluorocyclobutyl)-1,2,4-oxadiazol-5-yl)-4-isopropylpiperidine-1-carbonyl)-9-hydroxy-6-azaspiro[3.5]nonane-6-carboxylate (29 g, 52.5 mmol), which had been cooled to 0° C., and the reaction mixture was stirred at room temperature for 2 hours. The reaction mixture was concentrated under reduced pressure, and the residue was diluted with DCM and washed with 10% aqueous solution of sodium hydrogen carbonate. The organic layer was concentrated under reduced pressure, the residue was diluted with diethyl ether, and the mixture was stirred at room temperature for 30 minutes. The precipitated solid was collected by filtration and dried to obtain (4-(3-(3,3-difluorocyclobutyl)-1,2,4-oxadiazol-5-yl)-4-isopropylpiperidin-1-yl)((7S,9R)-9-hydroxy-6-azaspiro[3.5]nonan-7-yl)methanone (21 g, 88%) as an off-white solid.

Example 2

Under a nitrogen atmosphere, a 4M hydrogen chloride 1,4-dioxane solution (1 mL) was added to a DCM solution (2 mL) of tert-butyl (7S,9R)-7-(4-(3-(3,3-difluorocyclobutyl)-1,2,4-oxadiazol-5-yl)-4-(trifluoromethyl)piperidine-1-carbonyl)-9-hydroxy-6-azaspiro[3.5]nonane-6-carboxylate (220 mg, 0.38 mmol), which had been cooled to 0° C., and the reaction mixture was stirred at room temperature for 2 hours. The reaction mixture was concentrated under reduced pressure, the residue was dissolved in water, a 10% aqueous solution of sodium hydrogen carbonate was added thereto to be basic, and the mixture was extracted with ethyl acetate. The organic layer was washed with saturated brine, dried over anhydrous sodium sulfate, and concentrated under reduced pressure to obtain (4-(3-(3,3-difluorocyclobutyl)-1,2,4-oxadiazol-5-yl)-4-(trifluoromethyl)piperidin-1-yl)((7S,9R)-9-hydroxy-6-azaspiro[3.5]nonan-7-yl)methanone (120 mg, 0.25 mmol, 66%) as a white solid.

Example 3

Under a nitrogen atmosphere, a 4M hydrogen chloride 1,4-dioxane solution (1 mL) was added to a DCM solution (2 mL) of tert-butyl (7S,9R)-7-(4-(5-(3,3-difluorocyclobutyl)-1,2,4-oxadiazol-3-yl)-4-(trifluoromethyl)piperidine-1-carbonyl)-9-hydroxy-6-azaspiro[3.5]nonane-6-carboxylate (0.15 g, 0.259 mmol), which had been cooled to 0° C., and the reaction mixture was stirred at room temperature for 3 hours. The reaction mixture was concentrated under reduced pressure, a 10% aqueous solution of sodium hydrogen carbonate was added to the obtained white solid, and the mixture was extracted with ethyl acetate. The organic layer was dried over anhydrous sodium sulfate and concentrated under reduced pressure to obtain (4-(5-(3,3-difluorocyclobutyl)-1,2,4-oxadiazol-3-yl)-4-(trifluoromethyl)piperidin-1-yl)((7S,9R)-9-hydroxy-6-azaspiro[3.5]nonan-7-yl)methanone (0.096 g, 0.200 mmol, 77%) as a white solid.

Example 7

Under a nitrogen atmosphere, a DMF solution (2 mL) of (9H-fluorene-9-yl)methyl (4R,7S)-7-(4-(((4,4-difluorohexyl)methyl)(methyl)carbamoyl)-4-(trifluoromethyl)piperidine-1-carbonyl)-1-oxa-6-azaspiro[3.5]nonane-6-carboxylate (300 mg, 0.418 mmol) was cooled to 0° C., piperidine (0.2 mL) was added thereto, and the reaction solution was stirred at room temperature for 1 hour. Water was added to the reaction solution, and the mixture was extracted with ethyl acetate. The organic layer was washed with water and saturated brine, dried over anhydrous sodium sulfate, and concentrated under reduced pressure. The residue was purified by silica gel column chromatography (6% to 8% methanol/DCM) to obtain N-((4,4-difluorohexyl)methyl)-N-methyl-1-((4R,7S)-1-oxa-6-azaspiro[3.5]nonane-7-carbonyl)-4-(trifluoromethyl)piperidine-4-carboxamide (112 mg, 0.226 mmol, 56.0%).

Example 16

Under a nitrogen atmosphere, trifluoroacetic acid (0.063 mL, 0.814 mmol) was added to a DCM solution (5 mL) of tert-butyl (7S,9R)-7-(3-(5-(4,4-difluorocyclohexyl)-1,3,4-oxadiazol-2-yl)-3-isopropylazetidine-1-carbonyl)-9-hydroxy-6-azaspiro[3.5]nonane-6-carboxylate (45 mg, 0.081 mmol), which had been cooled to 0° C., and the reaction mixture was stirred at room temperature for 3 hours. The reaction mixture was concentrated under reduced pressure, a 10% aqueous solution of sodium hydrogen carbonate was added to the residue, and the mixture was extracted with DCM. The organic layer was dried over anhydrous sodium sulfate, and concentrated under reduced pressure. The residue was purified by reverse phase high performance liquid chromatography (0.1% trifluoroacetic acid aqueous solution/acetonitrile) to obtain (3-(5-(4,4-difluorocyclohexyl)-1,3,4-oxadiazol-2-yl)-3-isopropylazetidine-1-yl)((7S,9R)-9-hydroxy-6-azaspiro[3.5]nonan-7-yl)methanone trifluoroacetate (8 mg, 0.017 mmol, 21.25%).

Example 31

Under a nitrogen atmosphere, a 4M hydrogen chloride 1,4-dioxane solution (1 mL) was added to a DCM solution (2 mL) of tert-butyl (7S,9R)-7-(4-(5-(4,4-difluorocyclohexyl)-1,2,4-oxadiazol-3-yl)-4-(trifluoromethyl)piperidine-1-carbonyl)-9-hydroxy-6-azaspiro[3.5]nonane-6-carboxylate (0.15 g, 0.247 mmol), which had been cooled to 0° C., and the reaction mixture was stirred at room temperature for 3 hours. The reaction mixture was concentrated under reduced pressure, a 10% aqueous solution of sodium hydrogen carbonate was added to the obtained white solid, and the mixture was extracted with ethyl acetate. The organic layer was dried over anhydrous sodium sulfate and concentrated under reduced pressure to obtain (4-(5-(4,4-difluorocyclohexyl)-1,2,4-oxadiazol-3-yl)-4-(trifluoromethyl)piperidin-1-yl)((7S,9R)-9-hydroxy-6-azaspiro[3.5]nonan-7-yl)methanone (0.09 g, 0.177 mmol, 71.4%) as a white solid.

Example 51

Under a nitrogen atmosphere, a 4M hydrogen chloride 1,4-dioxane solution (1 mL) was added to a DCM solution (2 mL) of tert-butyl (2S,4R)-2-(4-(5-(3,3-difluorocyclobutyl)-1,2,4-oxadiazol-3-yl)-4-(trifluoromethyl)piperidine-1-carbonyl)-4-hydroxy-5,5-dimethylpiperidine-1-carboxylate (53 mg, 0.094 mmol), which had been cooled to 0° C., and the reaction mixture was stirred at room temperature for 2 hours. The reaction mixture was concentrated under reduced pressure, a 10% aqueous solution of sodium hydrogen carbonate was added to the residue, and the mixture was extracted with ethyl acetate. The organic layer was washed with saturated brine, dried over anhydrous sodium sulfate, and concentrated under reduced pressure to obtain (4-(5-(3,3-difluorocyclobutyl)-1,2,4-oxadiazol-3-yl)-4-(trifluoromethyl)piperidin-1-yl)((2S,4R)-4-hydroxy-5,5-dimethylpiperidin-2-yl)methanone (32 mg, 0.069 mmol) as a white solid.

Example 56

Under a nitrogen atmosphere, a 4M hydrogen chloride 1,4-dioxane solution (1 mL) was added to a DCM solution (2 mL) of tert-butyl (2S,4R)-2-(4-(5-(4,4-difluorocyclohexyl)-1,2,4-oxadiazol-3-yl)-4-(trifluoromethyl)piperidine-1-carbonyl)-4-hydroxy-5,5-dimethylpiperidine-1-carboxylate (150 mg, 0.252 mmol), which had been cooled to 0° C., and the reaction mixture was stirred at room temperature for 2 hours. The reaction mixture was concentrated under reduced pressure, a 10% aqueous solution of sodium hydrogen carbonate was added to the residue, and the mixture was extracted with ethyl acetate. The organic layer was washed with saturated brine, dried over anhydrous sodium sulfate, and concentrated under reduced pressure to obtain (4-(5-(4,4-difluorocyclohexyl)-1,2,4-oxadiazol-3-yl)-4-(trifluoromethyl)piperidin-1-yl)((2S,4R)-4-hydroxy-5,5-dimethylpiperidin-2-yl)methanone (80 mg, 0.161 mmol, 63.9%) as a white solid.

Example 63

An optically active substance was separated from a methanol/acetonitrile solution (7:3, 40 mL) of (4-(5-(5,5-difluorotetrahydro-2H-pyran-2-yl)-1,2,4-oxadiazol-3-yl)-4-(trifluoromethyl)piperidin-1-yl)((7S,9R)-9-hydroxy-6-azaspiro[3.5]nonan-7-yl)methanone (4 g, 7.87 mol) by supercritical fluid chiral chromatography (SFC) (15% [0.5% isopropylamine-methanol solution]/$CO_2$). The obtained eluates were concentrated under reduced pressure to obtain Example 64 (1.7 g, derived from the earlier effluent) and Example 63 (1.7 g, derived from the later effluent) as an off-white solid, respectively.

In the table shown later, Examples 63 and 64 are shown by the same chemical structural formula, but the stereochemistry at the 2-position of the tetrahydropyran ring is one and the other of the α compound and the R compound, respectively.

Example 67

Under a nitrogen atmosphere, a 4M hydrogen chloride 1,4-dioxane solution (1 mL) was added to a DCM solution (2 mL) of tert-butyl (7S,9R)-7-(4-(2-(3,3-difluorocyclobutyl)-2H-tetrazol-5-yl)-4-(trifluoromethyl)piperidine-1-carbonyl)-9-hydroxy-6-azaspiro[3.5]nonane-6-carboxylate (0.22 g, 0.380 mmol), which had been cooled to 0° C., and the reaction mixture was stirred at room temperature for 2 hours. The reaction mixture was concentrated under reduced pressure, the residue was dissolved in water, a 10% aqueous solution of sodium hydrogen carbonate was added thereto to be basic, and the organic layer was extracted with a 2% methanol/DCM solution. The organic layer was dried over anhydrous sodium sulfate, and concentrated under reduced pressure. The residue was suspended in methyl tert-butyl ether and collected by filtration to obtain (4-(2-(3,3-difluorocyclobutyl)-2H-tetrazol-5-yl)-4-(trifluoromethyl)piperidin-1-yl)((7S,9R)-9-hydroxy-6-azaspiro[3.5]nonan-7-yl)methanone (0.12 g, 0.250 mmol, 65.8%) as a white solid.

Example 80

Under a nitrogen atmosphere, a 4M hydrogen chloride 1,4-dioxane solution (1 mL) was added to a DCM solution (2 mL) of tert-butyl (2S,4R)-2-(4-cyclopropyl-4-(5-(4,4-difluorocyclohexyl)-1,2,4-oxadiazol-3-yl)piperidine-1-carbonyl)-4-hydroxy-5,5-dimethylpiperidine-1-carboxylate (0.070 g, 0.124 mmol), which had been cooled to 0° C., and the reaction mixture was stirred at room temperature for 2 hours. The reaction mixture was concentrated under reduced pressure, the residue was dissolved in water, a 10% aqueous solution of sodium hydrogen carbonate was added thereto to be basic, and the mixture was extracted with ethyl acetate. The organic layer was washed with saturated brine, dried over anhydrous sodium sulfate, and concentrated under reduced pressure. The residue was purified by preparative HPLC (10 mM ammonium hydrogen carbonate aqueous solution/acetonitrile) to obtain (4-cyclopropyl-4-(5-(4,4-difluorocyclohexyl)-1,2,4-oxadiazol-3-yl)piperidin-1-yl)((2S,4R)-4-hydroxy-5,5-dimethylpiperidin-2-yl)methanone (0.015 g, 0.032 mmol, 25.8%) as an off-white solid.

Example 89

Under a nitrogen atmosphere, a 4M hydrogen chloride 1,4-dioxane solution (2.67 ml, 10.69 mmol) was added to a DCM solution (20 mL) of tert-butyl (7S,9R)-7-(4-(2-(4-fluorophenyl)-2H-tetrazol-5-yl)piperidine-1-carbonyl)-9-hydroxy-6-azaspiro[3.5]nonane-6-carboxylate (1.1 g, 2.138 mmol), which had been cooled to 0° C., and the reaction mixture was stirred at room temperature for 2 hours. A 10% aqueous solution of sodium hydrogen carbonate was added to the reaction solution to be basic, and the mixture was extracted with DCM. The organic layer was washed with water and saturated brine, dried over anhydrous sodium sulfate, and concentrated under reduced pressure. The residue was purified by silica gel column chromatography (10% methanol/DCM) to obtain (4-(2-(4-fluorophenyl)-2H-tetrazol-5-yl)piperidin-1-yl)((7S,9R)-9-hydroxy-6-azaspiro[3.5]nonan-7-yl)methanone (710 mg, 1.713 mmol, 80%) as a white solid.

Example 90

Under a nitrogen atmosphere, a 4M hydrogen chloride 1,4-dioxane solution (1 mL) was added to a DCM solution (2 mL) of tert-butyl (2S,4R)-2-(4-(2-(4-fluorophenyl)-2H-tetrazol-5-yl)piperidine-1-carbonyl)-4-hydroxy-5,5-dimethylpiperidine-1-carboxylate (0.12 g, 0.239 mmol), which had been cooled to 0° C., and the reaction mixture was stirred at room temperature for 2 hours. The reaction mixture was concentrated under reduced pressure, the obtained solid was dissolved in water, a 10% aqueous solution of sodium hydrogen carbonate was added thereto to be basic, and the mixture was extracted with ethyl acetate. The organic layer was dried over anhydrous sodium sulfate, and concentrated under reduced pressure. The residue was suspended in methyl tert-butyl ether and collected by filtration to obtain (4-(2-(4-fluorophenyl)-2H-tetrazol-5-yl)piperidin-1-yl)((2S,4R)-4-hydroxy-5,5-dimethylpiperidin-2-yl)methanone (0.07 g, 0.173 mmol, 72.4%) as an off-white solid.

Compounds shown in Tables 3 to 67 were produced in the same manner as in the production method of Production Examples or Examples shown above. Physicochemical data of each compound are shown in Tables 3 to 52 and Tables 68 to 85.

In the tables, the following abbreviations are used.
PEx: Production Example Number
Ex: Example Number
PSyn: Production Example Number produced by the same method
Syn: Example Number produced by the same method
Chemical Structure: chemical structure
Data: physicochemical data
NMR: δ value (ppm) of signal in $^1$H-NMR (400 MHz) in DMSO-$d_6$
NMR (300): δ value (ppm) of signal in $^1$H-NMR (300 MHz) in DMSO-$d_6$
NMR (CDCl$_3$): δ value (ppm) of signal in $^1$H-NMR (400 MHz) in CDCl$_3$
NMR (CD$_3$OD): δ value (ppm) of signal in $^1$H-NMR (400 MHz) in CD$_3$OD
ES+APCI: m/z value in mass spectrometry measured by ionization according to electrospray ionization (ESI method) and atmospheric pressure chemical ionization (APCI method)
ES: m/z value in mass spectrometry measured by ionization according to the ESI method The m/z value represented by only the numerical value indicates that is a value of [M+H]$^+$. In addition, the m/z value is described as "−100" in a case where a tert-butyloxycarbonyl group is eliminated, "−56" in a case where a tert-butyl group is eliminated, and "−18" in a case where a water molecule is eliminated.

In the chemical structural formulae, the following abbreviations are used:
Boc: tert-butyloxycarbonyl
CN: cyano
NO$_2$: nitro
TBS: tert-butyldimethylsilyl A compound in which the structure of hydrogen chloride, trifluoroacetic acid, or formic acid is described in the vicinity of chemical structural formula indicates that the compound is isolated as hydrochloride, trifluoroacetate, or formate.

Except for the following cases, the stereochemistry in the chemical structural formula indicates that the compound is an isomer having the configuration of the indicated structure.

Production Example 1 isomer mixture related to stereochemistry of the secondary hydroxyl group; the mixing ratio is undecided, but it is approximately 1:1

Production Examples 2, 3, 4, 5, 6 isomer mixture related to stereochemistry of the benzyloxy group; the mixing ratio is undecided, but it is approximately 1:1

Production Examples 7, 20 isomer mixture related to stereochemistry of the secondary hydroxyl group; the mixing ratio is undecided Production Examples 24, 25 isomer mixture related to stereochemistry of the hydroxyl group and the methyl group of approximately 9:1; the stereochemistry is undecided Production Examples 26, 27, 28, and 254 single isomer; however, the stereochemistry of the tertiary hydroxyl group is undecided Production Example 43 racemic mixture at the tertiary hydroxyl group

Production Examples 116, 117 racemic mixture at the methyl group

Production Example 118 diastereomeric mixture at the methyl group

Production Examples 120, 121 racemic mixture at the trifluoromethyl group substituted to the pyrrolidine ring Production Example 122 diastereomeric mixture at the trifluoromethyl group substituted to the pyrrolidine ring Production Examples 132, 133 racemic mixture at the 2-position of dimethylpiperidine

Production Examples 134, 135, 136, 137, 138 diastereomeric mixture at the methyl group of approximately 1:1

Production Examples 163, 164, 165, 186, 187, 188, 190, 191, 192, 198, 199, 200 racemic mixture at the 2- or 3-position of tetrahydrofuran or tetrahydropyran

Production Examples 166, 189, 193, 201 diastereomeric mixture at the 2- or 3-position of tetrahydrofuran or tetrahydropyran Example 33 diastereomeric mixture at the methyl group

Example 35 diastereomeric mixture at the trifluoromethyl group substituted to the pyrrolidine ring Examples 41, 42 racemic mixture at the 2-position of a piperidine ring corresponding to the Ring A Example 43 diastereomeric mixture at methyl on the piperidine ring corresponding to the Ring A Examples 50, 59, 60, 62 diastereomeric mixture at the 2- or 3-position of tetrahydrofuran or tetrahydropyran Examples 63, 64 compound obtained by optically resolving a compound of Example 50, which is a diastereomeric mixture, using a chiral column; in the stereochemistry of the carbon atom in which the tetrahydropyranyl substituted on the oxadiazole ring is bonded to oxadiazole, one example is (R) and the other example is (S), in which it has not been decided which one Example 76 single isomer; however, the stereochemistry of the tertiary hydroxyl group is undecided

TABLE 3

| PEx | PSyn | Chemical Structure | Data |
| --- | --- | --- | --- |
| 1 | 1 | | ES + APCI; 226.1 |
| 2 | 2 | | ES + APCI; 316.2 |
| 3 | 3 | | ES + APCI; 463 [M − H]− |

TABLE 3-continued

| PEx | PSyn | Chemical Structure | Data |
|---|---|---|---|
| 4 | 4 | | ES + APCI; 577.1 [M − H]− |
| 5 | 5 | | ES + APCI; 561.1 |

TABLE 4

| PEx | PSyn | Chemical Structure | Data |
|---|---|---|---|
| 6 | 6 | | ES; 376.3 [M + H − 100]+ |
| 7 | 7 | | ES; 286.2 [M + H − 100]+ |

TABLE 4-continued

| PEx | PSyn | Chemical Structure | Data |
|---|---|---|---|
| 8 | 8 | | ES; 284.2 [M + H − —100]+ |
| 9 | 9 | | ES; 172.2 [M + H − 100]+ |
| 10 | 10 | | ES + APCI; 186.2 [M + H − 100]+ |

TABLE 5

| PEx | PSyn | Chemical Structure | Data |
|---|---|---|---|
| 11 | 11 | | ES + APCI; 456.2 |
| 12 | 12 | | ES + APCI; 378.3 |

TABLE 5-continued

| PEx | PSyn | Chemical Structure | Data |
|---|---|---|---|
| 13 | 13 | (oxetane-spiro-piperidine with CH2OTBS, N-Cbz) | ES; 406.1 |
| 14 | 9 | (oxetane-spiro-piperidine with CH2OH, N-Cbz) | ES; 292.1 |
| 15 | 15 | (oxetane-spiro-piperidine with CH2OH, NH) | ES; 158.1 |

TABLE 6

| PEx | PSyn | Chemical Structure | Data |
|---|---|---|---|
| 16 | 16 | (oxetane-spiro-piperidine with CH2OH, N-Fmoc) | ES; 380.1 |

TABLE 6-continued

| PEx | PSyn | Chemical Structure | Data |
|---|---|---|---|
| 17 | 10 | (oxetane-spiro-piperidine with COOH, N-Fmoc) | ES; 394.1 |
| 18 | 18 | (2,6-dioxopiperidine with CH2OTBS, N-Boc) | ES; 258.1 [M + H − 100]+ |
| 19 | 19 | (3,3-dimethyl-2,6-dioxopiperidine with CH2OTBS, N-Boc) | ES + APCI; 286.2 [M + H − 100]+ |
| 20 | 20 | (3,3-dimethyl-4-hydroxypiperidine with CH2OTBS, N-Boc) | ES + APCI; 274.2 [M + H − 100]+ |

TABLE 7

| PEx | PSyn | Chemical Structure | Data |
|---|---|---|---|
| 21 | 8 | (piperidinone with gem-dimethyl, CH2OTBS, N-Boc) | ES + APCI; 271.9 [M + H − 100]+ |
| 22 | 9 | (4-hydroxy-5,5-dimethyl-2-(hydroxymethyl)piperidine, N-Boc) | ES + APCI; 160.2 [M + H − 100]+ |
| 23 | 10 | (4-hydroxy-5,5-dimethylpiperidine-2-carboxylic acid, N-Boc) | ES + APCI; 174.1 [M + H − 100]+ |

TABLE 7-continued

| PEx | PSyn | Chemical Structure | Data |
|---|---|---|---|
| 24 | 24 | (5-hydroxy-5-methyl-2-(CH2OTBS)piperidine, N-Cbz) | ES + APCI; 394.3 |
| 25 | 15 | (5-hydroxy-5-methyl-2-(CH2OTBS)piperidine, NH) | ES + APCI; 260 |

TABLE 8

| PEx | PSyn | Chemical Structure | Data |
|---|---|---|---|
| 26 | 6 | (5-hydroxy-5-methyl-2-(CH2OTBS)piperidine, N-Boc) | ES + APCI; 360 |
| 27 | 27 | (5-hydroxy-5-methyl-2-(hydroxymethyl)piperidine, N-Boc) | ES + APCI; 146.1 [M + H − 100]+ |

TABLE 8-continued

| PEx | PSyn | Chemical Structure | Data |
|---|---|---|---|
| 28 | 10 | | ES + APCI; 160.1 [M + H − 100]+ |
| 29 | 29 | | ES + APCI; 404 |
| 30 | 30 | | ES + APCI; 286 [M + H − 100]+ |
| 31 | 31 | | ES + APCI; 286 |

TABLE 9

| PEx | PSyn | Chemical Structure | Data |
|---|---|---|---|
| 32 | 32 | | ES + APCI; 453.3 [M + H − 100]+ |
| 33 | 29 | | ES + APCI; 330.2 [M + H − 100]+ |

TABLE 9-continued

| PEx | PSyn | Chemical Structure | Data |
|---|---|---|---|
| 34 | 30 | | ES + APCI; 312.2 [M + H − 100]+ |
| 35 | 31 | | ES + APCI; 312.2 |
| 36 | 32 | | ES + APCI; 479.3 [M + H − 100]+ |
| 37 | 37 | | ES + APCI; 212 [M + H − 100]+ |

TABLE 10

| PEx | PSyn | Chemical Structure | Data |
|---|---|---|---|
| 38 | 29 | | ES + APCI; 330.1 [M + H − 100]+ |
| 39 | 39 | | ES + APCI; 312.1 [M + H − 100]+ |
| 40 | 31 | | ES + APCI; 312.1 |

TABLE 10-continued

| PEx | PSyn | Chemical Structure | Data |
|---|---|---|---|
| 41 | 32 | | ES + APCI; 479.1 [M + H − 100]+ |
| 42 | 42 | | ES; 212.9 [M + H − 100]+ |
| 43 | 43 | | ES; 355 [M + H − 100 − 18]+ |
| 44 | 44 | | ES; 354.9 |

TABLE 11

| PEX | PSyn | Chemical Structure | Data |
|---|---|---|---|
| 45 | 45 | | ES; 730.2 |
| 46 | 46 | | ES + APCI; 286.3 [M + H − 100]+ |

TABLE 11-continued

| PEX | PSyn | Chemical Structure | Data |
|---|---|---|---|
| 47 | 31 | | ES; 286.2 |
| 48 | 45 | | ES; 453.3 [M + H − 100]+ |
| 49 | 37 | | ES; 186.1 [M + H − 100]+ |
| 50 | 46 | | ES; 314.1 [M + H − 100]+ |
| 51 | 31 | | ES; 314.1 |

TABLE 12

| PEx | PSyn | Chemical Structure | Data |
|---|---|---|---|
| 52 | 52 | | ES; 329.1 [M + H − 100]+ |
| 53 | 31 | | ES; 329.1 |

TABLE 12-continued
| PEx | PSyn | Chemical Structure | Data |
|---|---|---|---|
| 54 | 54 | 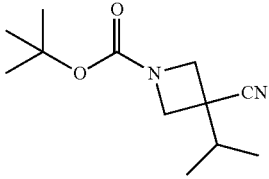 [SMILES: CC(C)C1(C#N)CN(C(=O)OC(C)(C)C)C1] | ES; 125.2 [M + H − 100]+ |
| 55 | 55 | 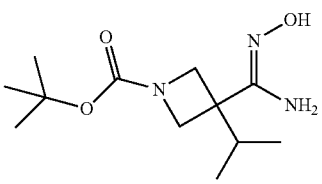 [SMILES: CC(C)C1(/C(N)=N/O)CN(C(=O)OC(C)(C)C)C1] | ES; 158.1 [M + H − 100]+ |
| 56 | 46 | 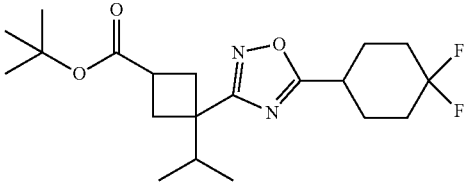 | ES; 286.1 [M + H − 100]+ |
| 57 | 31 | 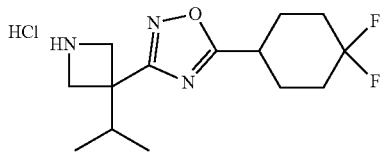 [SMILES: Cl ; CC(C)C1(c2noc(C3CCC(F)(F)CC3)n2)CNC1] | ES; 286.1 |
| 58 | 32 | 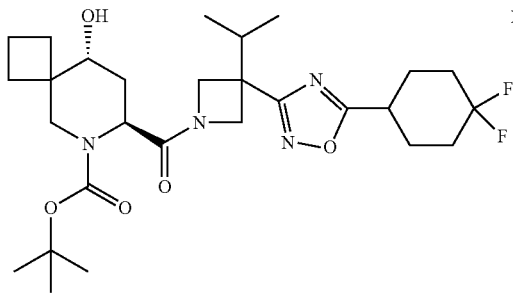 [SMILES: CC(C)C1(c2noc(C3CCC(F)(F)CC3)n2)CN(C(=O)[C@@H]2C[C@@H](O)C3(CCC3)CN2C(=O)OC(C)(C)C)C1] | ES; 553.3 |
TABLE 13
| PEx | PSyn | Chemical Structure | Data |
|---|---|---|---|
| 59 | 59 | 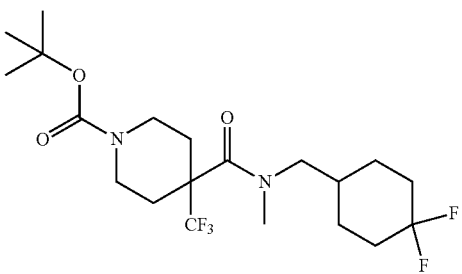 [SMILES: CN(CC1CCC(F)(F)CC1)C(=O)C1(C(F)(F)F)CCN(C(=O)OC(C)(C)C)CC1] | ES + APCI; 343 [M + H − 100]+ |

TABLE 13-continued
| PEx | PSyn | Chemical Structure | Data |
| --- | --- | --- | --- |
| 60 | 31 | 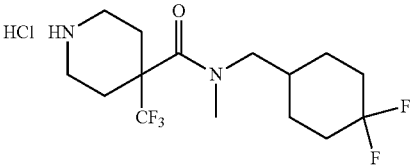 [SMILES: Cl ; CN(CC1CCC(F)(F)CC1)C(=O)C1(C(F)(F)F)CCNCC1] | ES; 343 |
| 61 | 32 | 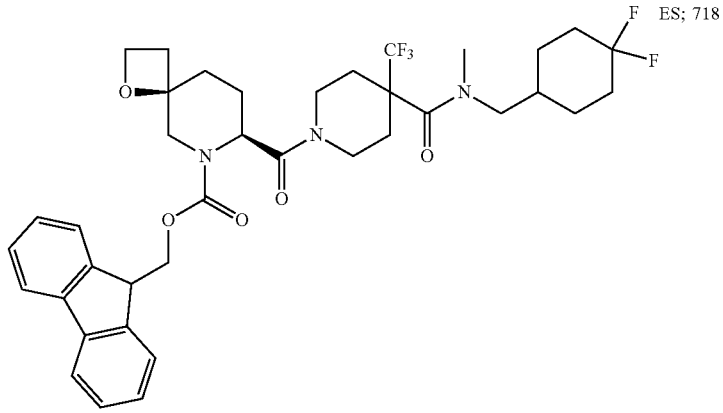 | ES; 718 |
| 62 | 32 | 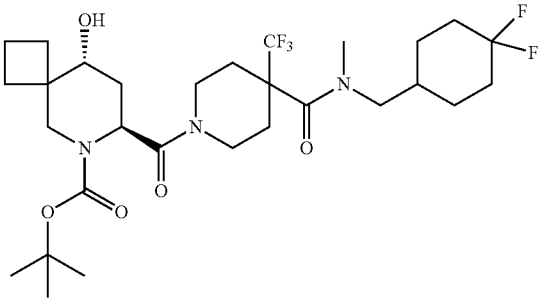 [SMILES: CN(CC1CCC(F)(F)CC1)C(=O)C1(C(F)(F)F)CCN(C(=O)[C@@H]2C[C@@H](O)C3(CCC3)CN2C(=O)OC(C)(C)C)CC1] | ES; 510 [M + H − 100]+ |
| 63 | 32 | 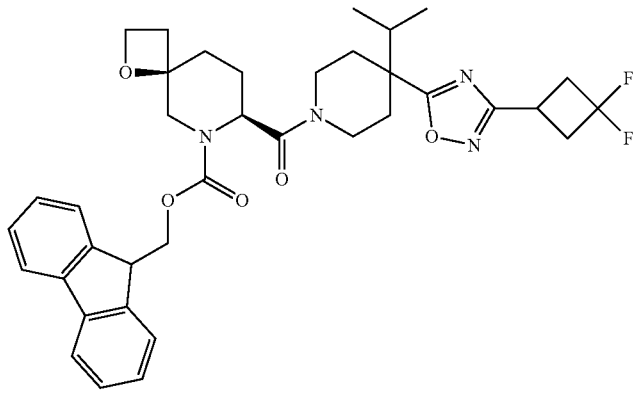 [SMILES: CC(C)C1(c2nc(C3CC(F)(F)C3)no2)CCN(C(=O)[C@@H]2CC[C@@]3(CCO3)CN2C(=O)OCC2c3ccccc3-c3ccccc32)CC1] | ES; 661 |

TABLE 14
| PEx | PSyn | Chemical Structure | Data |
|---|---|---|---|
| 64 | 32 | 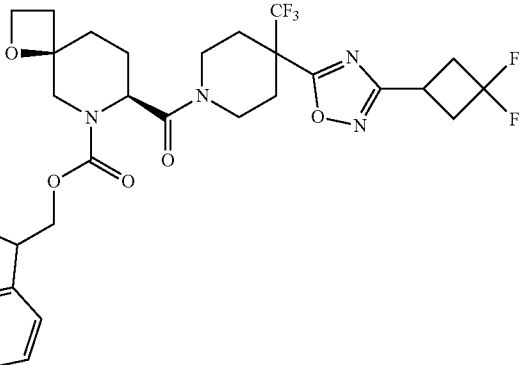 | ES + APCI; 687.1 |
| 65 | 32 | 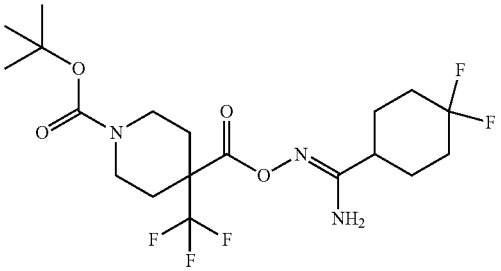 [SMILES: CC(C)(C)OC(=O)N1CCC(C(=O)O/N=C(\N)C2CCC(F)(F)CC2)(C(F)(F)F)CC1] | ES; 358 [M + H − 100]+ |
| 66 | 30 | 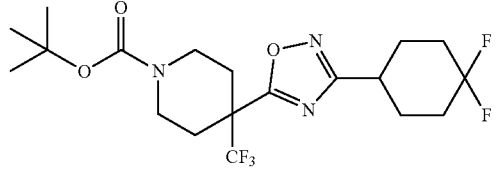 [SMILES: CC(C)(C)OC(=O)N1CCC(c2nc(C3CCC(F)(F)CC3)no2)(C(F)(F)F)CC1] | ES; 339.9 [M + H − 100]+ |
| 67 | 31 | 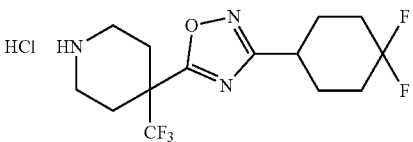 | ES; 340 |
| 68 | 32 | 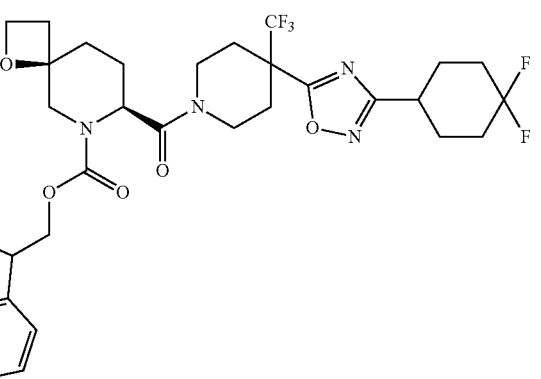 | ES; 716 |

TABLE 14-continued

| PEx | PSyn | Chemical Structure | Data |
|---|---|---|---|
| 69 | 29 | | ES; 430.1 [M − H]− |

TABLE 15

| PEx | PSyn | Chemical Structure | Data |
|---|---|---|---|
| 70 | 30 | | ES + APCI; 314.3 [M + H − 100]+ |
| 71 | 31 | | ES; 313.9 |
| 72 | 32 | | ES; 481 [M + H − 100]+ |
| 73 | 32 | | ES; 507 [M + H − 100]+ |
| 74 | 29 | | ES; 332 [M + H − 100]+ |

TABLE 15-continued

| PEx | PSyn | Chemical Structure | Data |
|---|---|---|---|
| 75 | 75 | | ES; 314.1 |
| 76 | 32 | | ES; 481 [M + H − 100]+ |

TABLE 16

| PEx | PSyn | Chemical Structure | Data |
|---|---|---|---|
| 77 | 32 | | ES; 261.1 [M + H − 100]+ |
| 78 | 31 | | ES; 261 |
| 79 | 32 | | ES; 527.9 |
| 80 | 32 | | ES; 304.1 [M + H − 100]+ |

TABLE 16-continued
| PEx | PSyn | Chemical Structure | Data |
|---|---|---|---|
| 81 | 75 | 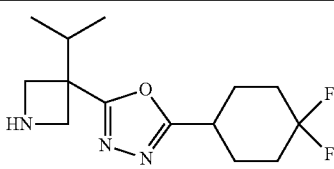 | ES; 286 |
| 82 | 32 | 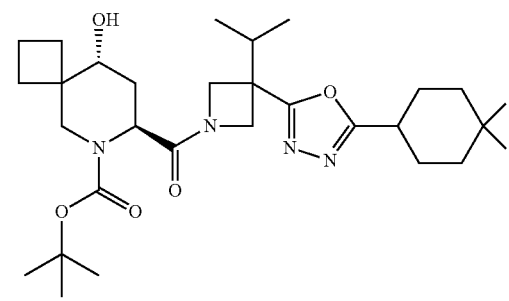 | ES; 452.9 [M + H − 100]+ |
TABLE 17
| PEx | PSyn | Chemical Structure | Data |
|---|---|---|---|
| 83 | 32 | 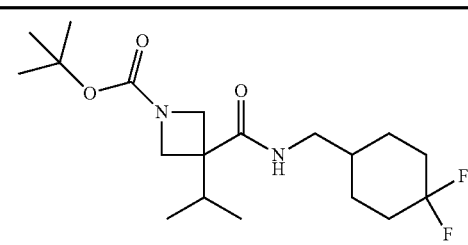 | ES; 275.1 [M + H − 100]+ |
| 84 | 59 | 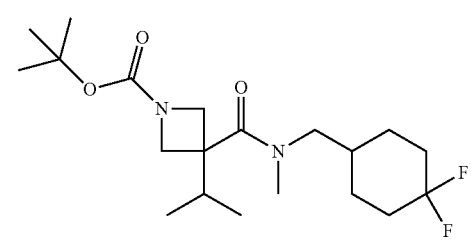 [SMILES: CC(C)C1(C(=O)N(C)CC2CCC(F)(F)CC2)CN(C(=O)OC(C)(C)C)C1] | ES; 289.1 [M + H − 100]+ |
| 85 | 31 | 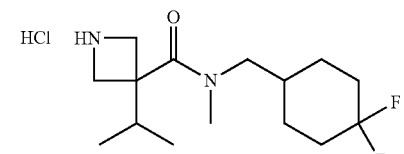 | ES + APCI; 289.1 |
| 86 | 32 | 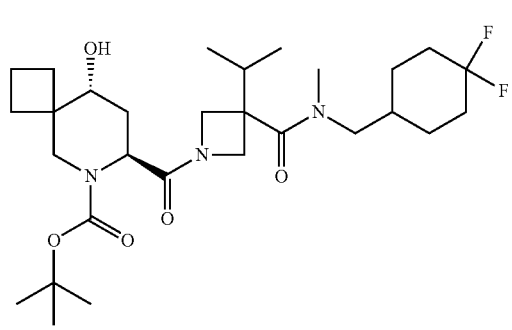 [SMILES: CC(C)C1(C(=O)N(C)CC2CCC(F)(F)CC2)CN(C(=O)[C@@H]2C[C@@H](O)C3(CCC3)CN2C(=O)OC(C)(C)C)C1] | ES; 556 |

TABLE 17-continued

| PEx | PSyn | Chemical Structure | Data |
|---|---|---|---|
| 87 | 29 | | ES; 276 [M + H − 100]+ |
| 88 | 30 | | ES; 257.8 [M + H − 100]+ |

TABLE 18

| PEx | PSyn | Chemical Structure | Data |
|---|---|---|---|
| 89 | 31 | | ES; 258 |
| 90 | 32 | | ES; 525.1 |
| 91 | 29 | | ES; 304.1 [M + H − 100]+ |
| 92 | 30 | | ES; 286.0 [M + H − 100]+ |

TABLE 18-continued

| PEx | PSyn | Chemical Structure | Data |
|---|---|---|---|
| 93 | 31 | | ES; 286.0 |
| 94 | 32 | | ES; 453.1 [M + H − 100]+ |
| 95 | 31 | | ES; 275 |

TABLE 19

| PEx | PSyn | Chemical Structure | Data |
|---|---|---|---|
| 96 | 32 | | ES; 442.1 [M + H − 100]+ |
| 97 | 32 | | ES; 661.1 |

TABLE 19-continued

| PEx | PSyn | Chemical Structure | Data |
|---|---|---|---|
| 98 | 32 | | ES; 496.3 [M + H − 100]+ |
| 99 | 32 | | ES; 551.4 |

TABLE 20

| PEx | PSyn | Chemical Structure | Data |
|---|---|---|---|
| 100 | 45 | | ES; 529.3 |
| 101 | 101 | | ES; 527.3 |

TABLE 20-continued
| PEx | PSyn | Chemical Structure | Data |
|---|---|---|---|
| 102 | 45 | 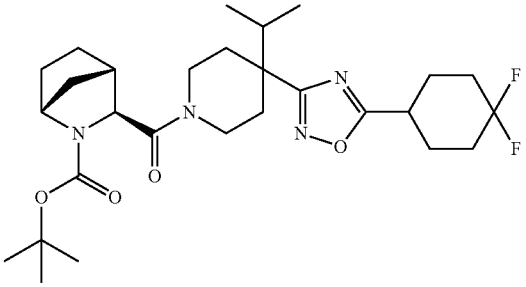 [SMILES: CC(C)C1(c2noc(C3CCC(F)(F)CC3)n2)CCN(C(=O)[C@@H]2[C@H]3CC[C@H](C3)N2C(=O)OC(C)(C)C)CC1] | ES; 437.3 [M + H − 100]+ |
| 103 | 32 | 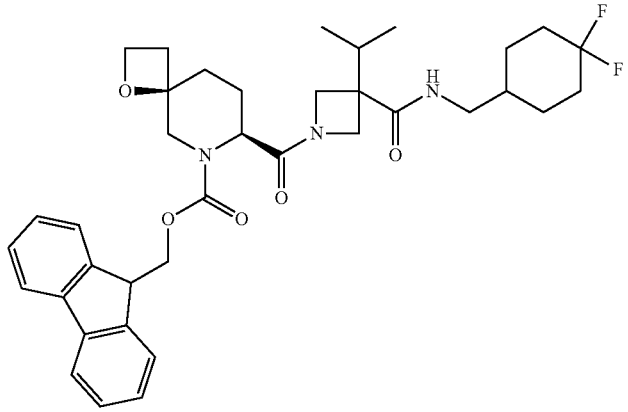 [SMILES: CC(C)C1(C(=O)NCC2CCC(F)(F)CC2)CN(C(=O)[C@@H]2CC[C@@]3(CCO3)CN2C(=O)OCC2c3ccccc3-c3ccccc32)C1] | ES + APCI; 650.3 |
| 104 | 45 | 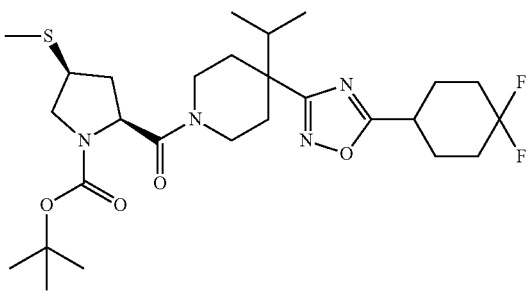 [SMILES: CS[C@H]1C[C@@H](C(=O)N2CCC(c3noc(C4CCC(F)(F)CC4)n3)(C(C)C)CC2)N(C(=O)OC(C)(C)C)C1] | ES; 557.3 |
TABLE 21
| PEx | PSyn | Chemical Structure | Data |
|---|---|---|---|
| 105 | 45 | 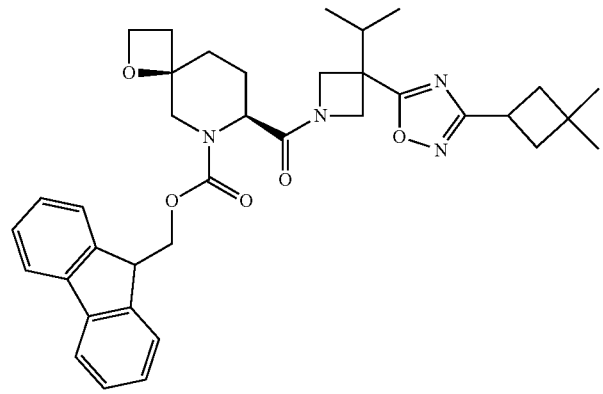 [SMILES: CC(C)C1(c2nc(C3CC(C)(C)C3)no2)CN(C(=O)[C@@H]2CC[C@@]3(CCO3)CN2C(=O)OCC2c3ccccc3-c3ccccc32)C1] | ES + APCI; 625.4 |

TABLE 21-continued

| PEx | PSyn | Chemical Structure | Data |
|---|---|---|---|
| 106 | 29 | | ES; 368.3 |
| 107 | 30 | | ES; 250.1 [M + H − 100]+ |
| 108 | 31 | | ES; 250.2 |
| 109 | 109 | | ES; 590.3 [M + 2H]+ |
| 110 | 46 | | ES; 340.2 [M + H − 100]+ |

TABLE 22

| PEx | PSyn | Chemical Structure | Data |
|---|---|---|---|
| 111 | 31 | | ES; 340.2 |

TABLE 22-continued

| PEx | PSyn | Chemical Structure | Data |
|---|---|---|---|
| 112 | 32 | | ES; 507.3 [M + H − 100]+ |
| 113 | 32 | | ES; 293.1 [M + H − 100]+ |
| 114 | 114 | | ES; 293.2 |
| 115 | 32 | | ES; 460.3 [M + H − 100]+ |
| 116 | 32 | | ES; 343.2 [M + H − 100]+ |

TABLE 23
| PEx | PSyn | Chemical Structure | Data |
|---|---|---|---|
| 117 | 31 | 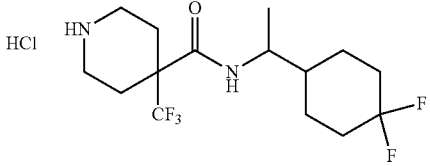 [SMILES: Cl ; CC(NC(=O)C1(C(F)(F)F)CCNCC1)C1CCC(F)(F)CC1] | ES + APCI; 343.3 |
| 118 | 32 | 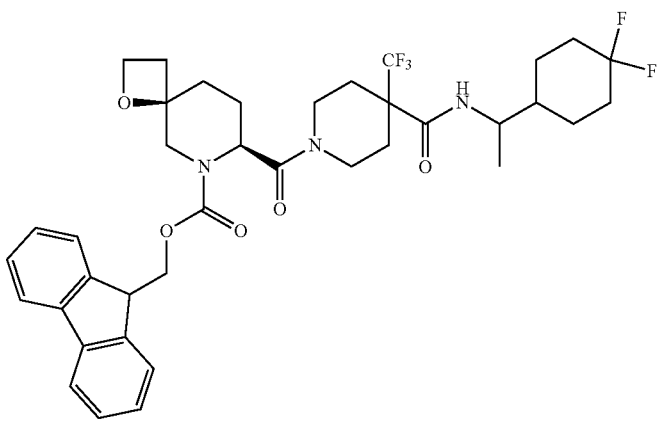 [SMILES: CC(NC(=O)C1(C(F)(F)F)CCN(C(=O)[C@@H]2CC[C@@]3(CCO3)CN2C(=O)OCC2c3ccccc3-c3ccccc32)CC1)C1CCC(F)(F)CC1] | ES + APCI; 718.3 |
| 119 | 32 | 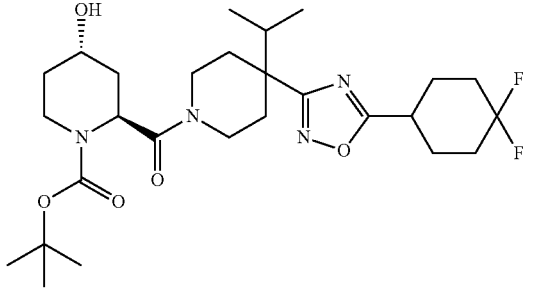 [SMILES: CC(C)C1(c2noc(C3CCC(F)(F)CC3)n2)CCN(C(=O)[C@@H]2C[C@@H](O)CCN2C(=O)OC(C)(C)C)CC1] | ES; 441.4 [M + H − 100]+ |
| 120 | 32 | 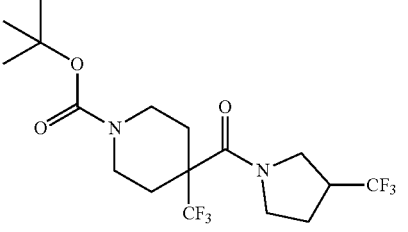 [SMILES: CC(C)(C)OC(=O)N1CCC(C(=O)N2CCC(C(F)(F)F)C2)(C(F)(F)F)CC1] | ES + APCI; 319.2 [M + H − 100]+ |
| 121 | 31 | 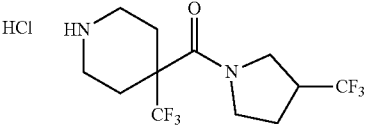 [SMILES: Cl ; O=C(N1CCC(C(F)(F)F)C1)C1(C(F)(F)F)CCNCC1] | ES; 318.9 |

TABLE 24

| PEx | PSyn | Chemical Structure | Data |
|---|---|---|---|
| 122 | 45 | | ES; 485.9 [M + H − 100]+ |
| 123 | 45 | | ES; 469 [M + H − 100]+ |
| 124 | 32 | | ES; 335.2 [M + H − 100]+ |
| 125 | 31 | | ES + APCI; 335.2 |
| 126 | 45 | | ES + APCI; 502.3 [M + H − 100]+ |

TABLE 25

| PEx | PSyn | Chemical Structure | Data |
|---|---|---|---|
| 127 | 45 | | ES + APCI; 567.4 |
| 128 | 32 | | ES + APCI; 335.2 [M + H − 100]+ |
| 129 | 31 | | ES; 334.9 |
| 130 | 45 | | ES; 502 [M + H − 100]+ |
| 131 | 45 | | ES + APCI; 686.8 |

TABLE 26

| PEx | PSyn | Chemical Structure | Data |
|---|---|---|---|
| 132 | 45 | | ES + APCI; 453.3 [M + H − 100]+ |
| 133 | 45 | | ES + APCI; 465.3 [M + H − 100]+ |
| 134 | 15 | | ES + APCI; 244.2 |
| 135 | 6 | | ES + APCI; 244.2 [M + H − 100]+ |
| 136 | 9 | | ES + APCI; 130.2 [M + H − 100]+ |
| 137 | 10 | | ES + APCI; 144.2 [M + H − 100]+ |

TABLE 27

| PEx | PSyn | Chemical Structure | Data |
|---|---|---|---|
| 138 | 45 | | ES + APCI; 439.3 [M + H − 100]+ |
| 139 | 37 | | ES + APCI; 339 |
| 140 | 46 | | ES + APCI; 339 [M + H − 56]+ |
| 141 | 31 | | ES + APCI; 339 |
| 142 | 29 | | ES + APCI; 344.1 [M + H − 100]+ |
| 143 | 30 | | ES + APCI; 326.1 [M + H − 100]+ |

TABLE 28

| PEx | PSyn | Chemical Structure | Data |
|---|---|---|---|
| 144 | 31 | | NMR (300); δ 9.25 (brs, 2H), 3.38-3.45 (m, 1H), 3.08-3.31 (m, 3H), 2.73-2.97 (m, 4H), 2.20-2.43 (m, 4H), 1.68 (s, 3H) |
| 145 | 45 | | ES + APCI; 493.2 [M + H − 100]+ |
| 146 | 146 | | ES + APCI; 376.1 |
| 147 | 147 | | ES + APCI; 390.2 |
| 148 | 148 | | ES + APCI; 142.3 |
| 149 | 6 | | ES + APCI; 242.3 |

TABLE 29

| PEx | PSyn | Chemical Structure | Data |
|---|---|---|---|
| 150 | 10 | | ES + APCI; 156.1[M + H − 100]+ |
| 151 | 45 | | ES + APCI; 451.3[M + H − 100]+ |
| 152 | 29 | | ES + APCI; 352.1[M + H − 100]+ |
| 153 | 30 | | ES + APCI; 334.1[M + H − 100]+ |
| 154 | 31 | | ES + APCI; 334.1 |
| 155 | 45 | | ES + APCI; 501.2[M + H − 100]+ |

TABLE 30

| PEx | PSyn | Chemical Structure | Data |
|---|---|---|---|
| 156 | 46 | | ES + APCI; 369[M + H − 100]+ |
| 157 | 31 | HCl | ES + APCI; 369 |
| 158 | 45 | | ES + APCI; 536.2[M + H − 100]+ |
| 159 | 29 | | ES + APCI; 326.2[M + H − 100]+ |
| 160 | 39 | | ES + APCI; 308.1[M + H − 100]+ |
| 161 | 31 | HCl | ES + APCI; 308.1 |

TABLE 31

| PEx | PSyn | Chemical Structure | Data |
|---|---|---|---|
| 162 | 45 | | ES + APCI; 475.3[M + H − 100]+ |
| 163 | 29 | | ES + APCI; 360.1[M + H − 100]+ |
| 164 | 39 | | ES + APCI; 342.1[M + H − 100]+ |
| 165 | 31 | | ES + APCI; 342.1 |
| 166 | 32 | | ES + APCI; 509.2[M + H − 100]+ |
| 167 | 45 | | ES + APCI; 605.9 |

TABLE 32
| PEx | PSyn | Chemical Structure | Data |
|---|---|---|---|
| 168 | 45 | 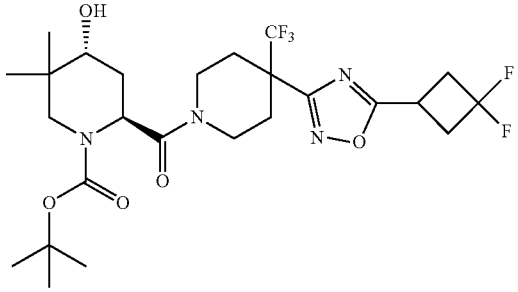 [SMILES: CC(C)(C)OC(=O)N1CC(C)(C)[C@H](O)C[C@H]1C(=O)N1CCC(c2noc(C3CC(F)(F)C3)n2)(C(F)(F)F)CC1] | ES + APCI; 466.9[M + H − 100]+ |
| 169 | 32 | 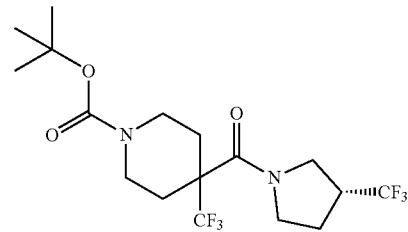 | ES + APCI; 319.1[M + H − 100]+ |
| 170 | 31 | 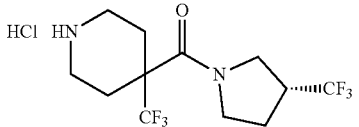 [SMILES: Cl ; O=C(N1CC[C@@H](C(F)(F)F)C1)C1(C(F)(F)F)CCNCC1] | ES + APCI; 319.1 |
| 171 | 45 | 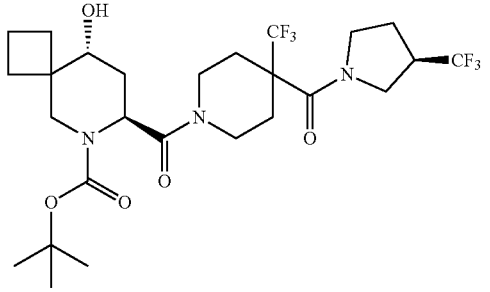 [SMILES: CC(C)(C)OC(=O)N1CC2(CCC2)[C@H](O)C[C@H]1C(=O)N1CCC(C(=O)N2CC[C@@H](C(F)(F)F)C2)(C(F)(F)F)CC1] | ES + APCI; 486.1[M + H − 100]+ |
| 172 | 29 | 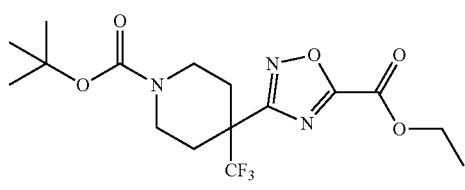 [SMILES: CCOC(=O)c1nc(C2(C(F)(F)F)CCN(C(=O)OC(C)(C)C)CC2)no1] | ES + APCI; 294.1[M + H − 100]+ |
| 173 | 173 | 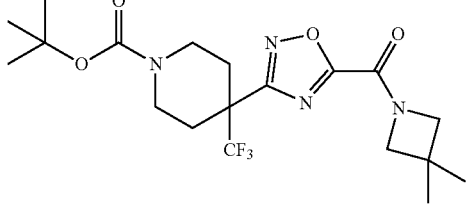 | ES + APCI; 376.9[M + H − 56]+ |

TABLE 33

| PEx | PSyn | Chemical Structure | Data |
|---|---|---|---|
| 174 | 31 | | ES + APCI; 333.1 |
| 175 | 45 | | ES + APCI; 500.2[M + H − 100]+ |
| 176 | 45 | | ES + APCI; 441.3[M + H − 100]+ |
| 177 | 32 | | ES + APCI; 319.1[M + H − 100]+ |
| 178 | 31 | | ES + APCI; 319.1 |
| 179 | 45 | | ES + APCI; 485.9[M + H − 100]+ |

TABLE 34
| PEx | PSyn | Chemical Structure | Data |
|---|---|---|---|
| 180 | 32 | 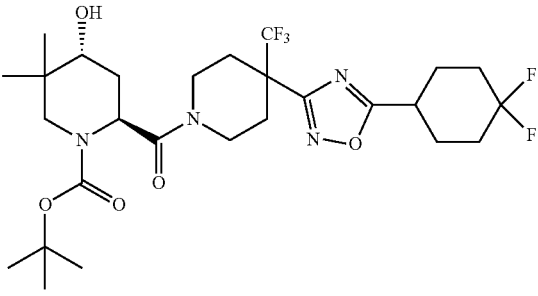 [SMILES: CC(C)(C)OC(=O)N1CC(C)(C)[C@H](O)C[C@H]1C(=O)N1CCC(c2noc(C3CCC(F)(F)CC3)n2)(C(F)(F)F)CC1] | ES + APCI; 495.1[M + H − 100]+ |
| 181 | 32 | 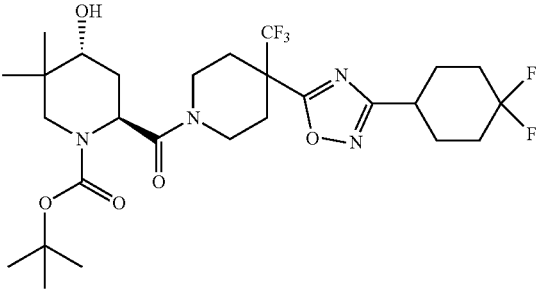 [SMILES: CC(C)(C)OC(=O)N1CC(C)(C)[C@H](O)C[C@H]1C(=O)N1CCC(c2nc(C3CCC(F)(F)CC3)no2)(C(F)(F)F)CC1] | ES + APCI; 495.3[M + H − 100]+ |
| 182 | 29 | 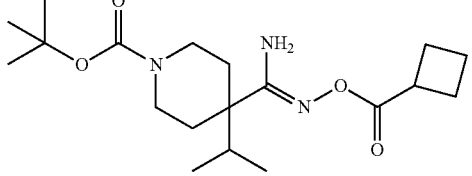 | ES + APCI; 312.3[M + H − 56]+ |
| 183 | 39 | 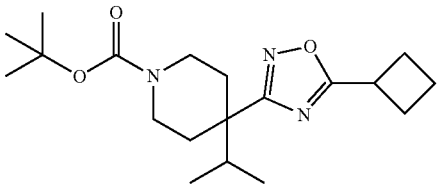 [SMILES: CC(C)C1(c2noc(C3CCC3)n2)CCN(C(=O)OC(C)(C)C)CC1] | ES + APCI; 250.3[M + H − 100]+ |
| 184 | 31 | 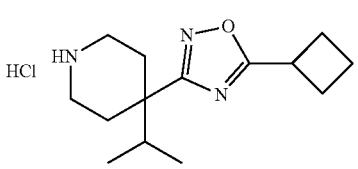 [SMILES: Cl ; CC(C)C1(c2noc(C3CCC3)n2)CCNCC1] | ES + APCI; 250.3 |
| 185 | 32 | 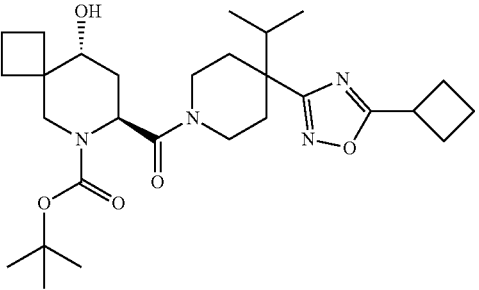 [SMILES: CC(C)C1(c2noc(C3CCC3)n2)CCN(C(=O)[C@@H]2C[C@@H](O)C3(CCC3)CN2C(=O)OC(C)(C)C)CC1] | ES + APCI; 517.4 |

TABLE 34-continued
| PEx | PSyn | Chemical Structure | Data |
|---|---|---|---|
| 186 | 29 | 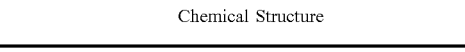 | ES + APCI; 324.1[M + H − 100]+ |
TABLE 35
| PEx | PSyn | Chemical Structure | Data |
|---|---|---|---|
| 187 | 39 | | ES + APCI; 306[M + H − 100]+ |
| 188 | 31 | | ES + APCI; 305.9 |
| 189 | 32 | | ES + APCI; 473.3[M + H − 100]+ |
| 190 | 29 | | ES + APCI; 324.1[M + H − 100]+ |
| 191 | 39 | | ES + APCI; 305.9[M + H − 100]+ |
| 192 | 31 | | ES + APCI; 306 |

TABLE 35-continued
| PEx | PSyn | Chemical Structure | Data |
|---|---|---|---|
| 193 | 32 | 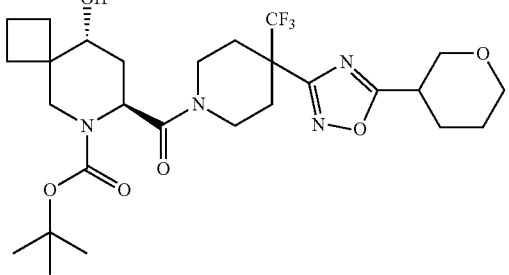 | ES + APCI; 473.3[M + H − 100]+ |
TABLE 36
| PEx | PSyn | Chemical Structure | Data |
|---|---|---|---|
| 194 | 29 | 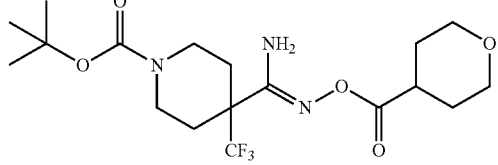 | ES + APCI; 324.1[M + H − 100]+ |
| 195 | 39 | 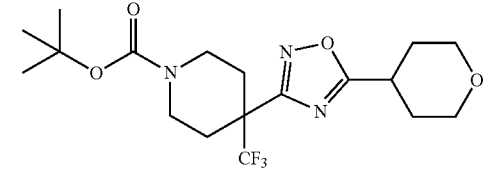 [SMILES: CC(C)(C)OC(=O)N1CCC(c2noc(C3CCOCC3)n2)(C(F)(F)F)CC1] | ES + APCI; 305.9[M + H − 100]+ |
| 196 | 31 | 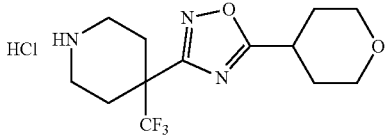 [SMILES: Cl ; FC(F)(F)C1(c2noc(C3CCOCC3)n2)CCNCC1] | ES + APCI; 306 |
| 197 | 32 | 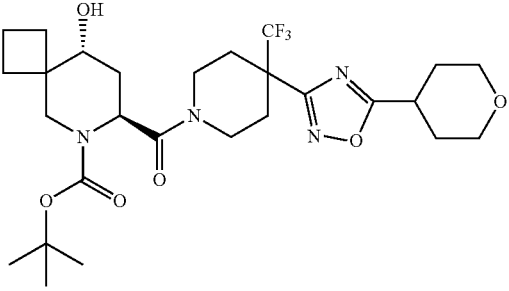 [SMILES: CC(C)(C)OC(=O)N1CC2(CCC2)[C@H](O)C[C@H]1C(=O)N1CCC(c2noc(C3CCOCC3)n2)(C(F)(F)F)CC1] | ES + APCI; 473.3[M + H − 100]+ |
| 198 | 29 | 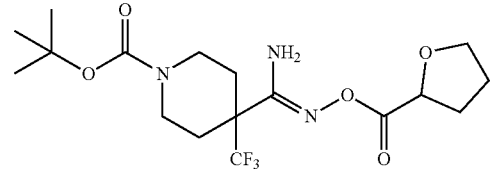 [SMILES: CC(C)(C)OC(=O)N1CCC(/C(N)=N/OC(=O)C2CCCO2)(C(F)(F)F)CC1] | ES + APCI; 310.1[M + H − 100]+ |

TABLE 36-continued

| PEx | PSyn | Chemical Structure | Data |
|---|---|---|---|
| 199 | 39 | | ES + APCI; 291.9[M + H − 100]+ |
| 200 | 31 | | ES + APCI; 292 |

TABLE 37

| PEx | PSyn | Chemical Structure | Data |
|---|---|---|---|
| 201 | 32 | | ES + APCI; 459.3[M + H − 100]+ |
| 202 | 29 | | ES; 581.3[M + H]+ |
| 203 | 39 | | ES; 334.1[M + H − 100]+ |

TABLE 37-continued

| PEx | PSyn | Chemical Structure | Data |
|---|---|---|---|
| 204 | 31 | | ES; 334 |
| 205 | 32 | | ES; 501[M + H − 100]+ |

TABLE 38

| PEx | PSyn | Chemical Structure | Data |
|---|---|---|---|
| 206 | 29 | | ES; 351.3[M + H − 100]+ |
| 207 | 39 | | ES; 351.2 |

TABLE 38-continued

| PEx | PSyn | Chemical Structure | Data |
|---|---|---|---|
| 208 | 31 | | ES; 726.3 |
| 209 | 209 | | ES + APCI; 329.2 |
| 210 | 210 | | ES + APCI; 373.1[M + H − 56]+ |

TABLE 39

| PEx | PSyn | Chemical Structure | Data |
|---|---|---|---|
| 211 | 31 | | ES + APCI; 329.2 |

TABLE 39-continued

| PEx | PSyn | Chemical Structure | Data |
|---|---|---|---|
| 212 | 45 | | ES + APCI; 495.9[M + H − 100]+ |
| 213 | 213 | | ES + APCI; 222.1[M + H − 100]+ |
| 214 | 5 | | ES + APCI; 340.1[M + H − 100]+ |
| 215 | 31 | | ES + APCI; 340.1 |
| 216 | 32 | | ES + APCI; 507.3[M + H − 100]+ |

TABLE 40

| PEx | PSyn | Chemical Structure | Data |
|---|---|---|---|
| 217 | 217 | | ES + APCI; 311.9[M + H − 100]+ |

TABLE 40-continued
| PEx | PSyn | Chemical Structure | Data |
|---|---|---|---|
| 218 | 31 |  | ES + APCI; 312.2 |
| 219 | 32 | 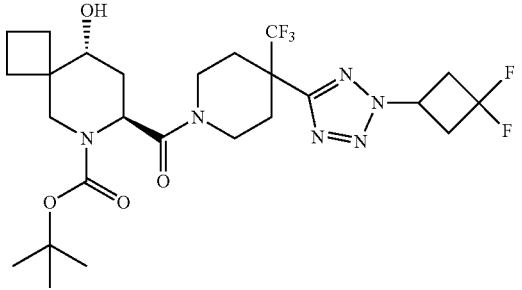 [SMILES: CC(C)(C)OC(=O)N1CC2(CCC2)[C@H](O)C[C@H]1C(=O)N1CCC(c2nnn(C3CC(F)(F)C3)n2)(C(F)(F)F)CC1] | ES + APCI; 479.3[M + H − 100]+ |
| 220 | 55 | 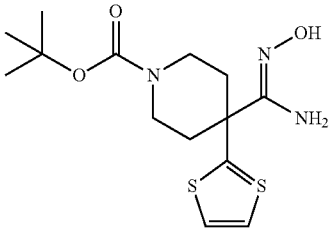 | ES + APCI; 327.3 |
| 221 | 29 | 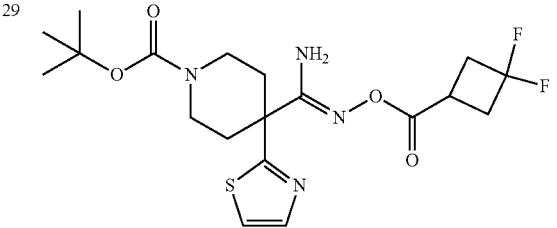 | ES + APCI; 344.9 |
| 222 | 39 | 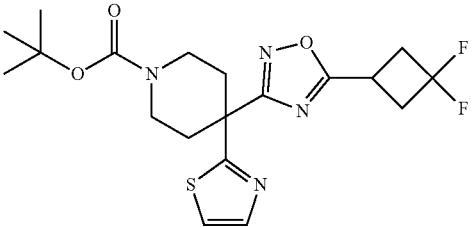 [SMILES: CC(C)(C)OC(=O)N1CCC(c2noc(C3CC(F)(F)C3)n2)(c2nccs2)CC1] | ES + APCI; 327.2[M + H − 100]+ |
TABLE 41
| PEx | PSyn | Chemical Structure | Data |
|---|---|---|---|
| 223 | 31 | 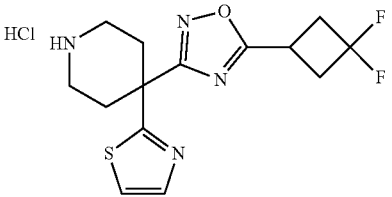 [SMILES: Cl ; FC1(F)CC(c2nc(C3(c4nccs4)CCNCC3)no2)C1] | ES + APCI; 327.2 |

US 12,522,593 B2
TABLE 41-continued
| PEx | PSyn | Chemical Structure | Data |
|---|---|---|---|
| 224 | 32 | 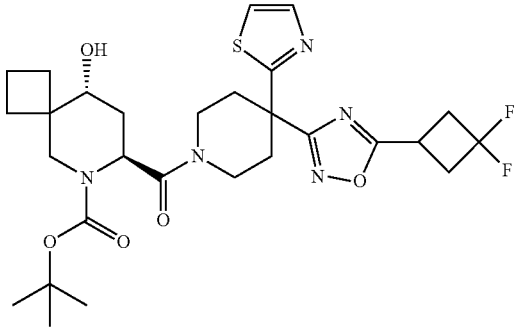 [SMILES: CC(C)(C)OC(=O)N1CC2(CCC2)[C@H](O)C[C@H]1C(=O)N1CCC(c2noc(C3CC(F)(F)C3)n2)(c2nccs2)CC1] | ES + APCI; 593.8 |
| 225 | 37 | 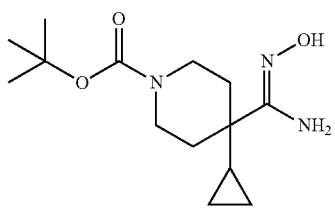 [SMILES: CC(C)(C)OC(=O)N1CCC(/C(N)=N/O)(C2CC2)CC1] | ES + APCI; 284.3 |
| 226 | 29 | 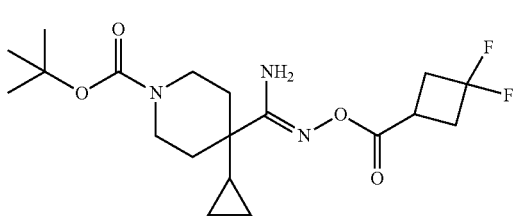 [SMILES: CC(C)(C)OC(=O)N1CCC(/C(N)=N/OC(=O)C2CC(F)(F)C2)(C2CC2)CC1] | ES + APCI; 302.3[M + H − 100]+ |
| 227 | 39 | 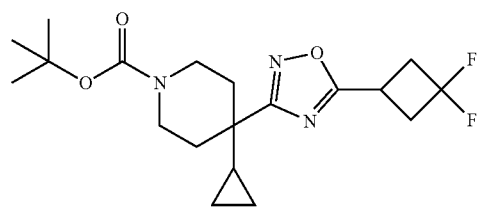 [SMILES: CC(C)(C)OC(=O)N1CCC(c2noc(C3CC(F)(F)C3)n2)(C2CC2)CC1] | ES + APCI; 284.3[M + H − 100]+ |
| 228 | 31 | 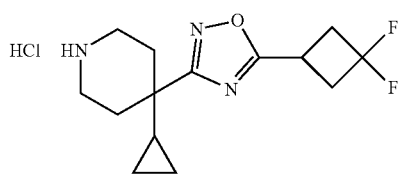 [SMILES: Cl ; FC1(F)CC(c2nc(C3(C4CC4)CCNCC3)no2)C1] | ES + APCI; 284.3 |
TABLE 42
| PEx | PSyn | Chemical Structure | Data |
|---|---|---|---|
| 229 | 32 | 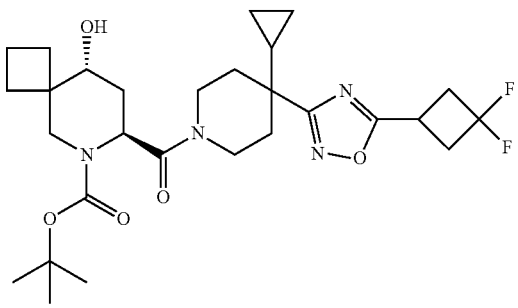 [SMILES: CC(C)(C)OC(=O)N1CC2(CCC2)[C@H](O)C[C@H]1C(=O)N1CCC(c2noc(C3CC(F)(F)C3)n2)(C2CC2)CC1] | ES + APCI; 551.4 |

TABLE 42-continued

| PEx | PSyn | Chemical Structure | Data |
|---|---|---|---|
| 230 | 55 | | ES + APCI; 270[M + H − 56]+ |
| 231 | 29 | | ES + APCI; 343.9[M + H − 100]+ |
| 232 | 39 | | ES + APCI; 325.9[M + H − 100]+ |
| 233 | 31 | | ES + APCI; 326.2 |
| 234 | 32 | | ES + APCI; 592.8 |

TABLE 43

| PEx | PSyn | Chemical Structure | Data |
|---|---|---|---|
| 235 | 29 | | ES + APCI; 253.3[M + H − 56]+ |
| 236 | 236 | | ES + APCI; 191.3[M + H − 100]+ |
| 237 | 55 | | ES + APCI; 268.1[M + H − 56]+ |
| 238 | 29 | | ES + APCI; 386.2[M + H − 56]+ |
| 239 | 39 | | ES + APCI; 368.2[M + H − 56]+ |

TABLE 44

| PEx | PSyn | Chemical Structure | Data |
|---|---|---|---|
| 240 | 31 | | ES + APCI; 324.1 |
| 241 | 32 | | ES + APCI; 591.3 |
| 242 | 29 | | ES + APCI; 324.3 [M + H − 56]+ |
| 243 | 39 | | ES + APCI; 262.3 [M + H − 100]+ |
| 244 | 31 | | ES + APCI; 262.3 |

TABLE 45

| PEx | PSyn | Chemical Structure | Data |
|---|---|---|---|
| 245 | 32 | | ES + APCI; 529.4 |

TABLE 45-continued

| PEx | PSyn | Chemical Structure | Data |
|---|---|---|---|
| 246 | 32 | | ES + APCI; 715.2 |
| 247 | 29 | | ES + APCI; 330.3 [M + H − 100]+ |
| 248 | 39 | | ES + APCI; 312.3 [M + H − 100]+ |
| 249 | 31 | | ES + APCI; 312.3 |

TABLE 46

| PEx | PSyn | Chemical Structure | Data |
|---|---|---|---|
| 250 | 32 | | ES + APCI; 579.3 |

TABLE 46-continued
| PEx | PSyn | Chemical Structure | Data |
|---|---|---|---|
| 251 | 210 | 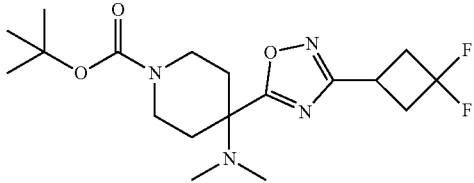 | ES + APCI; 387.3 |
| 252 | 31 | 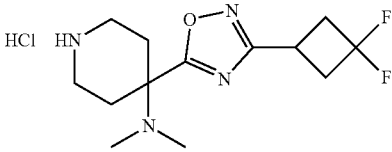 [SMILES: Cl ; CN(C)C1(c2nc(C3CC(F)(F)C3)no2)CCNCC1] | ES + APCI; 287.3 |
| 253 | 32 | 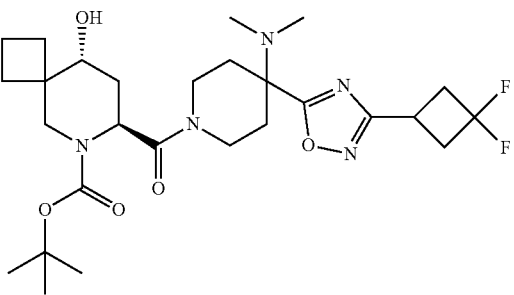 [SMILES: CN(C)C1(c2nc(C3CC(F)(F)C3)no2)CCN(C(=O)[C@@H]2C[C@@H](O)C3(CCC3)CN2C(=O)OC(C)(C)C)CC1] | ES + APCI; 554.4 |
| 254 | 32 | 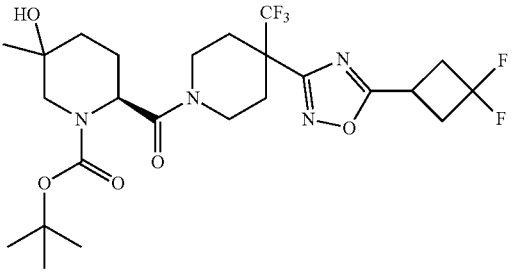 [SMILES: CC1(O)CC[C@@H](C(=O)N2CCC(c3noc(C4CC(F)(F)C4)n3)(C(F)(F)F)CC2)N(C(=O)OC(C)(C)C)C1] | ES + APCI; 553.3 |
| 255 | 210 | 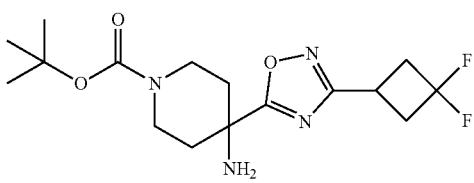 [SMILES: CC(C)(C)OC(=O)N1CCC(N)(c2nc(C3CC(F)(F)C3)no2)CC1] | ES + APCI; 259.3 [M + H − 100]+ |
TABLE 47
| PEx | PSyn | Chemical Structure | Data |
|---|---|---|---|
| 256 | 256 | 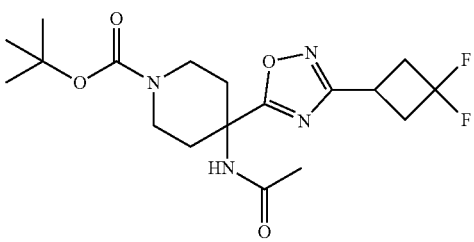 [SMILES: CC(=O)NC1(c2nc(C3CC(F)(F)C3)no2)CCN(C(=O)OC(C)(C)C)CC1] | ES + APCI; 301.3 [M + H − 100]+ |

TABLE 47-continued

| PEx | PSyn | Chemical Structure | Data |
|---|---|---|---|
| 257 | 257 | | ES + APCI; 315.2 [M + H − 100]+ |
| 258 | 31 | | ES + APCI; 315.1 |
| 259 | 32 | | ES + APCI; 482.3 [M + H − 100]+ |
| 260 | 260 | | ES + APCI; 337.2 [M + H − 100]+ |
| 261 | 261 | | ES + APCI; 351 [M + H − 100]+ |

TABLE 48

| PEx | PSyn | Chemical Structure | Data |
|---|---|---|---|
| 262 | 31 | | ES + APCI; 351 |

TABLE 48-continued

| PEx | PSyn | Chemical Structure | Data |
|---|---|---|---|
| 263 | 32 | | ES + APCI; 518.3 [M + H − 100]+ |
| 264 | 264 | | ES + APCI; 193.1 [M + H − 100]+ |
| 265 | 55 | | ES + APCI; 326.1 |
| 266 | 29 | | ES + APCI; 344 [M + H − 100]+ |

TABLE 49

| PEx | PSyn | Chemical Structure | Data |
|---|---|---|---|
| 267 | 39 | | ES + APCI; 326.1 [M + H − 100]+ |

TABLE 49-continued
| PEx | PSyn | Chemical Structure | Data |
|---|---|---|---|
| 268 | 31 | 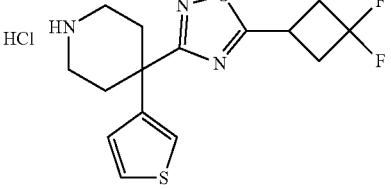 | ES + APCI; 326.1 |
| 269 | 32 | 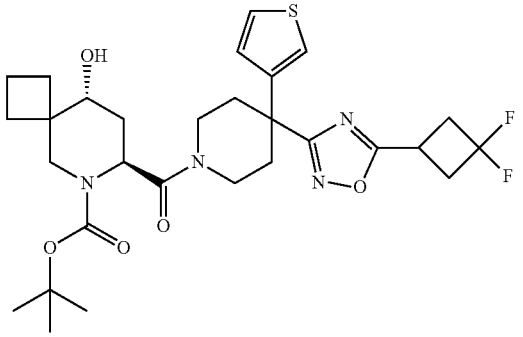 [SMILES: CC(C)(C)OC(=O)N1CC2(CCC2)[C@H](O)C[C@H]1C(=O)N1CCC(c2ccsc2)(c2noc(C3CC(F)(F)C3)n2)CC1] | ES + APCI; 593.3 |
| 270 | 32 | 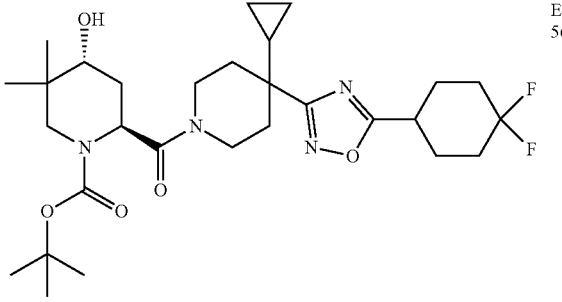 | ES + APCI; 567.1 |
| 271 | 271 | 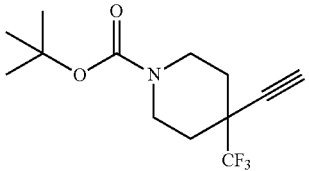 [SMILES: C#CC1(C(F)(F)F)CCN(C(=O)OC(C)(C)C)CC1] | NMR(CDCl3); δ 4.17(bs, 2H), 3.08 (t, J = 11.6 Hz, 2H), 2.45(s, 1H), 1.84-1.87(m, 2H), 1.75 (td, J = 12.8, 4.4 Hz, 2H), 1.49(s, 9H). |
TABLE 50
| PEx | PSyn | Chemical Structure | Data |
|---|---|---|---|
| 272 | 272 | 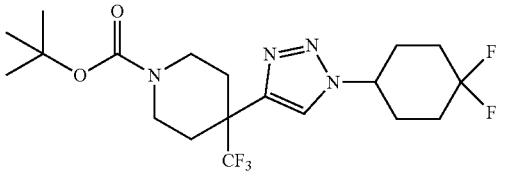 [SMILES: CC(C)(C)OC(=O)N1CCC(c2cn(C3CCC(F)(F)CC3)nn2)(C(F)(F)F)CC1] | ES + APCI; 339.2 [M + H − 100]+ |
| 273 | 31 | 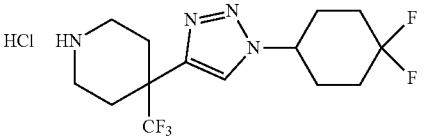 [SMILES: Cl ; FC1(F)CCC(n2cc(C3(C(F)(F)F)CCNCC3)nn2)CC1] | ES + APCI; 339.1 |

TABLE 50-continued

| PEx | PSyn | Chemical Structure | Data |
|---|---|---|---|
| 274 | 32 | | ES + APCI; 506.3 [M + H − 100]+ |
| 275 | 32 | | ES; 704.3 |
| 276 | 32 | | ES + APCI; 689.3 |

TABLE 51

| PEx | PSyn | Chemical Structure | Data |
|---|---|---|---|
| 277 | 101 | | ES; 384.3 [M + H − 100]+ |

TABLE 51-continued
| PEx | PSyn | Chemical Structure | Data |
|---|---|---|---|
| 278 | 278 | 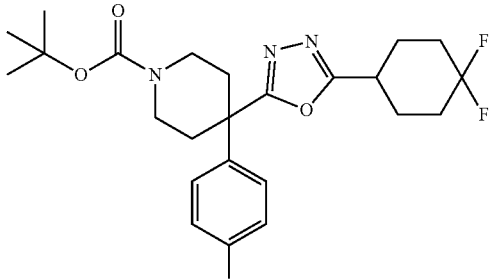 | ES; 366.2 [M + H − 100]+ |
| 279 | 31 | 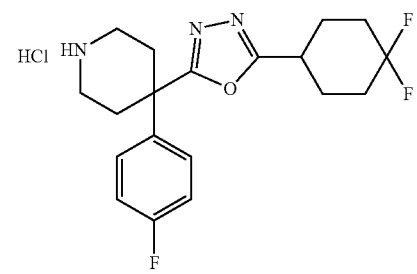 [SMILES: Cl ; Fc1ccc(C2(c3nnc(C4CCC(F)(F)CC4)o3)CCNCC2)cc1] | ES; 366.1 |
| 280 | 32 | 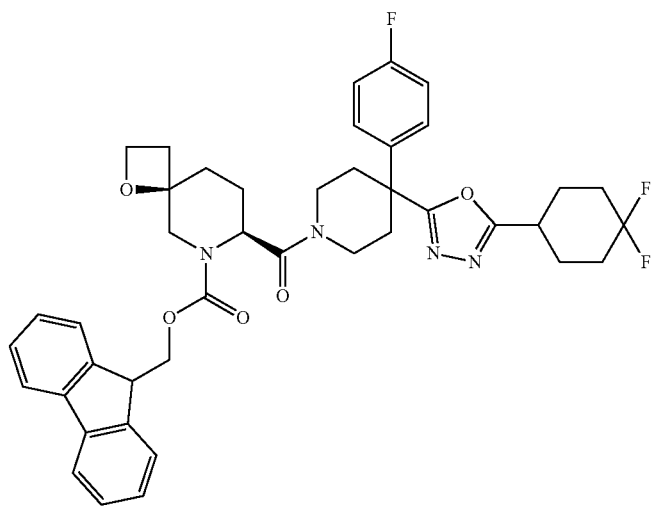 [SMILES: O=C([C@@H]1CC[C@@]2(CCO2)CN1C(=O)OCC1c2ccccc2-c2ccccc21)N1CCC(c2ccc(F)cc2)(c2nnc(C3CCC(F)(F)CC3)o2)CC1] | ES; 741.4 |

TABLE 52

| PEx | PSyn | Chemical Structure | Data |
|---|---|---|---|
| 281 | 32 | | ES; 664.4 |
| 282 | 282 | | ES + APCI; 248.2 [M + H − 100]+ |
| 283 | 31 | | ES + APCI; 248.2 |
| 284 | 32 | | ES + APCI; 515.3 |
| 285 | 32 | | ES + APCI; 503.3 |

TABLE 53
| PEx | PSyn | Chemical Structure | Data |
|---|---|---|---|
| 286 | 286 | 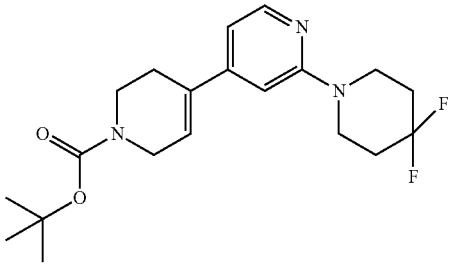 [SMILES: CC(C)(C)OC(=O)N1CC=C(c2ccnc(N3CCC(F)(F)CC3)c2)CC1] | ES + APCI; 380.3 |
| 287 | 287 | 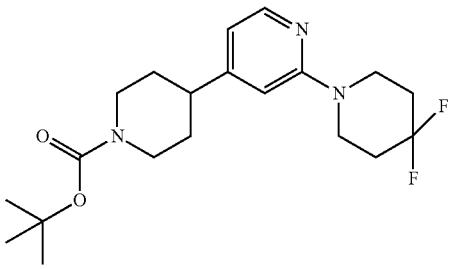 [SMILES: CC(C)(C)OC(=O)N1CCC(c2ccnc(N3CCC(F)(F)CC3)c2)CC1] | ES + APCI; 382.3 |
| 288 | 31 | 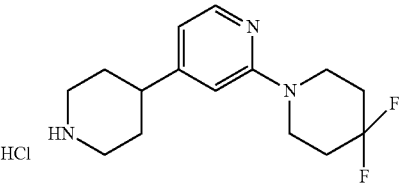 [SMILES: Cl ; FC1(F)CCN(c2cc(C3CCNCC3)ccn2)CC1] | ES + APCI; 282.3 |
| 289 | 32 | 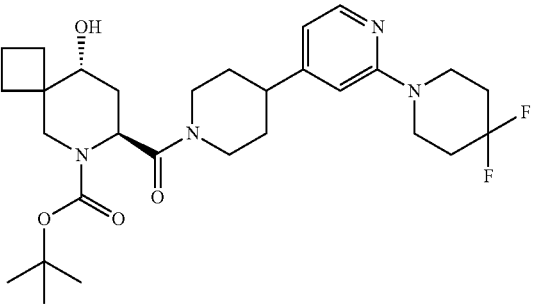 [SMILES: CC(C)(C)OC(=O)N1CC2(CCC2)[C@H](O)C[C@H]1C(=O)N1CCC(c2ccnc(N3CCC(F)(F)CC3)c2)CC1] | ES + APCI; 549.4 |
| 290 | 290 | 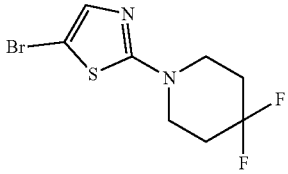 [SMILES: FC1(F)CCN(c2ncc(Br)s2)CC1] | ES + APCI; 283.0, 285.1 |
| 291 | 286 | 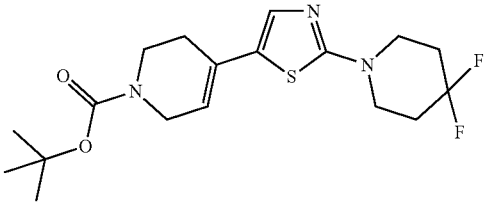 [SMILES: CC(C)(C)OC(=O)N1CC=C(c2cnc(N3CCC(F)(F)CC3)s2)CC1] | ES + APCI; 386.2 |

TABLE 54

| PEx | PSyn | Chemical Structure | Data |
|---|---|---|---|
| 292 | 287 | | ES + APCI; 388.2 |
| 293 | 31 | | ES + APCI; 288.2 |
| 294 | 32 | | ES + APCI; 555.3 |
| 295 | 32 | | ES + APCI; 513.2 |
| 296 | 296 | | ES + APCI; 278.1, 280.1 |
| 297 | 286 | | ES + APCI; 381.3 |

TABLE 55
| PEx | PSyn | Chemical Structure | Data |
|---|---|---|---|
| 298 | 287 | 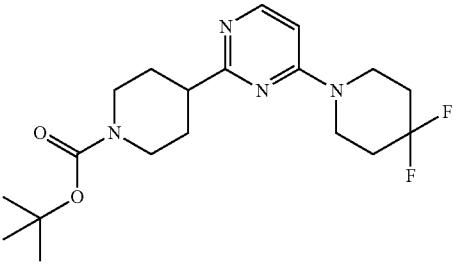 [SMILES: CC(C)(C)OC(=O)N1CCC(c2nccc(N3CCC(F)(F)CC3)n2)CC1] | ES + APCI; 383.3 |
| 299 | 31 | 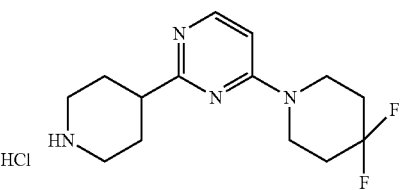 [SMILES: Cl ; FC1(F)CCN(c2ccnc(C3CCNCC3)n2)CC1] | ES + APCI; 283.2 |
| 300 | 32 | 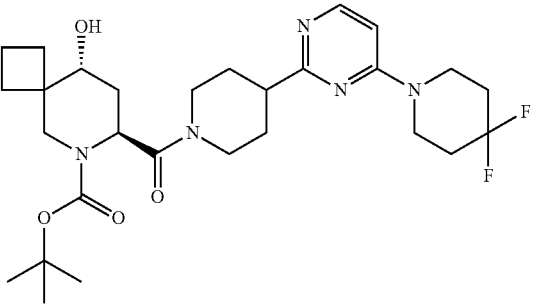 [SMILES: CC(C)(C)OC(=O)N1CC2(CCC2)[C@H](O)C[C@H]1C(=O)N1CCC(c2nccc(N3CCC(F)(F)CC3)n2)CC1] | ES + APCI; 550.4 |
| 301 | 213 | 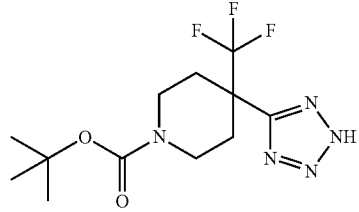 [SMILES: CC(C)(C)OC(=O)N1CCC(c2nn[nH]n2)(C(F)(F)F)CC1] | ES + APCI; 322.2 |
| 302 | 282 | 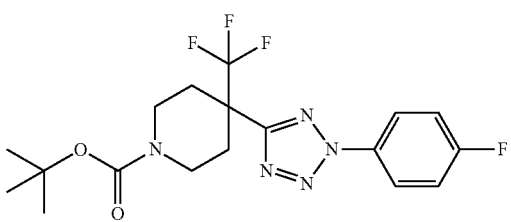 [SMILES: CC(C)(C)OC(=O)N1CCC(c2nnn(-c3ccc(F)cc3)n2)(C(F)(F)F)CC1] | ES + APCI; 316.2 [M + H − 100]+ |
| 303 | 31 | 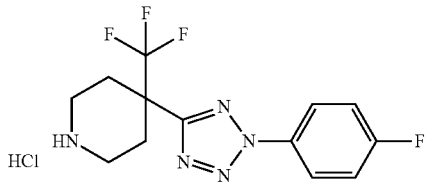 [SMILES: Cl ; Fc1ccc(-n2nnc(C3(C(F)(F)F)CCNCC3)n2)cc1] | ES + APCI; 316.2 |

TABLE 56
| PEx | PSyn | Chemical Structure | Data |
|---|---|---|---|
| 304 | 32 | 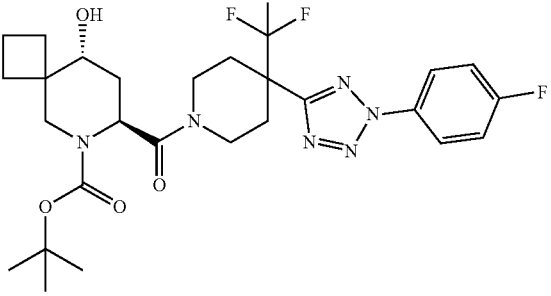 | ES + APCI; 583.3 |
| 305 | 282 | 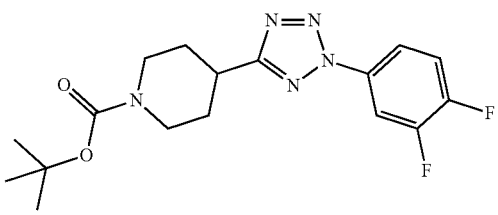 [SMILES: CC(C)(C)OC(=O)N1CCC(c2nnn(-c3ccc(F)c(F)c3)n2)CC1] | ES + APCI; 366.1 |
| 306 | 31 | 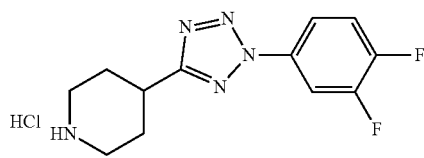 [SMILES: Cl ; Fc1ccc(-n2nnc(C3CCNCC3)n2)cc1F] | ES + APCI; 266.1 |
| 307 | 32 | 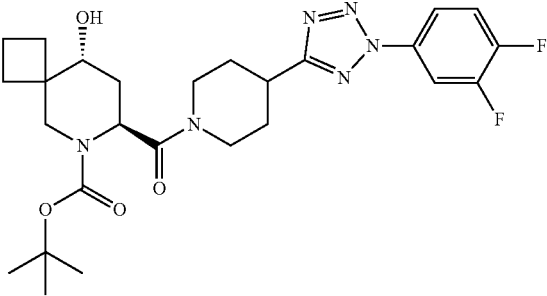 | ES + APCI; 533.3 |
| 308 | 217 | 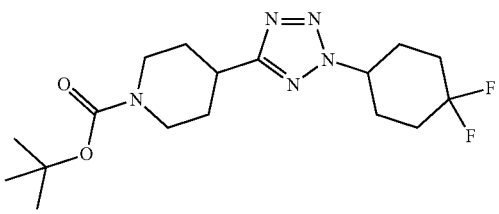 [SMILES: CC(C)(C)OC(=O)N1CCC(c2nnn(C3CCC(F)(F)CC3)n2)CC1] | ES + APCI; 372.1 |
| 309 | 31 | 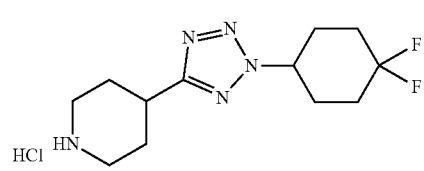 [SMILES: Cl ; FC1(F)CCC(n2nnc(C3CCNCC3)n2)CC1] | ES + APCI; 272.2 |

TABLE 57
| PEx | PSyn | Chemical Structure | Data |
|---|---|---|---|
| 310 | 32 | 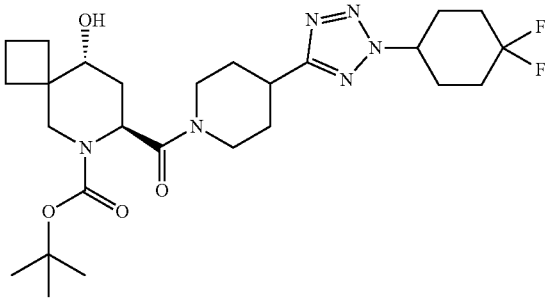 [SMILES: CC(C)(C)OC(=O)N1CC2(CCC2)[C@H](O)C[C@H]1C(=O)N1CCC(c2nnn(C3CCC(F)(F)CC3)n2)CC1] | ES + APCI; 539.3 |
| 311 | 311 | 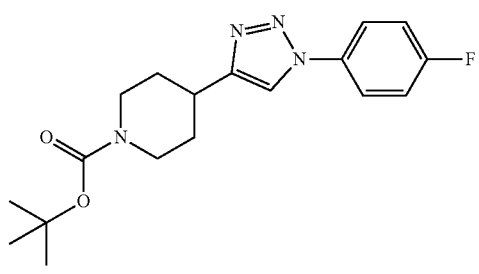 [SMILES: CC(C)(C)OC(=O)N1CCC(c2cn(-c3ccc(F)cc3)nn2)CC1] | ES + APCI; 347.1 |
| 312 | 31 | 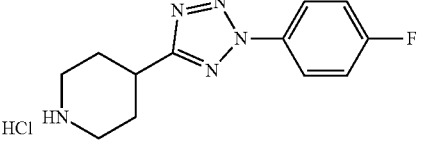 | ES + APCI; 247.2 |
| 313 | 32 | 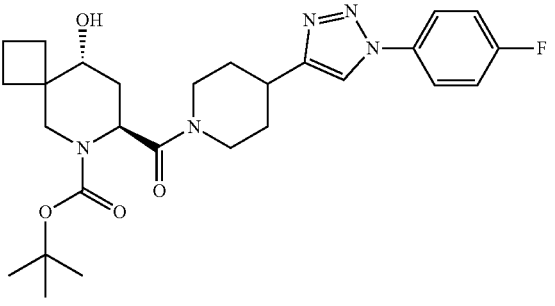 [SMILES: CC(C)(C)OC(=O)N1CC2(CCC2)[C@H](O)C[C@H]1C(=O)N1CCC(c2cn(-c3ccc(F)cc3)nn2)CC1] | ES + APCI; 514.2 |
| 314 | 314 | 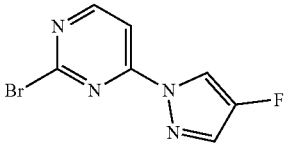 [SMILES: Fc1cnn(-c2ccnc(Br)n2)c1] | ES + APCI; 243.0, 245.0 |
| 315 | 286 | 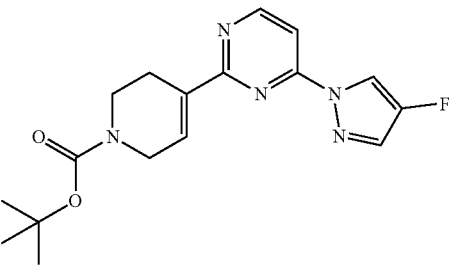 [SMILES: CC(C)(C)OC(=O)N1CC=C(c2nccc(-n3cc(F)cn3)n2)CC1] | ES + APCI; 346.2 |

TABLE 58
| PEx | PSyn | Chemical Structure | Data |
|---|---|---|---|
| 316 | 287 | 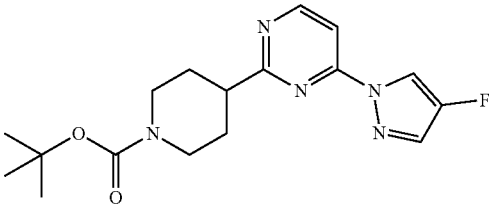 [SMILES: CC(C)(C)OC(=O)N1CCC(c2nccc(-n3cc(F)cn3)n2)CC1] | ES + APCI; 248.1 [M + H − 100]+ |
| 317 | 31 | 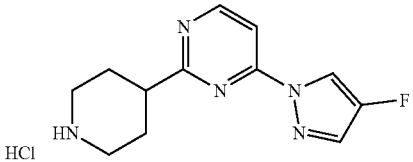 [SMILES: Cl ; Fc1cnn(-c2ccnc(C3CCNCC3)n2)c1] | ES + APCI; 248.1 |
| 318 | 32 | 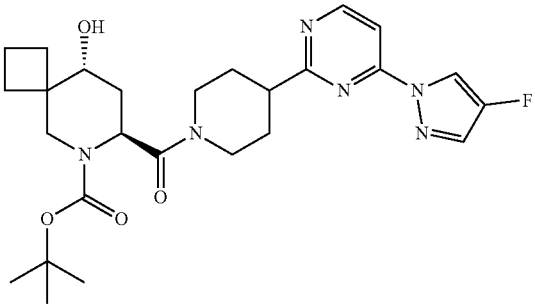 [SMILES: CC(C)(C)OC(=O)N1CC2(CCC2)[C@H](O)C[C@H]1C(=O)N1CCC(c2nccc(-n3cc(F)cn3)n2)CC1] | ES + APCI; 515.2 |
| 319 | 32 | 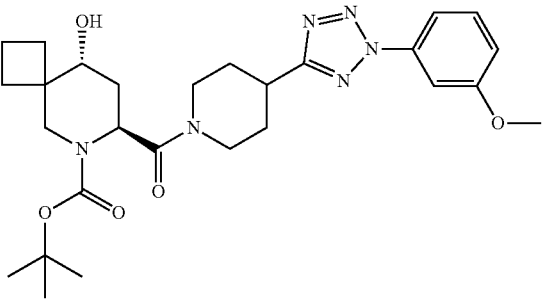 [SMILES: COc1cccc(-n2nnc(C3CCN(C(=O)[C@@H]4C[C@@H](O)C5(CCC5)CN4C(=O)OC(C)(C)C)CC3)n2)c1] | ES + APCI; 527.2 |
| 320 | 32 | 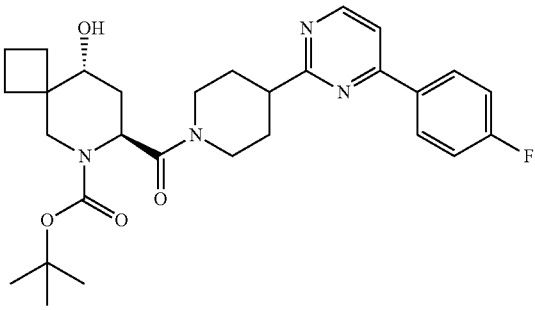 [SMILES: CC(C)(C)OC(=O)N1CC2(CCC2)[C@H](O)C[C@H]1C(=O)N1CCC(c2nccc(-c3ccc(F)cc3)n2)CC1] | ES + APCI; 525.6 |

TABLE 58-continued

| PEx | PSyn | Chemical Structure | Data |
|---|---|---|---|
| 321 | 32 | | ES + APCI; 511.3 |

TABLE 59

| PEx | PSyn | Chemical Structure | Data |
|---|---|---|---|
| 322 | 32 | | ES + APCI; 521.3 |
| 323 | 323 | | ES + APCI; 366.3 |
| 324 | 31 | | ES + APCI; 266.1 |
| 325 | 32 | | ES + APCI; 533.3 |
| 326 | 323 | | ES + APCI; 349.3 |

TABLE 59-continued
| PEx | PSyn | Chemical Structure | Data |
|---|---|---|---|
| 327 | 31 | 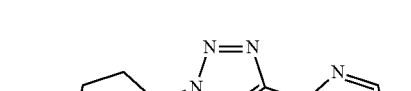 | ES + APCI; 249.1 |
| 328 | 32 | 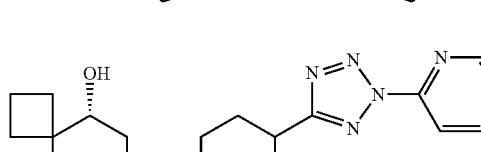 | ES + APCI; 516.2 |
TABLE 60
| Ex | Syn | Chemical Structure |
|---|---|---|
| 1 | 1 | 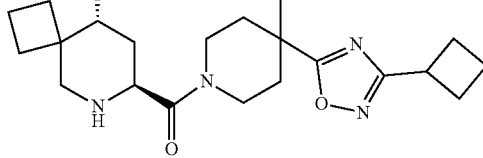 |
| 2 | 2 | 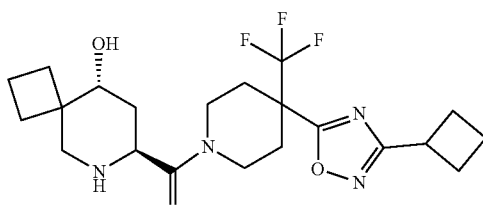 |
| 3 | 3 | 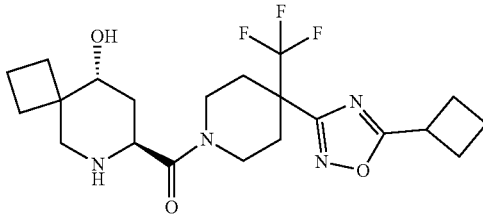 |
| 4 | 7 | 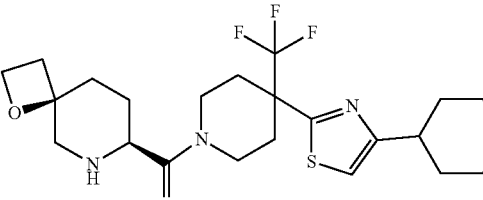 |

TABLE 60-continued

| Ex | Syn | Chemical Structure |
|---|---|---|
| 5 | 1 | |
| 6 | 1 | |

TABLE 61

| Ex | Syn | Chemical Structure |
|---|---|---|
| 7 | 7 | |
| 8 | 1 | |
| 9 | 7 | |
| 10 | 7 | |

TABLE 61-continued
| Ex | Syn | Chemical Structure |
|---|---|---|
| 11 | 7 | 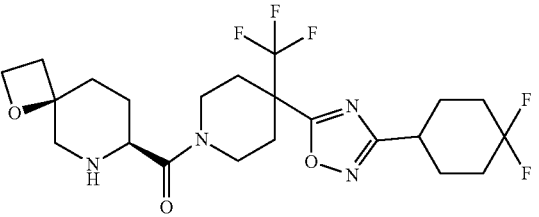 [SMILES: O=C([C@@H]1CC[C@@]2(CCO2)CN1)N1CCC(c2nc(C3CCC(F)(F)CC3)no2)(C(F)(F)F)CC1] |
| 12 | 1 | 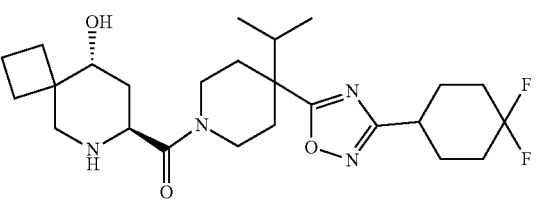 [SMILES: CC(C)C1(c2nc(C3CCC(F)(F)CC3)no2)CCN(C(=O)[C@@H]2C[C@@H](O)C3(CCC3)CN2)CC1] |
| 13 | 1 | 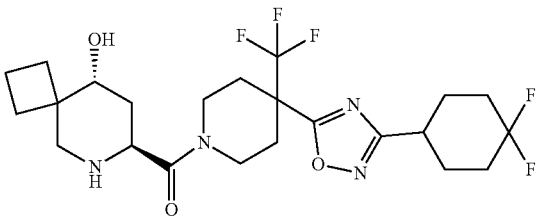 [SMILES: O=C([C@@H]1C[C@@H](O)C2(CCC2)CN1)N1CCC(c2nc(C3CCC(F)(F)CC3)no2)(C(F)(F)F)CC1] |
TABLE 62
| Ex | Syn | Chemical Structure |
|---|---|---|
| 14 | 1 | 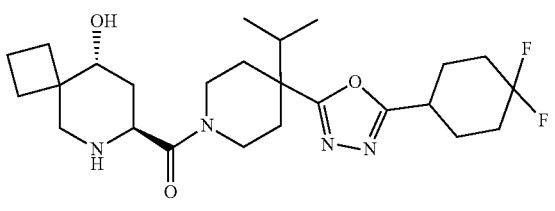 [SMILES: CC(C)C1(c2nnc(C3CCC(F)(F)CC3)o2)CCN(C(=O)[C@@H]2C[C@@H](O)C3(CCC3)CN2)CC1] |
| 15 | 1 | 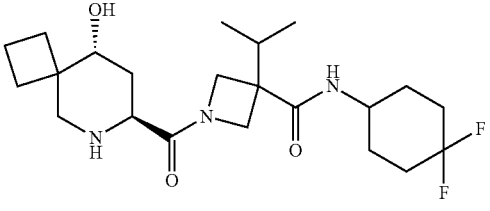 [SMILES: CC(C)C1(C(=O)NC2CCC(F)(F)CC2)CN(C(=O)[C@@H]2C[C@@H](O)C3(CCC3)CN2)C1] |
| 16 | 16 | 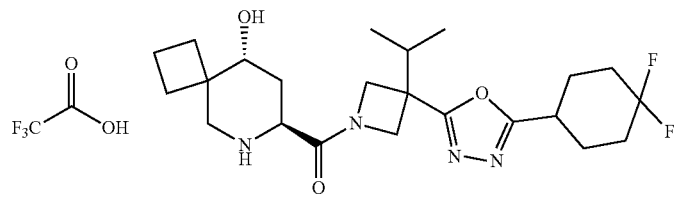 [SMILES: O=C(O)C(F)(F)F ; CC(C)C1(c2nnc(C3CCC(F)(F)CC3)o2)CN(C(=O)[C@@H]2C[C@@H](O)C3(CCC3)CN2)C1] |

TABLE 62-continued

| Ex | Syn | Chemical Structure |
|---|---|---|
| 17 | 1 | |
| 18 | 1 | |
| 19 | 1 | |
| 20 | 1 | |

TABLE 63

| Ex | Syn | Chemical Structure |
|---|---|---|
| 21 | 7 | |
| 22 | 1 | |
| 23 | 1 | |
| 24 | 1 | |
| 25 | 1 | |
| 26 | 1 | |

TABLE 63-continued
| Ex | Syn | Chemical Structure |
|---|---|---|
| 27 | 7 | |
TABLE 64
| Ex | Syn | Chemical Structure |
|---|---|---|
| 28 | 1 | |
| 29 | 7 | |
| 30 | 1 | |
TABLE 64-continued
| Ex | Syn | Chemical Structure |
|---|---|---|
| 31 | 31 | |
| 32 | 1 | |
| 33 | 7 | |
| 34 | 1 | |
TABLE 65
| Ex | Syn | Chemical Structure |
|---|---|---|
| 35 | 1 | |
| 36 | 1 | 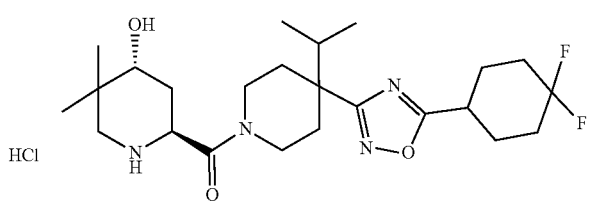 [SMILES: Cl ; CC(C)C1(c2noc(C3CCC(F)(F)CC3)n2)CCN(C(=O)[C@@H]2C[C@@H](O)C(C)(C)CN2)CC1] |

TABLE 65-continued

| Ex | Syn | Chemical Structure |
|---|---|---|
| 37 | 1 | |
| 38 | 1 | |
| 39 | 1 | |
| 40 | 7 | |

TABLE 66

| Ex | Syn | Chemical Structure |
|---|---|---|
| 41 | 1 | |
| 42 | 1 | |
| 43 | 1 | |
| 44 | 1 | |

TABLE 66-continued
| Ex | Syn | Chemical Structure |
|---|---|---|
| 45 | 1 | 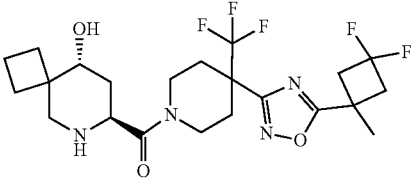 [SMILES: CC1(c2nc(C3(C(F)(F)F)CCN(C(=O)[C@@H]4C[C@@H](O)C5(CCC5)CN4)CC3)no2)CC(F)(F)C1] |
| 46 | 1 | 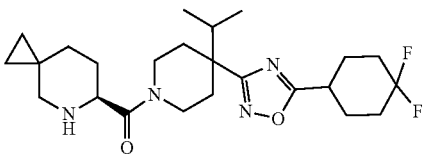 [SMILES: CC(C)C1(c2noc(C3CCC(F)(F)CC3)n2)CCN(C(=O)[C@@H]2CCC3(CC3)CN2)CC1] |
TABLE 67
| Ex | Syn | Chemical Structure |
|---|---|---|
| 47 | 1 | 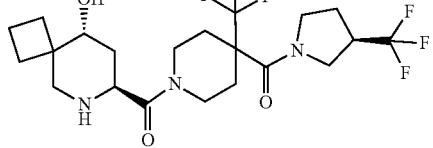 |
| 48 | 1 | 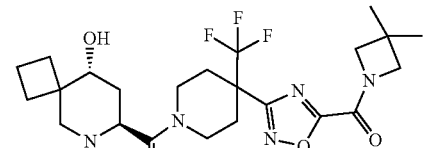 |
| 49 | 1 | 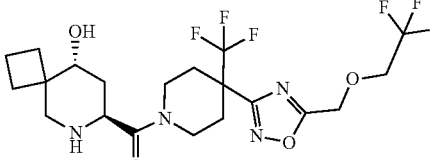 |
| 50 | 1 | 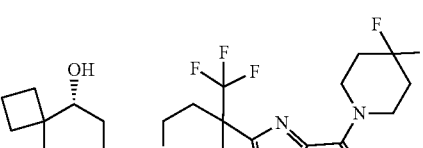 |
| 51 | 51 | 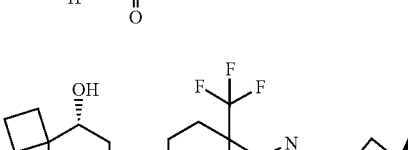 |
TABLE 68
| Ex | Syn | Chemical Structure |
|---|---|---|
| 52 | 1 | 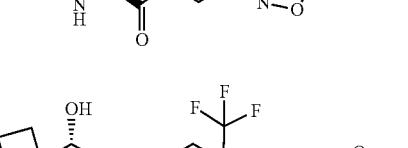 |
| 53 | 1 | 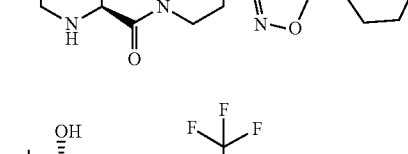 |
| 54 | 1 | |
| 55 | 1 | |
| 56 | 56 | |
| 57 | 1 | |
TABLE 69
| Ex | Syn | Chemical Structure |
|---|---|---|
| 58 | 1 | 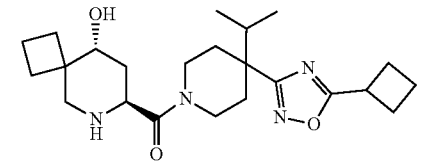 [SMILES: CC(C)C1(c2noc(C3CCC3)n2)CCN(C(=O)[C@@H]2C[C@@H](O)C3(CCC3)CN2)CC1] |

TABLE 69-continued

| Ex | Syn | Chemical Structure |
|---|---|---|
| 59 | 1 | |
| 60 | 1 | |
| 61 | 1 | |
| 62 | 1 | |
| 63 | 63 | |

TABLE 70

| Ex | Syn | Chemical Structure |
|---|---|---|
| 64 | 63 | |
| 65 | 1 | |

TABLE 70-continued

| Ex | Syn | Chemical Structure |
|---|---|---|
| 66 | 1 | |
| 67 | 67 | |
| 68 | 1 | |
| 69 | 1 | |

TABLE 71

| Ex | Syn | Chemical Structure |
|---|---|---|
| 70 | 1 | |
| 71 | 1 | |

TABLE 71-continued

| Ex | Syn | Chemical Structure |
|---|---|---|
| 72 | 1 | (structure) |
| 73 | 7 | (structure) |
| 74 | 1 | (structure) |
| 75 | 1 | (structure) |

TABLE 72

| Ex | Syn | Chemical Structure |
|---|---|---|
| 76 | 1 | (structure) |
| 77 | 1 | (structure) |
| 78 | 1 | (structure) |
| 79 | 1 | (structure) |

TABLE 72-continued

| Ex | Syn | Chemical Structure |
|----|-----|--------------------|
| 80 | 80 | |
| 81 | 1 | |

TABLE 73

| Ex | Syn | Chemical Structure |
|----|-----|--------------------|
| 82 | 1 | |
| 83 | 1 | |
| 84 | 7 | |
| 85 | 7 | |

TABLE 73-continued

| Ex | Syn | Chemical Structure |
|----|-----|--------------------|
| 86 | 7 | |
| 87 | 7 | |

TABLE 74

| Ex | Syn | Chemical Structure |
|----|-----|--------------------|
| 88 | 7 | |
| 89 | 89 | |

TABLE 74-continued
| Ex | Syn | Chemical Structure |
|---|---|---|
| 90 | 90 | 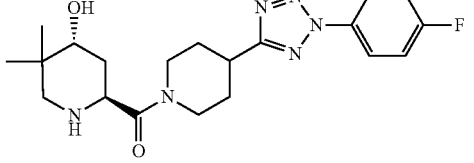 |
| 91 | 1 | 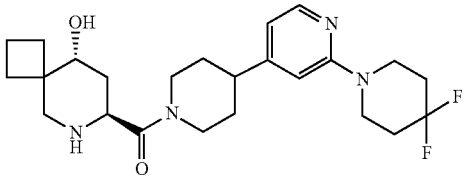 [SMILES: O=C([C@@H]1C[C@@H](O)C2(CCC2)CN1)N1CCC(c2ccnc(N3CCC(F)(F)CC3)c2)CC1] |
| 92 | 1 | 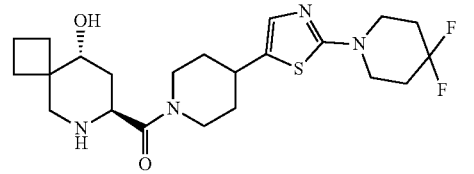 [SMILES: O=C([C@@H]1C[C@@H](O)C2(CCC2)CN1)N1CCC(c2cnc(N3CCC(F)(F)CC3)s2)CC1] |
| 93 | 1 | 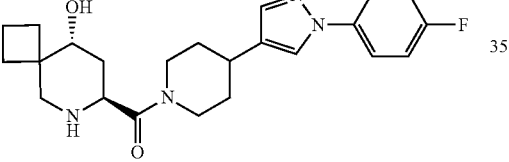 |
TABLE 75
| Ex | Syn | Chemical Structure |
|---|---|---|
| 94 | 1 | 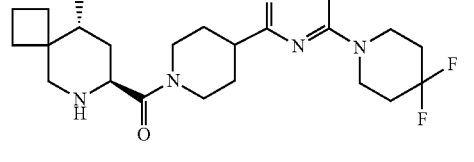 |
| 95 | 1 | 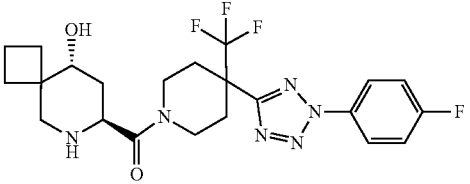 [SMILES: O=C([C@@H]1C[C@@H](O)C2(CCC2)CN1)N1CCC(c2nnn(-c3ccc(F)cc3)n2)(C(F)(F)F)CC1] |
| 96 | 1 | 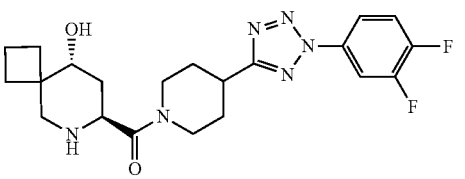 [SMILES: O=C([C@@H]1C[C@@H](O)C2(CCC2)CN1)N1CCC(c2nnn(-c3ccc(F)c(F)c3)n2)CC1] |
| 97 | 1 | 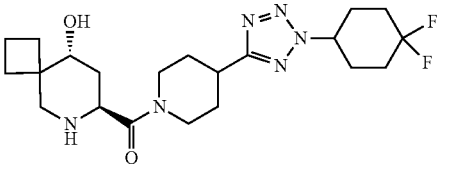 [SMILES: O=C([C@@H]1C[C@@H](O)C2(CCC2)CN1)N1CCC(c2nnn(C3CCC(F)(F)CC3)n2)CC1] |
| 98 | 1 | 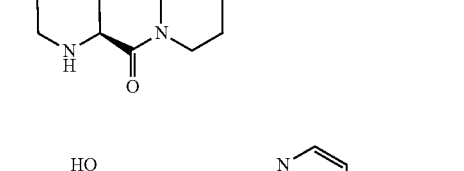 |
| 99 | 1 |  |
TABLE 76
| Ex | Syn | Chemical Structure |
|---|---|---|
| 100 | 1 | 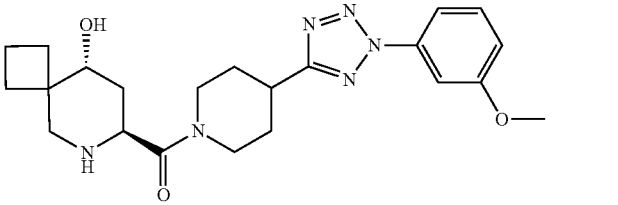 [SMILES: COc1cccc(-n2nnc(C3CCN(C(=O)[C@@H]4C[C@@H](O)C5(CCC5)CN4)CC3)n2)c1] |

TABLE 76-continued

| Ex | Syn | Chemical Structure |
|---|---|---|
| 101 | 1 | |
| 102 | 1 | |
| 103 | 1 | |
| 104 | 1 | |
| 105 | 1 | |

TABLE 77

| Ex | Data |
|---|---|
| 1 | ES + APCI: 453.3<br>NMR: δ 4.63(brs, 1H), 4.30(d, J = 12.9 Hz, 1H), 3.88(brd, J = 13.5 Hz, 1H), 3.74(brd, J = 9.4 Hz, 2H), 3.60(t, J = 7.6 Hz, 1H), 3.02-3.14(m, 2H), 2.75-2.93(m, 4H), 2.60(t, J = 12.5 Hz, 1H), 2.27-2.42(m, 3H), 1.70-1.89(m, 6H), 1.28-1.62(m, 6H), 0.77(brd, J = 6.6 Hz, 6H) |
| 2 | ES + APCI: 479.2<br>NMR: δ 4.59-4.73(m, 1H), 4.34-4.52(m, 1H), 3.96-4.16(m, 1H), 3.72-3.89(m, 2H), 3.62-3.72(m, 1H), 3.03-3.18(m, 3H), 2.87-3.02(m, 3H), 2.81(brt, J = 12.8 Hz, 1H), 2.55-2.68(m, 2H), 1.93-2.19(m, 1H), 1.68-1.92(m, 5H), 1.56-1.66(m, 1H), 1.31-1.54(m, 3H) |
| 3 | ES + APCI: 479.3<br>NMR: δ4.59-4.68(m, 1H), 4.36-4.49(m, 1H), 3.95-4.09(m, 1H), 3.71-3.92(m, 3H), 2.92-3.24(m, 5H), 2.80(brt, J = 12.6 Hz, 1H), 2.55-2.66(m, 2H), 2.40-2.47(m, 2H), 1.98-2.11(m, 1H), 1.70-1.91(m, 6H), 1.54-1.66(m, 1H), 1.27-1.51(m, 3H) |
| 4 | ES + APCI: 508.1<br>NMR: δ7.61(d, J = 0.8 Hz, 1H), 4.44(brd, J = 12.6 Hz, 1H), 4.33(t, J = 7.7 Hz, 2H), 4.09(d, J = 15.1 Hz, 1H), 3.51-3.62(m, 1H), 3.10(brt, J = 15.0 Hz, 1H), 2.82-3.01(m, 2H), 2.54-2.63(m, 1H), 2.38-2.47(m, 2H), 2.19(brt, J = 7.8 Hz, 3H), 1.99-2.13(m, 7H), 1.82-1.99(m, 3H), 1.56-1.76(m, 3H), 1.32-1.53(m, 2H) |
| 5 | ES + APCI: 453.3<br>NMR: δ 4.63(s, 1H), 4.26(d, J = 14.1 Hz, 1H), 3.69-3.89(m, 4H), 3.07-3.23(m, 3H), 2.87-3.07(m, 3H), 2.74-2.84(m, 1H), 2.56-2.66(m, 1H), 2.25(t, J = 11.4 Hz, 2H), 1.67-1.88(m, 6H), 1.55-1.67(m, 2H), 1.34-1.50(m, 4H), 0.78(d, J = 6.8 Hz, 6H) |

TABLE 78

| Ex | Data |
|---|---|
| 6 | ES + APCI: 453.3<br>NMR: δ 4.62(dd, J = 10.5, 3.6 Hz, 1H), 4.25-4.46(m, 2H), 3.92- |

TABLE 78-continued

| Ex | Data |
|---|---|
|  | 4.10(m, 2H), 3.70(brdd, J = 7.8, 3.6 Hz, 1H), 3.41-3.57(m, 1H), 3.16-3.30(m, 1H), 2.69-2.83(m, 1H), 2.57-2.66(m, 1H), 2.21-2.33(m, 1H), 1.91-2.18(m, 7H), 1.60-1.87(m, 7H), 1.34-1.51(m, 3H), 0.87(d, J = 6.9 Hz, 6H). |
| 7 | ES + APCI: 496.3<br>NMR: δ 4.34(t, J = 7.7 Hz, 2H), 4.19-4.30(m, 1H), 3.88-4.07(m, 1H), 3.52-3.65(m, 1H), 3.35(brs, 2H), 3.11-3.17(m, 4H), 2.92-3.10(m, 1H), 2.53-2.62(m, 5H), 2.20(t, J = 7.7 Hz, 2H), 2.07-2.15(m, 1H), 1.94-2.06(m, 2H), 1.57-1.90(m, 8H), 1.33-1.55(m, 2H), 1.12-1.28(m, 2H) |
| 8 | ES + APCI: 510.3<br>NMR: δ 4.63(d, J = 3.6 Hz, 1H), 4.20-4.35(m, 1H), 3.83-4.06(m, 1H), 3.66-3.82(m, 2H), 3.36(brs, 2H), 3.14(s, 3H), 2.88-3.08(m, 1H), 2.73-2.85(m, 1H), 2.59(brt, J = 13.6 Hz, 4H), 1.96-2.06(m, 2H), 1.69-1.90(m, 9H), 1.59-1.67(m, 4H), 1.37-1.48(m, 3H), 1.17-1.27(m, 2H) |
| 9 | ES + APCI: 439.3<br>NMR: δ 4.33(brt, J = 7.7 Hz, 3H), 3.82-4.02(m, 1H), 3.48-3.67(m, 2H), 3.01-3.18(m, 3H), 2.79-2.97(m, 3H), 2.54-2.61(m, 1H), 2.28-2.45(m, 3H), 2.18(t, J = 7.7 Hz, 2H), 2.06-2.15(m, 1H), 1.78-1.90(m, 1H), 1.32-1.71(m, 5H), 0.78(d, J = 6.9 Hz, 6H) |
| 10 | ES + APCI: 465.3<br>NMR: δ 4.39-4.51(m, 1H), 4.33(t, J = 7.7 Hz, 2H), 4.13(d, J = 15.5 Hz, 1H), 3.53-3.75(m, 2H), 2.85-3.20(m, 6H), 2.53-2.64(m, 3H), 2.42-2.49(m, 2H), 2.20(t, J = 7.8 Hz, 2H), 1.92-2.16(m, 2H), 1.81-1.91(m, 1H), 1.56-1.69(m, 1H), 1.33-1.54(m, 2H) |

TABLE 79

| Ex | Data |
|---|---|
| 11 | ES: 493<br>NMR: δ 4.39-4.53(m, 1H), 4.33(t, J = 7.7 Hz, 2H), 4.11(brd, J = 13.0 Hz, 1H), 3.51-3.71(m, 1H), 3.05-3.20(m, 2H), 2.84-3.03(m, 1H), 2.52-2.64(m, 2H), 2.41-2.48(m, 2H), 2.20(t, J = 7.8 Hz, 2H), 1.84-2.15(m, 9H), 1.70-1.83(m, 2H), 1.56-1.68(m, 1H), 1.32-1.55(m, 2H) |
| 12 | ES: 481.1<br>NMR(CDCl3); δ 4.56(t, J = 13.6 Hz, 1H), 4.06-4.22(m, 1H), 4.02(d, J = 12.0 Hz, 1H), 3.92(brd, J = 13.0 Hz, 1H), 2.88-3.20(m, 4H), 2.37-2.57(m, 4H), 2.13-2.26(m, 5H), 1.81-2.03(m, 10H), 1.57-1.78(m, 5H), 0.85(dd, J = 7.0, 3.9 Hz, 6H) |
| 13 | ES + APCI: 507.3<br>NMR: δ 4.61-4.67(m, 1H), 4.39-4.51(m, 1H), 4.01-4.13(m, 1H), 3.70-3.85(m, 2H), 3.12(brt, J = 11.1 Hz, 1H), 2.88-3.04(m, 1H), 2.80(brt, J = 12.6 Hz, 1H), 2.55-2.71(m, 2H), 2.47(brs, 2H), 2.03-2.16(m, 6H), 1.92-2.02(m, 2H), 1.69-1.90(m, 7H), 1.55-1.66(m, 1H), 1.33-1.50(m, 3H) |
| 14 | ES + APCI: 481.3<br>NMR: δ 4.74-4.86(m, 1H), 4.23-4.36(m, 1H), 3.73-3.98(m, 3H), 3.12-3.25(m, 1H), 2.70-3.00(m, 3H), 2.41-2.48(m, 1H), 2.21-2.32(m, 2H), 1.96-2.17(m, 6H), 1.69-1.94(m, 8H), 1.37-1.68(m, 6H), 0.77(brd, J = 6.8 Hz, 6H) |
| 15 | ES + APCI: 428.3<br>NMR: δ 7.71(d, J = 7.6 Hz, 1H), 4.69-4.79(m, 1H), 4.15-4.30(m, 1H), 4.05(d, J = 9.1 Hz, 1H), 3.77-3.95(m, 3H), 3.64-3.76(m, 2H), 3.48-3.61(m, 1H), 2.79(d, J = 13.0 Hz, 1H), 2.63-2.73(m, 1H), 1.96-2.10(m, 4H), 1.72-1.90(m, 7H), 1.58-1.69(m, 1H), 1.40-1.56(m, 5H), 0.87(d, J = 6.9 Hz, 6H) |

TABLE 80

| Ex | Data |
|---|---|
| 16 | ES: 453<br>NMR: δ 5.13(d, J = 20.4 Hz, 1H), 4.43-4.54(m, 1H), 4.16-4.38(m, 2H), 4.09(t, J = 9.9 Hz, 1H), 3.85-4.00(m, 1H), 3.78-3.85(m, 1H), 3.50-3.52(m, 1H), 3.15-3.24(m, 1H), 2.96-3.09(m, 1H), 2.86-2.95(m, 1H), 2.27(dt, J = 13.6, 6.7 Hz, 1H), 1.89-2.18(m, 8H), 1.70-1.88 (m, 5H), 1.49-1.70(m, 3H), 0.88(d, J = 7.0 Hz, 6H) |
| 17 | ES + APCI: 456.4<br>NMR: δ 4.73(brdd, J = 15.9, 2.9 Hz, 1H), 4.24-4.39(m, 1H), 4.02-4.22(m, 1H), 3.79-4.00(m, 2H), 3.68-3.78(m, 1H), 3.50-3.61(m, 1H), 3.15-3.26(m, 2H), 2.75-2.85(m, 4H), 2.63-2.74(m, 1H), 2.09-2.21(m, 1H), 1.94-2.07(m, 2H), 1.70-1.92(m, 6H), 1.59-1.70(m, 3H), 1.39-1.55(m, 3H), 1.10-1.27(m, 3H), 0.90(dt, J = 13.9, 6.8 Hz, 6H) |
| 18 | ES + APCI: 425.3<br>NMR: δ 4.66(brd, J = 5.1 Hz, 1H), 4.31-4.59(m, 2H), 4.15(dd, J = 12.8, 9.8 Hz, 1H), 4.06(t, J = 9.1 Hz, 1H), 3.67-3.74(m, 1H), 3.57-3.67(m, 1H), 3.48-3.57(m, 1H), 3.04-3.16(m, 2H), 2.83-2.96(m, 2H), 2.74-2.81(m, 1H), 2.63(brdd, J = 12.8, 7.1 Hz, 1H), 2.35-2.40(m, 1H), 1.59-1.91(m, 6H), 1.37-1.53(m, 3H), 0.89(d, J = 6.8 Hz, 6H) |
| 19 | ES + APCI: 453.3<br>NMR: δ 4.95(brd, J = 6.9 Hz, 1H), 4.36-4.60(m, 2H), 4.06-4.23(m, 2H), 3.72-3.82(m, 2H), 3.07(brt, J = 10.7 Hz, 1H), 2.86(brd, J = 8.4 Hz, 2H), 2.28-2.35(m, 1H), 2.02-2.12(m, 6H), 1.87-1.98(m, 3H), 1.73-1.82(m, 4H), 1.60-1.69(m, 2H), 1.46-1.56(m, 2H), 0.88(d, J = 6.8 Hz, 6H) |

TABLE 81

| Ex | Data |
|---|---|
| 20 | ES + APCI: 442.4<br>NMR: δ 7.90(brt, J = 5.2 Hz, 1H), 4.60(dd, J = 9.5, 3.8 Hz, 1H), 4.14-4.29(m, 1H), 4.02-4.09(m, 1H), 3.81-3.94(m, 2H), 3.63-3.74(m, 2H), 3.38-3.48(m, 1H), 3.01(brt, J = 6.2 Hz, 2H), 2.75(brdd, J = 13.1, 2.9 Hz, 1H), 2.58(brd, J = 12.9 Hz, 1H), 1.96-2.10(m, 3H), 1.55-1.86(m, 11H), 1.35-1.43(m, 2H), 1.11-1.23(m, 2H), 0.86(dd, J = 6.6, 2.4 Hz, 6H) |
| 21 | ES + APCI: 439.3<br>NMR: δ 4.30-4.57(m, 4H), 4.10-4.18(m, 1H), 4.02-4.09(m, 1H), 3.19-3.26(m, 1H), 3.02-3.11(m, 2H), 2.53-2.59(m, 1H), 2.26-2.34(m, 1H), 2.20(t, J = 7.8 Hz, 2H), 1.89-2.13(m, 8H), 1.69-1.82(m, 2H), 1.39-1.63(m, 3H), 0.87(d, J = 6.8 Hz, 6H) |
| 22 | ES: 496.3<br>NMR: δ 8.35(brd, J = 4.6 Hz, 1H), 4.69(brd, J = 8.8 Hz, 1H), 4.39(brd, J = 12.8 Hz, 1H), 3.89-4.01(m, 1H), 3.72-3.88(m, 2H), 3.10(brd, J = 3.1 Hz, 2H), 2.76-3.00(m, 2H), 2.59-2.67(m, 1H), 2.36-2.47(m, 3H), 1.93-2.06(m, 2H), 1.54-1.88(m, 12H), 1.35-1.53(m, 4H), 1.10-1.23(m, 2H) |
| 23 | ES + APCI: 451.4<br>NMR: δ 4.35(brt, J = 15.9 Hz, 1H), 3.82(d, J = 26.4 Hz, 1H), 3.71(brt, J = 11.8 Hz, 1H), 3.21-3.29(m, 1H), 2.74-2.95(m, 2H), 2.44-2.49(m, 1H), 2.25(t, J = 13.3 Hz, 2H), 1.90-2.18(m, 6H), 1.66-1.89(m, 6H), 1.37-1.66(m, 7H), 1.27-1.37(m, 1H), 0.76(d, J = 6.8 Hz, 6H) |
| 24 | ES + APCI: 429.2<br>NMR: δ 5.03-5.28(m, 1H), 4.19-4.40(m, 1H), 3.69-3.92(m, 2H), 2.98-3.31(m, 3H), 2.82-2.96(m, 1H), 2.52-2.64(m, 2H), 2.19-2.29(m, 2H), 1.89-2.19(m, 6H), 1.43-1.88(m, 6H), 0.76(d, J = 6.9 Hz, 6H) |

TABLE 82

| Ex | Data |
|---|---|
| 25 | ES: 427.3<br>NMR: δ 4.51(dd, J = 33.0, 3.5 Hz, 1H), 4.30(brd, J = 11.8 Hz, 1H), 4.12(brd, J = 16.9 Hz, 1H), 3.65-3.85(m, 2H), 3.20-3.31(m, 1H), 2.72-2.97(m, 3H), 1.90-2.32(m, 10H), 1.71-1.88(m, 3H), 1.27-1.67(m, 3H), 0.76(brd, J = 6.6 Hz, 6H) |
| 26 | ES: 437.3<br>NMR(CD3OD); δ 4.34-4.49(m, 1H), 3.79-3.92(m, 1H), 3.58-3.78(m, 2H), 3.18-3.30(m, 1H), 3.02-3.18(m, 1H), 2.58-2.72(m, 1H), 2.38-2.55(m, 2H), 1.81-2.27(m, 9H), 1.50-1.79(m, 7H), 1.34-1.48(m, 2H), 0.87(td, J = 6.6, 2.8 Hz, 6H) |
| 27 | ES + APCI: 428.3<br>NMR: δ 7.90(d, J = 8.6, 5.8 Hz, 1H), 4.33(t, J = 7.6 Hz, 2H), 4.15-4.29(m, 1H), 3.92-4.09(m, 1H), 3.87(dd, J = 11.0, 6.5 Hz, 1H), 3.70(t, J = 9.9 Hz, 1H), 3.13-3.21(m, 1H), 3.07(d, J = 12.9 Hz, 1H), 3.01(t, J = 6.3 Hz, 2H), 2.52-2.57(m, 1H), 2.19(t, J = 7.7 Hz, 2H), 1.90-2.13(m, 5H), 1.67-1.86(m, 4H), 1.51-1.65(m, 2H), 1.38-1.50(m, 2H), 1.08-1.23(m, 2H), 0.81-0.90(m, 6H) |

TABLE 82-continued

| Ex | Data |
|---|---|
| 28 | ES: 457.3<br>NMR: δ 4.29(brd, J = 14.6 Hz, 1H), 3.78-3.88(m, 2H), 3.26-3.33(m, 1H), 3.15(brd, J = 7.5 Hz, 1H), 2.79-2.96(m, 3H), 2.36-2.46(m, 1H), 2.19-2.29(m, 2H), 1.92-2.18(m, 9H), 1.73-1.88(m, 3H), 1.35-1.66(m, 3H), 1.28(td, J = 13.2, 6.3 Hz, 1H), 0.76(d, J = 6.9 Hz, 6H) |
| 29 | ES + APCI: 403.3<br>NMR: δ 4.30-4.57(m, 4H), 4.10-4.19(m, 1H), 4.02-4.08(m, 1H), 3.57-3.69(m, 1H), 3.17-3.24(m, 1H), 3.02-3.09(m, 1H), 2.55(brd, J = 7.3 Hz, 1H), 2.28-2.34(m, 1H), 2.04-2.22(m, 7H), 1.86-2.00(m, 1H), 1.37-1.64(m, 3H), 1.23(s, 3H), 1.11(s, 3H), 0.88(d, J = 6.8 Hz, 6H) |

TABLE 83

| Ex | Data |
|---|---|
| 30 | ES: 489.3<br>NMR: δ 4.30(d, J = 13.4 Hz, 1H), 3.82-3.95(m, 2H), 3.67-3.79(m, 1H), 3.35-3.45(m, 2H), 3.24-3.29(m, 1H), 2.87-3.02(m, 5H), 2.37-2.46(m, 1H), 2.20-2.31(m, 2H), 1.91-2.19(m, 7H), 1.74-1.89(m, 4H), 1.45-1.69(m, 2H), 0.77(d, J = 6.6 Hz, 6H) |
| 31 | ES + APCI: 507.3<br>NMR: δ 4.58-4.65(m, 1H), 4.42(d, J = 11.9 Hz, 1H), 3.95-4.07(m, 1H), 3.71-3.84(m, 2H), 2.88-3.06(m, 1H), 2.80(brt, J = 12.3 Hz, 1H), 2.54-2.66(m, 1H), 2.39-2.47(m, 3H), 2.13-2.23(m, 2H), 1.93-2.13(m, 5H), 1.66-1.91(m, 9H), 1.55-1.66(m, 1H), 1.28-1.50(m, 3H) |
| 32 | ES + APCI: 460.3<br>NMR: δ 4.66(s, 1H), 4.12-4.30(m, 1H), 3.83-4.07(m, 1H), 3.69-3.81(m, 4H), 3.57-3.67(m, 4H), 3.01-3.22(m, 1H), 2.75-2.88(m, 1H), 2.57-2.70(m, 2H), 2.43-2.48(m, 1H), 2.01-2.19(m, 1H), 1.57-1.92(m, 8H), 1.35-1.49(m, 3H), 0.70(s, 2H), 0.59(s, 2H) |
| 33 | ES + APCI: 496.3<br>NMR: δ 7.94(brd, J = 8.0 Hz, 1H), 4.27-4.43(m, 3H), 4.03(brd, J = 13.6 Hz, 1H), 3.85(brs, 1H), 3.58(brd, J = 9.0 Hz, 1H), 3.09(brd, J = 13.8 Hz, 1H), 2.80-2.98(m, 1H), 2.36-2.47(m, 3H), 2.18(brt, J = 7.8 Hz, 2H), 1.94-2.14(m, 3H), 1.31-1.94(m, 11H), 1.14-1.29(m, 2H), 1.09(brd, J = 6.5 Hz, 3H) |
| 34 | ES + APCI: 441<br>NMR: δ 4.58(s, 1H), 4.28(brd, J = 13.1 Hz, 1H), 4.01(brd, J = 12.3 Hz, 1H), 3.81-3.94(m, 2H), 3.20-3.28(m, 1H), 2.79-2.98(m, 2H), 2.60-2.75(m, 1H), 2.37-2.47(m, 1H), 2.19-2.29(m, 2H), 1.93-2.19(m, 7H), 1.73-1.88(m, 3H), 1.35-1.65(m, 6H), 0.76(brd, J = 6.8 Hz, 6H) |

TABLE 84

| Ex | Data |
|---|---|
| 35 | ES + APCI: 486<br>NMR: δ 4.62(brs, 1H), 4.34(brt, J = 12.5 Hz, 1H), 3.88-4.05(m, 1H), 3.53-3.86(m, 6H), 3.18-3.29(m, 1H), 2.87-3.11(m, 1H), 2.75-2.84(m, 1H), 2.55-2.65(m, 2H), 2.37-2.43(m, 1H), 1.91-2.31(m, 3H), 1.50-1.89(m, 8H), 1.29-1.49(m, 3H) |
| 36 | ES + APCI: 469<br>NMR: δ 9.38-9.61(m, 1H), 8.24(s, 1H), 5.40(brd, J = 9.5 Hz, 1H), 4.24-4.45(m, 2H), 3.61-3.70(m, 1H), 3.41-3.50(m, 2H), 2.90-3.05(m, 2H), 2.74-2.81(m, 1H), 2.24-2.36(m, 2H), 1.88-2.19(m, 8H), 1.72-1.87(m, 5H), 1.44-1.65(m, 2H), 0.98(brd, J = 8.5 Hz, 3H), 0.91(brd, J = 4.0 Hz, 3H), 0.78(brd, J = 6.5 Hz, 6H) |
| 37 | ES + APCI: 501.9<br>NMR: δ 4.62-4.71(m, 1H), 4.24-4.38(m, 2H), 4.06-4.23(m, 2H), 3.89-4.03(m, 2H), 3.70-3.86(m, 3H), 3.58(t, J = 11.0 Hz, 1H), 3.04-3.24(m, 3H), 2.72-2.85(m, 2H), 2.63(brdd, J = 13.3, 6.0 Hz, 1H), 1.68-1.94(m, 7H), 1.57-1.65(m, 1H), 1.32-1.51(m, 4H) |
| 38 | ES: 467<br>NMR: δ 4.66(brd, J = 18.8 Hz, 1H), 4.36(brt, J = 11.8 Hz, 1H), 4.01(brs, 1H), 3.65-3.80(m, 2H), 3.23-3.29(m, 1H), 2.88(brt, J = 12.7 Hz, 1H), 2.79(brs, 1H), 2.19-2.31(m, 2H), 1.93-2.18(m, 7H), 1.36-1.90(m, 10H), 1.14-1.33(m, 2H), 1.03-1.16(m, 1H), 0.76(brd, J = 6.8 Hz, 6H) |

TABLE 84-continued

| Ex | Data |
|---|---|
| 39 | ES + APCI: 501.9<br>NMR: δ 4.64(brs, 1H), 4.25-4.41(m, 2H), 4.04-4.23(m, 2H), 3.82-4.02(m, 2H), 3.73-3.81(m, 2H), 3.57(brt, J = 11.1 Hz, 1H), 3.05-3.26(m, 3H), 2.69-2.91(m, 2H), 2.62(brdd, J = 13.4, 5.5 Hz, 2H), 1.56-1.97(m, 8H), 1.33-1.51(m, 3H) |

TABLE 85

| Ex | Data |
|---|---|
| 40 | ES + APCI: 465<br>NMR: δ 4.38-4.47(m, 1H), 4.35(t, J = 7.7 Hz, 2H), 4.04(brd, J = 11.1 Hz, 1H), 3.63-3.93(m, 2H), 2.92-3.27(m, 6H), 2.56-2.66(m, 1H), 2.41-2.49(m, 3H), 2.19-2.29(m, 2H), 2.07-2.18(m, 1H), 1.87-2.06(m, 1H), 1.80(td, J = 13.0, 4.4 Hz, 1H), 1.66(td, J = 13.1, 4.1 Hz, 1H), 1.48-1.58(m, 1H), 1.32-1.47(m, 1H) |
| 41 | ES + APCI: 453.3<br>NMR: δ 4.30(brd, J = 11.0 Hz, 1H), 3.91 (brd, J = 12.5 Hz, 1H), 3.40-3.56(m, 1H), 3.29(m, J = 2.0 Hz, 1H), 2.79-2.97(m, 1H), 2.32-2.48(m, 3H), 2.19-2.28(m, 2H), 1.97(brs, 6H), 1.73-1.85(m, 3H), 1.29-1.65(m, 6H), 0.89(brs, 3H), 0.80(s, 3H), 0.76(brd, J = 6.5 Hz, 6H) |
| 42 | ES + APCI: 465.3<br>NMR: δ 4.27(brs, 1H), 3.90(brd, J = 13.6 Hz, 1H), 3.42-3.52(m, 1H), 3.23-3.29(m, 1H), 2.77-2.98(m, 2H), 2.38-2.46(m, 2H), 2.20-2.31(m, 2H), 1.93-2.18(m, 7H), 1.73-1.87(m, 7H), 1.52-1.70(m, 4H), 1.36-1.50(m, 3H), 1.12-1.31(m, 1H), 0.76(brd, J = 6.7 Hz, 6H) |
| 43 | ES + APCI: 439.3<br>NMR: δ 4.16-4.38(m, 1H), 3.59-4.00(m, 2H), 3.30(brs, 2H), 2.71-3.06(m, 2H), 2.36-2.49(m, 1H), 1.89-2.35(m, 8H), 1.33-1.88(m, 8H), 1.08-1.31(m, 2H), 0.87-1.03(m, 1H), 0.71-0.83(m, 7H) |
| 44 | ES + APCI: 506.2<br>NMR: δ 8.55(brs, 1H), 7.71(brt, J = 8.9 Hz, 1H), 7.41-7.48(m, 1H), 4.76(brd, J = 9.5 Hz, 1H), 3.97-4.07(m, 1H), 3.85-3.96(m, 2H), 3.65-3.82(m, 3H), 3.23-3.30(m, 1H), 2.89-3.20(m, 6H), 2.79-2.88(m, 1H), 2.68-2.77(m, 1H), 2.53-2.53(m, 1H), 2.35-2.47(m, 1H), 2.15-2.30(m, 1H), 1.68-1.90(m, 4H), 1.38-1.65(m, 4H) |

TABLE 86

| Ex | Data |
|---|---|
| 45 | ES + APCI: 493.2<br>NMR: δ 4.62(brd, J = 6.5 Hz, 1H), 4.42(brs, 1H), 4.01(brs, 1H), 3.69-3.86(m, 2H), 3.19-3.30(m, 3H), 2.73-3.10(m, 4H), 2.58-2.67(m, 1H), 2.44(brs, 2H), 1.95-2.12(m, 1H), 1.54-1.93(m, 10H), 1.32-1.51(m, 3H) |
| 46 | ES + APCI: 451.3<br>NMR: δ 4.29(brs, 1H), 3.94(brs, 1H), 3.54-3.63(m, 1H), 3.24-3.30(m, 1H), 2.80-2.99(m, 2H), 2.38-2.48(m, 1H), 2.20-2.32(m, 2H), 1.93-2.18(m, 7H), 1.73-1.88(m, 3H), 1.26-1.69(m, 6H), 0.99(brt, J = 12.6 Hz, 1H), 0.81-0.92(m, 1H), 0.77(brd, J = 6.8 Hz, 6H), 0.10-0.39(m, 3H) |
| 47 | ES + APCI: 501.2<br>NMR(300): δ 5.11(s, 2H), 4.63(brs, 1H), 4.24-4.51(m, 3H), 4.02(brs, 1H), 3.76(brs, 2H), 2.76-3.10(m, 3H), 2.62-2.70(m, 1H), 1.92-2.19(m, 2H), 1.52-1.90(m, 7H), 1.14-1.52(m, 4H) |
| 48 | ES + APCI: 536.1<br>NMR: δ 4.69(brd, J = 11.1 Hz, 1H), 4.44(brd, J = 10.8 Hz, 1H), 4.01(brd, J = 13.6 Hz, 1H), 3.75-3.92(m, 6H), 2.94-3.17(m, 1H), 2.77-2.89(m, 1H), 2.54-2.66(m, 2H), 2.43-2.48(m, 2H), 2.05-2.22(m, 5H), 1.68-2.02(m, 6H), 1.57-1.67(m, 1H), 1.37-1.54(m, 3H) |
| 49 | ES + APCI: 475.2<br>NMR: δ 4.67-4.79(m, 1H), 4.38-4.51(m, 1H), 3.73-4.08(m, 4H), 2.71-3.08(m, 5H), 2.54-2.64(m, 3H), 2.43-2.48(m, 2H), 1.98-2.14(m, 1H), 1.68-1.92(m, 6H), 1.56-1.68(m, 1H), 1.40-1.55(m, 6H) |
| 50 | ES + APCI: 509.2<br>NMR: δ 5.17(brd, J = 10.0 Hz, 1H), 4.70(brd, J = 19.0 Hz, 1H), 4.42(brs, 1H), 3.69-4.14(m, 5H), 2.98(brd, J = 13.1 Hz, 1H), 2.61-2.87(m, 3H), 2.45(brs, 2H), 2.19-2.37(m, 3H), 2.00-2.16(m, 2H), 1.57-1.97(m, 6H), 1.31-1.55(m, 3H) |

TABLE 87

| Ex | Data |
|---|---|
| 51 | ES + APCI: 467.2<br>NMR: δ 4.64(d, J = 21.3 Hz, 1H), 4.43-4.46(m, 1H), 4.45(brd, J = 11.7 Hz, 1H), 3.82-4.08(m, 3H), 3.41-3.50(m, 1H), 2.96-3.23(m, 6H), 2.69-2.76(m, 1H), 2.44(brs, 1H), 2.20-2.32(m, 1H), 1.98-2.10(m, 1H), 1.68-1.97(m, 2H), 1.56-1.68(m, 1H), 1.43-1.55(m, 1H), 0.87(s, 3H), 0.79(s, 3H) |
| 52 | ES + APCI: 486.1<br>NMR: δ 4.61-4.72(m, 1H), 4.25-4.43(m, 1H), 3.89-4.04(m, 1H), 3.54-3.87(m, 7H), 2.86-3.13(m, 2H), 2.76-2.85(m, 1H), 2.55-2.66(m, 2H), 1.95-2.31(m, 3H), 1.53-1.89(m, 8H), 1.33-1.50(m, 3H) |
| 53 | ES + APCI: 500.3<br>NMR: δ 4.63(brs, 1H), 4.43(brd, J = 12.0 Hz, 1H), 4.24(s, 2H), 4.02(brd, J = 12.9 Hz, 1H), 3.74-3.85(m, 4H), 2.91-3.07(m, 1H), 2.81(brtd, J = 13.5, 8.5 Hz, 1H), 2.56-2.66(m, 2H), 2.46(brs, 2H), 1.98-2.15(m, 1H), 1.57-1.97(m, 7H), 1.35-1.54(m, 3H), 1.28(s, 6H) |
| 54 | ES + APCI: 441.3<br>NMR: δ 4.94(brd, J = 9.8 Hz, 1H), 4.33(brs, 1H), 4.01-4.15(m, 1H), 3.81(brd, J = 12.8 Hz, 1H), 3.59-3.67(m, 1H), 3.45(brd, J = 12.5 Hz, 1H), 3.01-3.17(m, 3H), 2.74-2.97(m, 5H), 2.35(brd, J = 11.0 Hz, 2H), 1.82-1.91(m, 1H), 1.72-1.79(m, 1H), 1.51-1.71(m, 4H), 0.92(brs, 3H), 0.84(s, 3H), 0.79(brd, J = 6.2 Hz, 6H) |
| 55 | ES + APCI: 486.2<br>NMR: δ 4.62(brs, 1H), 4.34(brt, J = 13.9 Hz, 1H), 3.88-4.07(m, 1H), 3.41-3.87(m, 6H), 3.23-3.31(m, 3H), 2.91-3.07(m, 1H), 2.73-2.86(m, 1H), 2.55-2.66(m, 3H), 2.06(brs, 1H), 1.94-2.29(m, 1H), 1.51-1.93(m, 6H), 1.28-1.50(m, 3H) |

TABLE 88

| Ex | Data |
|---|---|
| 56 | ES + APCI: 494.9<br>NMR: δ 4.57(brdd, J = 10.4, 3.6 Hz, 1H), 4.44(brd, J = 12.6 Hz, 1H), 3.97-4.14(m, 1H), 3.83(dd, J = 10.9, 7.9 Hz, 1H), 3.40-3.49(m, 1H), 3.35-3.40(m, 1H), 2.85-3.04(m, 1H), 2.54-2.66(m, 1H), 2.39-2.48 (m, 3H), 1.91-2.31(m, 9H), 1.75-1.91(m, 3H), 1.54-1.74(m, 1H), 1.36-1.50(m, 1H), 0.85(s, 3H), 0.78(s, 3H) |
| 57 | ES + APCI: 494.9<br>NMR: δ 4.60(brd, J = 10.1 Hz, 1H), 4.47(brd, J = 12.4 Hz, 1H), 4.07(brd, J = 10.5 Hz, 1H), 3.86(brt, J = 11.2 Hz, 1H), 3.39-3.50 (m, 1H), 3.08-3.19(m, 1H), 2.84-3.06(m, 1H), 2.62-2.74(m, 1H), 2.40-2.48(m, 3H), 2.19-2.32(m, 1H), 1.86-2.17(m, 8H), 1.57-1.86 (m, 4H), 1.45(brt, J = 15.9 Hz, 1H), 0.86(s, 3H), 0.78(s, 3H) |
| 58 | ES + APCI: 417<br>NMR: δ 4.62(brs, 1H), 4.28(brd, J = 13.3 Hz, 1H), 3.70-3.92(m, 4H), 2.74-2.95(m, 2H), 2.58-2.66(m, 1H), 2.20-2.46(m, 7H), 2.01-2.14(m, 1H), 1.88-2.00(m, 1H), 1.69-1.85(m, 6H), 1.22-1.67(m, 6H), 0.77(brd, J = 6.8 Hz, 6H) |
| 59 | ES + APCI: 473<br>NMR: δ 4.91(brd, J = 10.0 Hz, 1H), 4.61 (brs, 1H), 4.43(brd, J = 13.4 Hz, 1H), 3.91-4.04(m, 2H), 3.69-3.85(m, 2H), 3.54-3.69(m, 1H), 2.75-3.02(m, 2H), 2.54-2.66(m, 1H), 2.46(brd, J = 13.6 Hz, 3H), 1.96-2.09(m, 2H), 1.70-1.88(m, 8H), 1.54-1.67(m, 4H), 1.31-1.50(m, 3H) |
| 60 | ES + APCI: 472.9<br>NMR: δ 4.62(brs, 1H), 4.43(brd, J = 11.5 Hz, 1H), 3.93-4.13(m, 2H), 3.63-3.84(m, 4H), 3.44-3.56(m, 1H), 2.74-2.98(m, 2H), 2.56-2.67(m, 2H), 2.45(brd, J = 13.0 Hz, 3H), 2.09-2.21(m, 1H), 1.87-2.09(m, 2H), 1.56-1.86(m, 9H), 1.30-1.50(m, 3H) |

TABLE 89

| Ex | Data |
|---|---|
| 61 | ES + APCI: 472.9<br>NMR: δ 4.62(brs, 1H), 4.43(brd, J = 13.8 Hz, 1H), 4.01(brd, J = 9.8 Hz, 1H), 3.85-3.92(m, 2H), 3.71-3.84(m, 2H), 3.36-3.51(m, 3H), 2.86-3.01(m, 1H), 2.75-2.85(m, 1H), 2.56-2.66(m, 1H), 2.42-2.48(m, 3H), 1.94-2.09(m, 3H), 1.70-1.93(m, 8H), 1.55-1.67(m, 1H), 1.28-1.50(m, 3H) |
| 62 | ES + APCI: 458.9<br>NMR: δ 5.29(brt, J = 6.2 Hz, 1H), 4.62(brs, 1H), 4.43(brd, J = 12.2 Hz, 1H), 3.97-4.09(m, 1H), 3.84-3.96(m, 2H), 3.66- |

TABLE 89-continued

| Ex | Data |
|---|---|
|  | 3.83(m, 2H), 2.88-3.02(m, 1H), 2.80(brt, J = 12.3 Hz, 1H), 2.56-2.70(m, 2H), 2.39-2.45(m, 2H), 2.20(td, J = 12.6, 6.8 Hz, 1H), 1.94-2.09(m, 3H), 1.54-1.92(m, 8H), 1.30-1.51(m, 3H) |
| 63 | ES + APCI: 508.9<br>NMR: δ 5.17(brd, J = 9.8 Hz, 1H), 4.55-4.73(m, 1H), 4.43(brd, J = 11.4 Hz, 1H), 3.88-4.07(m, 3H), 3.72-3.86(m, 2H), 2.88-3.04(m, 1H), 2.80(brt, J = 12.7 Hz, 1H), 2.57-2.67(m, 2H), 2.45(brs, 2H), 2.20-2.32(m, 3H), 2.00-2.16(m, 2H), 1.59-1.96(m, 7H), 1.29-1.52(m, 3H) |
| 64 | ES + APCI: 508.9<br>NMR: δ 5.18(brd, J = 9.9 Hz, 1H), 4.62(brs, 1H), 4.43(brd, J = 11.5 Hz, 1H), 3.85-4.08(m, 3H), 3.70-3.81(m, 2H), 2.88-3.05(m, 1H), 2.80(brt, J = 12.2 Hz, 1H), 2.57-2.66(m, 2H), 2.44(brs, 2H), 2.25-2.32(m, 2H), 1.98-2.15(m, 2H), 1.55-1.97(m, 8H), 1.28-1.52(m, 3H) |
| 65 | ES + APCI: 495.9<br>NMR(CD3OD); δ 4.03(brd, J = 11.6 Hz, 1H), 3.96(brd, J = 10.6 Hz, 1H), 3.74-3.93(m, 2H), 3.67-3.74(m, 4H), 3.55-3.65(m, 1H), 3.36-3.49(m, 2H), 2.84-3.12(m, 6H), 2.54(brs, 4H), 2.10-2.43(m, 4H), 1.82-2.03(m, 4H), 1.48-1.82(m, 5H) |

TABLE 90

| Ex | Data |
|---|---|
| 66 | ES + APCI: 506.9<br>NMR: δ 5.16(brs, 1H), 4.63(brs, 1H), 4.43(brd, J = 14.4 Hz, 1H), 4.00(brd, J = 7.9 Hz, 1H), 3.68-3.87(m, 2H), 2.72-2.92(m, 2H), 2.57(brd, J = 14.4 Hz, 3H), 2.27-2.41(m, 3H), 2.04-2.25(m, 7H), 1.68-2.01(m, 6H), 1.55-1.67(m, 1H), 1.28-1.53(m, 3H) |
| 67 | ES + APCI: 479.3<br>NMR: δ 5.58(brd, J = 6.2 Hz, 1H), 4.62(brs, 1H), 4.42(brd, J = 12.6 Hz, 1H), 3.99(brd, J = 11.0 Hz, 1H), 3.68-3.87(m, 2H), 3.35-3.51(m, 3H), 2.72-2.96(m, 2H), 2.54-2.61(m, 2H), 2.26-2.46(m, 2H), 1.54-2.16(m, 8H), 1.23-1.51(m, 3H) |
| 68 | ES + APCI: 494.2<br>NMR: δ 7.72-7.81(m, 2H), 4.62-4.69(m, 1H), 3.67-3.97(m, 5H), 3.42-3.59(m, 1H), 3.06-3.22(m, 3H), 2.88-3.05(m, 2H), 2.76-2.86(m, 1H), 2.56-2.66(m, 2H), 2.39(brd, J = 13.0 Hz, 1H), 2.16-2.31(m, 1H), 1.53-1.89(m, 7H), 1.35-1.51(m, 3H) |
| 69 | ES + APCI: 451.4<br>NMR: δ 4.62(brd, J = 3.1 Hz, 1H), 4.18-4.28(m, 1H), 3.80(dd, J = 24.7, 18.5 Hz, 4H), 3.10-3.21(m, 2H), 2.89-3.06(m, 3H), 2.78(brs, 1H), 2.62(d, J = 6.1 Hz, 1H), 2.57-2.66(m, 2H), 2.09-2.25(m, 2H), 1.55-1.89(m, 7H), 1.24-1.53(m, 4H), 0.99-1.10(m, 1H), 0.31(d, J = 8.8 Hz, 2H), 0.18(brd, J = 3.3 Hz, 2H) |
| 70 | ES + APCI: 493.3<br>NMR: δ 7.46(brd, J = 2.9 Hz, 1H), 6.95-7.06(m, 2H), 4.63(brs, 1H), 3.90-4.07(m, 1H), 3.74-3.85(m, 4H), 3.07-3.17(m, 3H), 2.93-3.02(m, 3H), 2.78-2.84(m, 2H), 2.01-2.14(m, 2H), 1.66-1.88(m, 6H), 1.58-1.65(m, 1H), 1.34-1.51(m, 4H) |

TABLE 91

| Ex | Data |
|---|---|
| 71 | ES + APCI: 491.3<br>NMR: δ 7.77(brd, J = 9.8 Hz, 1H), 7.32(d, J = 3.1 Hz, 1H), 4.66(brs, 1H), 3.72-3.86(m, 3H), 3.65(brs, 1H), 3.50(brd, J = 5.9 Hz, 2H), 3.37-3.45(m, 1H), 3.23-3.30(m, 1H), 3.05-3.18(m, 2H), 2.89-3.03(m, 2H), 2.81(brd, J = 13.1 Hz, 1H), 2.56-2.67(m, 3H), 2.35-2.49(m, 2H), 2.01(s, 3H), 1.69-1.88(m, 4H), 1.58-1.66(m, 1H), 1.34-1.50(m, 3H) |
| 72 | ES + APCI: 429.4<br>NMR: δ 4.63(brs, 1H), 4.26(brd, J = 9.9 Hz, 1H), 3.66-3.89(m, 3H), 2.75-2.94(m, 2H), 2.57-2.66(m, 2H), 2.40(brt, J = 12.8 Hz, 1H), 2.28(s, 6H), 2.21(t, J = 11.3 Hz, 2H), 1.68-1.87(m, 5H), 1.54-1.68(m, 2H), 1.35-1.54(m, 4H), 1.25-1.34(m, 1H), 0.75(brd, J = 6.9 Hz, 6H) |
| 73 | ES + APCI: 493.3<br>NMR: δ 4.42(brd, J = 12.5 Hz, 1H), 4.33(t, J = 7.8 Hz, 2H), 4.07(brd, J = 13.0 Hz, 1H), 3.51-3.61(m, 1H), 3.35-3.40(m, 1H), 3.04-3.14(m, 1H), 2.85-3.03(m, 1H), 2.53-2.62(m, 2H), |

TABLE 91-continued

| Ex | Data |
|---|---|
| | 2.44(brd, J = 14.0 Hz, 3H), 2.18(brt, J = 7.7 Hz, 4H), 1.92-2.13(m, 6H), 1.72-1.89(m, 3H), 1.53-1.68(m, 1H), 1.32-1.53(m, 2H) |
| 74 | ES + APCI: 479.4<br>NMR: δ 4.62(d, J = 2.9 Hz, 1H), 4.22(brd, J = 9.6 Hz, 1H), 3.71-3.85(m, 3H), 3.24-3.31(m, 1H), 2.86-3.00(m, 1H), 2.75-2.84(m, 1H), 2.53-2.66(m, 1H), 1.91-2.24(m, 9H), 1.70-1.86(m, 6H), 1.53-1.66(m, 2H), 1.36-1.54(m, 4H), 1.22-1.34(m, 1H), 0.99-1.09(m, 1H), 0.25-0.34(m, 2H), 0.16(brs, 2H) |
| 75 | ES + APCI: 454.3<br>NMR: δ 4.63(brs, 1H), 3.57-3.84(m, 5H), 3.02-3.24(m, 3H), 2.84-2.97(m, 2H), 2.81(brd, J = 13.8 Hz, 1H), 2.55-2.65(m, 1H), 2.39-2.48(m, 1H), 2.10-2.28(m, 8H), 1.90-2.06(m, 2H), 1.67-1.88(m, 5H), 1.56-1.66(m, 1H), 1.32-1.50(m, 3H) |

TABLE 92

| Ex | Data |
|---|---|
| 76 | ES + APCI: 453.3<br>NMR(CD3OD); δ 4.58(brd, J = 13.3 Hz, 1H), 3.98-4.20(m, 1H), 3.62-3.87(m, 2H), 2.98-3.22(m, 5H), 2.74-2.90(m, 1H), 2.54-2.74(m, 4H), 2.08-2.20(m, 1H), 1.40-2.07(m, 6H), 1.23-1.38(m, 3H) |
| 77 | ES + APCI: 482.1 [M + H—HCOOH]+]<br>NMR(CD3OD); δ 8.48(brs, 1H), 4.50(brt, J = 11.8 Hz, 1H), 4.12-4.36(m, 1H), 4.07(brd, J = 8.6 Hz, 1H), 3.60-3.81(m, 2H), 3.50-3.58(m, 1H), 3.19-3.31(m, 5H), 2.88-3.16(m, 5H), 2.66(brd, J = 14.0 Hz, 1H), 2.44(brt, J = 12.0 Hz, 1H), 2.07-2.36(m, 7H), 1.68-2.06(m, 6H) |
| 78 | ES + APCI: 518.3<br>NMR(CD3OD); δ 3.82-4.28(m, 4H), 3.54-3.66(m, 1H), 3.41-3.52(m, 1H), 2.81-3.21(m, 12H), 2.13-2.67(m, 5H), 1.48-2.05(m, 9H) |
| 79 | ES + APCI: 493.3<br>NMR: δ 7.50(dd, J = 4.6, 2.8 Hz, 1H), 7.37(brd, J = 9.8 Hz, 1H), 7.10(brs, 1H), 4.62(brs, 1H), 4.00(dd, J = 35.1, 16.6 Hz, 1H), 3.69-3.85(m, 4H), 3.07-3.28(m, 3H), 2.86-3.04(m, 3H), 2.75-2.84(m, 1H), 2.57-2.64(m, 2H), 1.97-2.23(m, 3H), 1.68-1.88(m, 5H), 1.61(brs, 1H), 1.31-1.49(m, 3H) |
| 80 | ES + APCI: 467.4<br>NMR: δ 4.56(brs, 1H), 4.25(brd, J = 13.5 Hz, 1H), 3.82(brs, 2H), 3.38-3.45(m, 3H), 2.89(brd, J = 13.6 Hz, 2H), 1.89-2.31(m, 10H), 1.74-1.88(m, 2H), 1.34-1.72(m, 4H), 1.05(brs, 1H), 0.86(brs, 3H), 0.78(brs, 3H), 0.32(brs, 2H), 0.16(brs, 2H) |

TABLE 93

| Ex | Data |
|---|---|
| 81 | ES + APCI: 506.3<br>NMR: δ 8.56(s, 1H), 4.79(brs, 1H), 4.65(s, 1H), 4.38(brs, 1H), 3.68-4.01(m, 3H), 2.75-2.96(m, 2H), 2.57-2.66(m, 1H), 2.42-2.48(m, 1H), 2.35(brd, J = 7.8 Hz, 1H), 2.00-2.27(m, 9H), 1.56-1.94(m, 7H), 1.28-1.54(m, 3H) |
| 82 | ES + APCI: 481.3<br>NMR: δ 4.58-4.63(m, 1H), 4.27(brd, J = 13.1 Hz, 1H), 3.67-3.90(m, 3H), 3.27-3.30(m, 1H), 2.75-2.95(m, 2H), 2.53-2.69(m, 1H), 2.42(brt, J = 12.3 Hz, 1H), 1.95-2.31(m, 8H), 1.67-1.88(m, 8H), 1.27-1.66(m, 6H), 0.77(d, J = 6.8 Hz, 6H) |
| 83 | ES: 501.3<br>NMR: δ 7.14-7.30(m, 4H), 4.63(brs, 1H), 4.01-4.24(m, 1H), 3.72-3.94(m, 3H), 3.51-3.67(m, 1H), 3.00-3.29(m, 3H), 2.76-2.99(m, 4H), 2.55-2.66(m, 3H), 2.27(s, 3H), 1.99-2.23(m, 2H), 1.66-1.93(m, 5H), 1.58-1.64(m, 1H), 1.32-1.50(m, 3H) |
| 84 | ES + APCI: 504<br>NMR: δ 7.66(brt, J = 5.8 Hz, 1H), 7.23(dd, J = 8.1, 3.6 Hz, 2H), 7.14(d, J = 8.1 Hz, 2H), 4.33(t, J = 7.7 Hz, 2H), 4.06(dd, J = 30.6, 14.4 Hz, 1H), 3.78(dd, J = 27.3, 16.1 Hz, 1 H), 3.58(brd, J = 10.4 Hz, 1H), 3.06-3.27(m, 2H), 2.79-2.99(m, 3H), 2.57(brs, 1H), 2.41-2.46(m, 2H), 2.24-2.28(m, 3H), 2.18(brt, J = 7.7 Hz, 2H), 2.05-2.14(m, 1H), 1.85-1.99(m, 3H), 1.59-1.77(m, 5H), 1.36-1.56(m, 5H), 1.03(q, J = 11.4 Hz, 2H) |
| 85 | ES + APCI: 482.3<br>NMR: δ 6.04(brs, 1H), 4.53-4.70(m, 1H), 4.50(t, J = 8.3 Hz, 2H), 3.85-3.99(m, 1H), 3.52(dd, J = 11.4, 2.6 Hz, 1H), 3.18-3.43(m, 4H), |

TABLE 93-continued

| Ex | Data |
|---|---|
| | 2.60-2.75(m, 2H), 2.21-2.40(m, 4H), 2.01-2.19(m, 3H), 1.80-1.93(m, 4H), 1.55-1.73(m, 6H), 1.23-1.41(m, 3H) |

TABLE 94

| Ex | Data |
|---|---|
| 86 | ES + APCI: 467.3<br>NMR: δ 4.24-4.41(m, 3H), 3.89(brd, J = 13.9 Hz, 1H), 3.51-3.64(m, 1H), 3.24-3.30(m, 1H), 3.12(brt, J = 12.8 Hz, 1H), 2.80-2.94(m, 1H), 2.53-2.62(m, 1H), 2.35-2.47(m, 1H), 1.89-2.31(m, 11H), 1.72-1.87(m, 3H), 1.28-1.68(m, 5H), 0.76(d, J = 6.9 Hz, 6H) |
| 87 | ES + APCI: 519.3<br>NMR: δ 7.30-7.40(m, 2H), 7.19(t, J = 8.2 Hz, 2H), 4.34(t, J = 7.8 Hz, 2H), 4.11-4.29(m, 1H), 3.82-4.03(m, 1H), 3.60-3.66(m, 1H), 3.05-3.27(m, 3H), 2.69-2.95(m, 1H), 2.53-2.62(m, 3H), 2.19(t, J = 7.8 Hz, 2H), 1.87-2.16(m, 9H), 1.56-1.80(m, 3H), 1.37-1.55(m, 2H) |
| 88 | ES + APCI: 453.3<br>NMR: δ 4.62(dd, J = 10.5, 3.6 Hz, 1H), 4.25-4.46(m, 2H), 3.92-4.10(m, 2H), 3.70(brdd, J = 7.8, 3.6 Hz, 1H), 3.41-3.57(m, 1H), 3.16-3.30(m, 1H), 2.69-2.83(m, 1H), 2.57-2.66(m, 1H), 2.21-2.33(m, 1H), 1.91-2.18(m, 7H), 1.60-1.87(m, 7H), 1.34-1.51(m, 3H), 0.87(d, J = 6.9 Hz, 6H). |
| 89 | ES + APCI: 415.3<br>NMR: δ 8.09-8.14(m, 2H), 7.49-7.55(m, 2H), 4.65(d, J = 3.5 Hz, 1H), 4.28-4.40(m, 1H), 3.97(brt, J = 13.2 Hz, 1H), 3.84(brd, J = 8.0 Hz, 1H), 3.77(brd, J = 2.9 Hz, 1H), 3.34-3.43(m, 1H), 3.18-3.30(m, 1H), 2.76-2.94(m, 2H), 2.60-2.66(m, 1H), 2.05-2.20(m, 2H), 1.58-1.88(m, 8H), 1.36-1.53(m, 3H) |
| 90 | ES + APCI: 403.3<br>NMR: δ 8.08-8.15(m, 2H), 7.52(t, J = 8.8 Hz, 2H), 4.61(brd, J = 2.8 Hz, 1H), 4.28-4.44(m, 1H), 3.99(brt, J = 13.8 Hz, 1H), 3.88(brdd, J = 10.6, 3.1 Hz, 1H), 3.35-3.52(m, 2H), 3.08-3.28(m, 1H), 2.81-2.96(m, 1H), 2.63-2.75(m, 1H), 2.27(brd, J = 13.3 Hz, 1H), 2.02-2.22(m, 3H), 1.57-1.88(m, 3H), 1.48(dt, J = 13.4, 3.7 Hz, 1H), 0.88(s, 3H), 0.79(s, 3H) |

TABLE 95

| Ex | Data |
|---|---|
| 91 | ES + APCI: 449.3<br>NMR: δ 8.03 (d, J = 5.1 Hz, 1 H), 6.82 (s, 1 H), 6.59 (d, J = 5.3 Hz, 1 H), 4.67 (br s, 1 H), 4.52 (br d, J = 12.1 Hz, 1 H), 4.00 (br d, J = 13.2 Hz, 1 H), 3.74-3.87 (m, 2 H), 3.68 (t, J = 5.4 Hz, 4 H), 2.97-3.16 (m, 1 H), 2.82 (br d, J = 13.2 Hz, 1 H), 2.59-2.75 (m, 3 H), 1.90-2.00 (m, 4 H), 1.71-1.87 (m, 7 H), 1.59-1.66 (m, 1 H), 1.32-1.56 (m, 5 H) |
| 92 | ES + APCI: 455.3<br>NMR: δ 6.91 (d, J = 1.0 Hz, 1 H), 4.64 (d, J = 3.8 Hz, 1 H), 4.41 (br d, J = 11.8 Hz, 1 H), 3.94 (br s, 1 H), 3.72-3.85 (m, 2 H), 3.52 (t, J = 6.1 Hz, 4 H), 2.92-3.18 (m, 2 H), 2.81 (d, J = 13.1 Hz, 1 H), 2.62 (br d, J = 13.3 Hz, 2 H), 2.01-2.11 (m, 4 H), 1.70-1.98 (m, 7 H), 1.59-1.65 (m, 1 H), 1.23-1.51 (m, 5 H) |
| 93 | ES + APCI: 413.3<br>NMR: δ 8.33 (s, 1 H), 7.80-7.85 (m, 2 H), 7.66 (s, 1 H), 7.33 (t, J = 8.3 Hz, 2 H), 4.67 (br s, 1 H), 4.42 (br d, J = 12.9 Hz, 1 H), 3.91-4.01 (m, 1 H), 3.75-3.91 (m, 2 H), 3.06-3.21 (m, 1 H), 2.75-2.88 (m, 2 H), 2.60-2.74 (m, 2 H), 1.89-2.04 (m, 2 H), 1.68-1.88 (m, 4 H), 1.56-1.67 (m, 1 H), 1.30-1.56 (m, 5 H) |
| 94 | ES + APCI: 450.3<br>NMR: δ 7.35 (d, J = 6.1 Hz, 1 H), 5.95 (d, J = 6.2 Hz, 1 H), 3.83 (br s, 1 H), 3.56 (br d, J = 11.7 Hz, 1 H), 3.04-3.15 (m, 1 H), 2.89-3.03 (m, 6 H), 2.15-2.42 (m, 1 H), 1.92-2.05 (m, 2 H), 1.75-1.90 (m, 2 H), 1.04-1.25 (m, 6 H), 0.86-1.02 (m, 4 H), 0.73-0.85 (m, 2 H), 0.46-0.72 (m, 4 H) |
| 95 | ES + APCI: 483.2<br>NMR: δ 8.17 (dd, J = 8.9, 4.7 Hz, 2 H), 7.55 (t, J = 8.2 Hz, 2 H), 4.63 (d, J = 3.6 Hz, 1 H), 4.45 (br d, J = 13.5 Hz, 1 H), 3.94-4.13 |

TABLE 95-continued

| Ex | Data |
|---|---|
| | (m, 1 H), 3.70-3.86 (m, 2 H), 2.89-3.09 (m, 1 H), 2.76-2.85 (m, 1 H), 2.56-2.72 (m, 3 H), 2.09-2.21 (m, 1 H), 1.68-2.06 (m, 6 H), 1.56-1.67 (m, 1 H), 1.27-1.52 (m, 3 H) |

TABLE 96

| Ex | Data |
|---|---|
| 96 | ES + APCI: 433.2<br>NMR: δ 8.18-8.25 (m, 1 H), 7.92-7.99 (m, 1 H), 7.72-7.81 (m, 1 H), 4.66 (br s, 1 H), 4.28-4.43 (m, 1 H), 3.89-4.07 (m, 1 H), 3.84 (br d, J = 8.3 Hz, 1 H), 3.74-3.80 (m, 1 H), 3.18-3.28 (m, 1 H), 2.74-2.95 (m, 3 H), 2.64 (br d, J = 13.2 Hz, 1 H), 2.04-2.21 (m, 2 H), 1.70-1.95 (m, 6 H), 1.54-1.68 (m, 2 H), 1.36-1.52 (m, 3 H) |
| 97 | ES + APCI: 439.4<br>NMR: δ 5.01-5.12 (m, 1 H), 4.65 (br s, 1 H), 4.31 (br s, 1 H), 3.92 (br t, J = 12.5 Hz, 1 H), 3.72-3.85 (m, 2 H), 3.14-3.30 (m, 2 H), 2.81 (br d, J = 13.3 Hz, 2 H), 2.60-2.70 (m, 2 H), 2.21-2.31 (m, 2 H), 1.96-2.20 (m, 8 H), 1.58-1.87 (m, 6 H), 1.33-1.57 (m, 4 H) |
| 98 | ES + APCI: 414.2<br>NMR: δ 8.63 (s, 1 H), 7.90-7.95 (m, 2 H), 7.45 (t, J = 8.3 Hz, 2 H), 4.75 (br d, J = 3.1 Hz, 1 H), 4.39 (br d, J = 10.9 Hz, 1 H), 3.84-3.98 (m, 2 H), 3.79 (br s, 1 H), 3.15-3.27 (m, 1 H), 3.07 (ddd, J = 11.2, 7.5, 3.9 Hz, 1 H), 2.78-2.89 (m, 2 H), 2.64-2.75 (m, 1 H), 1.94-2.13 (m, 2 H), 1.68-1.90 (m, 4 H), 1.38-1.67 (m, 6 H) |
| 99 | ES + APCI: 415.3<br>NMR: δ 8.84 (d, J = 5.5 Hz, 2 H), 8.09 (d, J = 4.3 Hz, 1 H), 7.76 (d, J = 5.6 Hz, 1 H), 4.68 (br s, 1 H), 4.44 (br d, J = 11.9 Hz, 1 H), 3.93-4.07 (m, 1 H), 3.85 (br dd, J = 10.8, 2.4 Hz, 1 H), 3.78 (br d, J = 2.8 Hz, 1 H), 3.08-3.30 (m, 2 H), 2.70-2.87 (m, 2 H), 2.60-2.67 (m, 1 H), 1.98-2.13 (m, 2 H), 1.59-1.88 (m, 7 H), 1.35-1.53 (m, 3 H) |
| 100 | ES + APCI: 427.2<br>NMR: δ 7.62-7.66 (m, 1 H), 7.54-7.61 (m, 2 H), 7.17 (ddd, J = 8.3, 2.4, 0.9 Hz, 1 H), 4.68 (br s, 1 H), 4.29-4.42 (m, 1 H), 3.90-3.99 (m, 1 H), 3.88 (s, 3 H), 3.83-3.87 (m, 1 H), 3.78 (br s, 1 H), 3.34-3.47 (m, 2 H), 3.06-3.25 (m, 1 H), 2.76-2.93 (m, 2 H), 2.66 (br d, J = 13.4 Hz, 1 H), 2.03-2.21 (m, 2 H), 1.57-1.89 (m, 7 H), 1.36-1.54 (m, 3 H) |

TABLE 97

| Ex | Data |
|---|---|
| 101 | ES + APCI: 425.2<br>NMR: δ 8.81 (d, J = 5.3 Hz, 1 H), 8.30 (dd, J = 8.4, 5.8 Hz, 2 H), 7.92 (d, J = 5.4 Hz, 1 H), 7.39 (t, J = 8.8 Hz, 2 H), 4.66 (br s, 1 H), 4.46 (br d, J = 12.5 Hz, 1 H), 3.95-4.08 (m, 1 H), 3.85 (br d, J = 8.6 Hz, 1 H), 3.78 (br s, 1 H), 3.12-3.30 (m, 2 H), 2.70-2.88 (m, 2 H), 2.64 (br d, J = 13.3 Hz, 1 H), 1.97-2.15 (m, 2 H), 1.56-1.87 (m, 8 H), 1.34-1.54 (m, 3 H) |
| 102 | ES + APCI: 411.2<br>NMR: δ 7.32-7.42 (m, 5 H), 5.89 (s, 2 H), 4.65 (br s, 1 H), 4.23-4.38 (m, 1 H), 3.91 (br t, J = 13.0 Hz, 1 H), 3.73-3.85 (m, 2 H), 3.12-3.30 (m, 2 H), 2.81 (br d, J = 13.2 Hz, 2 H), 2.62 (br d, J = 13.2 Hz, 1 H), 1.94-2.12 (m, 2 H), 1.56-1.91 (m, 7 H), 1.33-1.54 (m, 4 H) |
| 103 | ES + APCI: 421.1<br>NMR: δ 8.22 (ddd, J = 10.8, 7.0, 2.6 Hz, 1 H), 7.93-7.98 (m, 1 H), 7.73-7.81 (m, 1 H), 4.62 (br s, 1 H), 4.30-4.42 (m, 1 H), 3.99 (br t, J = 13.8 Hz, 1 H), 3.87 (br d, J = 8.1 Hz, 1 H), 3.36-3.47 (m, 2 H), 3.21-3.31 (m, 1 H), 2.83-2.94 (m, 1 H), 2.66-2.72 (m, 1 H), 2.27 (d, J = 13.2 Hz, 1 H), 2.02-2.20 (m, 2 H), 1.55-1.97 (m, 4 H), 1.48 (dt, J = 13.5, 3.9 Hz, 1 H), 0.87 (s, 3 H), 0.78 (s, 3 H) |
| 104 | ES + APCI: 433.1<br>NMR(300): δ 8.03-8.23 (m, 1 H), 7.45-7.60 (m, 1 H), 7.32 (td, J = 8.3, 2.2 Hz, 1 H), 5.19-5.34 (m, 1 H), 4.59-4.73 (m, 1 H), 4.29-4.48 (m, 1 H), 3.94-4.15 (m, 1 H), 3.74-3.90 (m, 2 H), 2.91-3.05 (m, 1 H), 2.79-2.89 (m, 1 H), 2.63 (br d, J = 13.1 Hz, 1 H), 2.39 (br dd, J = 4.4, 2.4 Hz, 2 H), 2.03-2.13 (m, 1 H), 1.70-1.92 (m, 7 H), 1.58-1.66 (m, 1 H), 1.38-1.50 (m, 3 H) |

TABLE 98

| Ex | Data |
|---|---|
| 105 | ES + APCI: 416.2<br>NMR: δ 8.77 (d, J = 2.9 Hz, 1 H), 8.24 (dd, J = 8.8, 4.5 Hz, 1 H), 8.19 (s, 1 H), 7.97 (td, J = 8.7, 2.9 Hz, 1 H), 5.24-5.30 (m, 1 H), 4.65-5.05 (m, 1 H), 4.31-4.47 (m, 1 H), 3.95-4.08 (m, 2 H), 3.81 (br s, 1 H), 2.86-3.10 (m, 3 H), 2.74-2.83 (m, 1 H), 2.57-2.64 (m, 1 H), 2.25-2.34 (m, 2 H), 2.01-2.19 (m, 1 H), 1.85-1.99 (m, 3 H), 1.71-1.80 (m, 2 H), 1.58-1.69 (m, 2 H), 1.42-1.56 (m, 2 H) |

INDUSTRIAL APPLICABILITY

The azacycloalkylcarbonyl cyclic amine compound or the salt thereof according to the embodiment of the present invention has a CTSC inhibitory effect, and can be used as an active ingredient of a pharmaceutical composition for a treatment of a neutrophil associated inflammatory disease, which includes chronic obstructive pulmonary disease (COPD), bronchiectasis, and anti-neutrophil cytoplasmic antibody (ANCA)-related vasculitis.

The invention claimed is:
1. A compound of Formula (I) or a salt thereof,

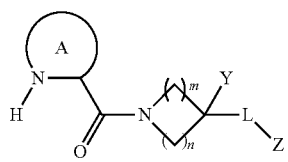

(I)

wherein:
Ring A is 9-hydroxy-6-azaspiro [3.5]nonan-7-yl;
Y is hydrogen, $C_{1-4}$ alkyl, $C_{3-6}$ cycloalkyl, a 6-membered aromatic hydrocarbon ring, a 5- or 6-membered non-aromatic heterocycle, or a 5- or 6-membered aromatic heterocycle; wherein the $C_{1-4}$ alkyl may be substituted with 1 to 5 substituents independently selected from halogen, —OH, —O—($C_{1-4}$ alkyl), and amino; and wherein the $C_{3-6}$ cycloalkyl, the 6-membered aromatic hydrocarbon ring, the 5- or 6-membered non-aromatic heterocycle, and the 5- or 6-membered aromatic heterocycle may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens;
L is pyrazolyl, thiazolyl, 1,2,4-oxadiazolyl, 1,3,4-oxadiazolyl, 1,2,3-triazolyl, tetrazolyl, pyridyl, pyrimidinyl, (oxadiazolyl)-($C_1$-$C_2$ alkylene), (tetrazolyl)-($C_1$-$C_2$ alkylene), (oxadiazolyl)-C(=O)— or —C(=O)-pyrrolidinyl;
Z is $C_{3-6}$ cycloalkyl, a 6-membered aromatic hydrocarbon ring, a 4- to 6-membered non-aromatic heterocycle, a 5- or 6-membered aromatic heterocycle, or an optionally substituted —O—($C_{1-4}$ alkyl); wherein the $C_{3-6}$ cycloalkyl, the 6-membered aromatic hydrocarbon ring, the 4- to 6-membered non-aromatic heterocycle, the 5- or 6-membered aromatic heterocycle, and the —O—($C_{1-4}$ alkyl) may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens;

with the proviso that when L is (oxadiazolyl)-C(=O)—, Z is a 4- to 6-membered non-aromatic heterocycle having at least one nitrogen; wherein the 4- to 6-membered non-aromatic heterocycle having at least one nitrogen may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens; and m and n are each independently 1 or 2.

2. The compound of claim 1 or the salt thereof, wherein the Ring A is (7S,9R)-9-hydroxy-6-azaspiro [3.5]nonan-7-yl.

3. The compound of claim 1 or the salt thereof, wherein m is 2 and n is 2.

4. The compound of claim 1 or the salt thereof, wherein L is a pyrazolyl, 1,2,4-oxadiazolyl, 1,3,4-oxadiazolyl, 1,2,3-triazolyl, tetrazolyl, pyridyl, or pyrimidinyl.

5. The compound of claim 4 or the salt thereof, wherein L is 1,2,4-oxadiazolyl or tetrazolyl.

6. The compound of claim 1 or the salt thereof, wherein Y is $C_{1-4}$ alkyl or $C_{3-6}$ cycloalkyl;
wherein the $C_{1-4}$ alkyl may be substituted with 1 to 5 substituents independently selected from halogen, —OH, —O—($C_{1-4}$ alkyl), and amino; and
wherein the $C_{3-6}$ cycloalkyl may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens.

7. The compound of claim 1 or the salt thereof, wherein Z is $C_{3-6}$ cycloalkyl or a 4- to 6-membered non-aromatic heterocycle;
wherein the $C_{3-6}$ cycloalkyl and the 4- to 6-membered non-aromatic heterocycle may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens.

8. The compound of claim 7 or the salt thereof, wherein Z is cyclobutyl, cyclohexyl, bicyclo[1.1.1] pentyl, azetidin-1-yl, piperidin-1-yl, tetrahydrofuryl, or tetrahydropyranyl, each of which is substituted with 2 or 3 substituents independently selected from fluoro and methyl.

9. The compound of claim 1 or the salt thereof, wherein:
Y is hydrogen, $C_{1-4}$ alkyl, or $C_{3-6}$ cycloalkyl; wherein the $C_{1-4}$ alkyl may be substituted with 1 to 5 independently selected halogens;
L is a pyrazolyl, 1,2,4-oxadiazolyl, 1,3,4-oxadiazolyl, 1,2,3-triazolyl, tetrazolyl, pyridyl, pyrimidinyl, (oxadiazolyl)-($C_1$-$C_2$ alkylene), or (tetrazolyl)-($C_1$-$C_2$ alkylene); and
Z is $C_{3-6}$ cycloalkyl, phenyl, a 4- to 6-membered non-aromatic heterocycle, or a 5- or 6-membered aromatic heterocycle; wherein the $C_{3-6}$ cycloalkyl, the phenyl, the 4- to 6-membered non-aromatic heterocycle, and the 5- or 6-membered aromatic heterocycle may be substituted with 1 to 3 substituents independently selected from halogen, —OH, —O—($C_{1-4}$ alkyl), oxo, amino, cyano, nitro, and $C_{1-4}$ alkyl which may be substituted with 1 to 5 independently selected halogens.

10. The compound of claim 1 or the salt thereof, wherein:
Y is hydrogen, $C_{1-4}$ alkyl, or $C_{3-6}$ cycloalkyl; wherein the $C_{1-4}$ alkyl may be substituted with 1 to 5 independently selected halogens;

L is pyrazolyl, 1,2,4-oxadiazolyl, 1,3,4-oxadiazolyl, 1,2,3-triazolyl, tetrazolyl, pyridyl, pyrimidinyl, (oxadiazolyl)-($C_1$-$C_2$ alkylene), or (tetrazolyl)-($C_1$-$C_2$ alkylene); and
Z is $C_{3-6}$ cycloalkyl, phenyl, a 4- to 6-membered non-aromatic heterocycle, or a 5- or 6-membered aromatic heterocycle; wherein the $C_{3-6}$ cycloalkyl, the phenyl, the 4- to 6-membered non-aromatic heterocycle, and the 5- or 6-membered aromatic heterocycle in Z may be each substituted with one to three substituents independently selected from halogen, —OH, amino, cyano, nitro, $C_{1-4}$ alkyl which may be substituted with 1 to 5 independently selected halogens, and —O—($C_{1-4}$ alkyl which may be substituted with halogen).

11. A pharmaceutical composition comprising the compound of claim 1 or the salt thereof, and a pharmaceutically acceptable excipient.

12. The compound of claim 2 or the salt thereof, wherein the compound is selected from:

(Ex. 1)
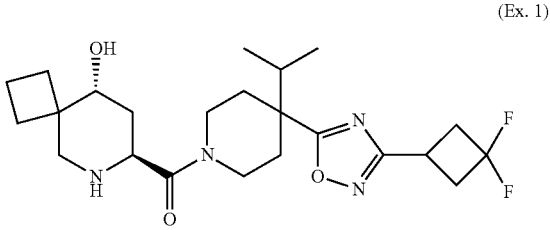

(Ex. 2)
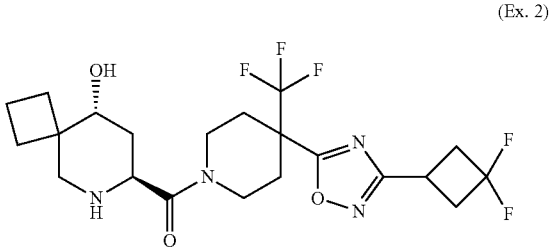

(Ex. 3)
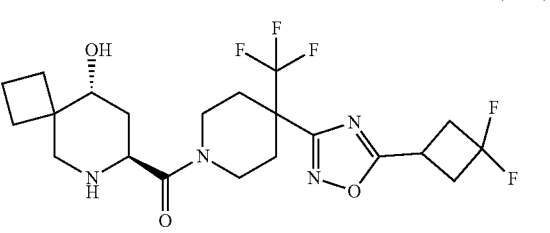

(Ex. 5)
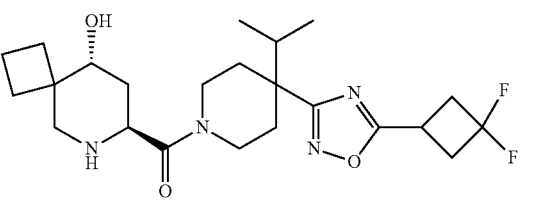

(Ex. 6)
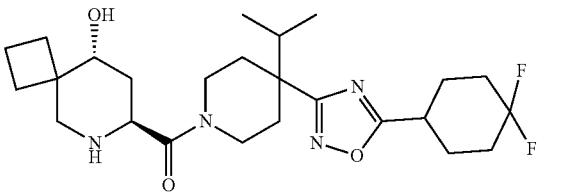

(Ex. 12)
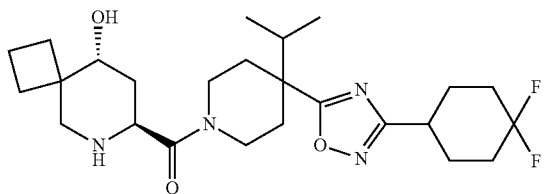
(Ex. 13)
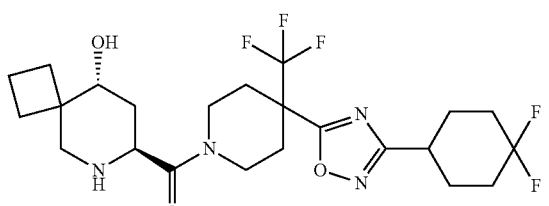
(Ex. 14)
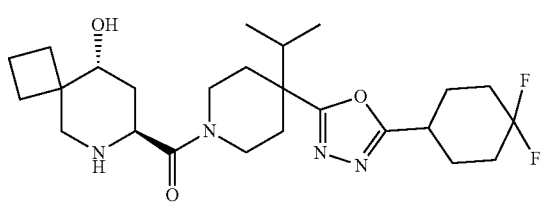
(Ex. 16)
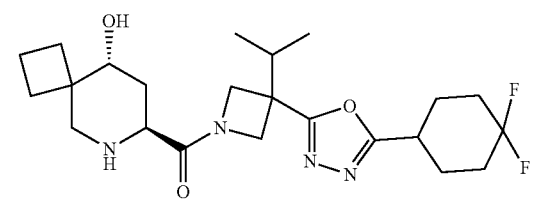
(Ex. 18)
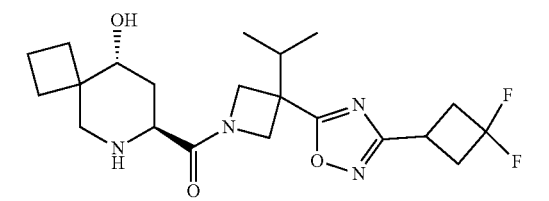
(Ex. 19)
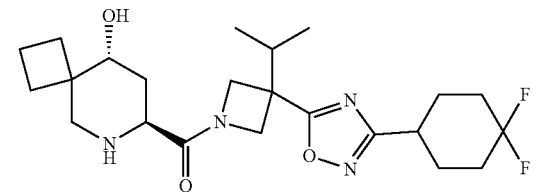
(Ex. 31)
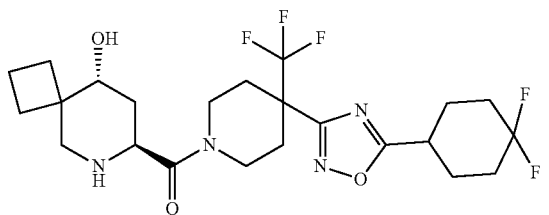
(Ex. 44)
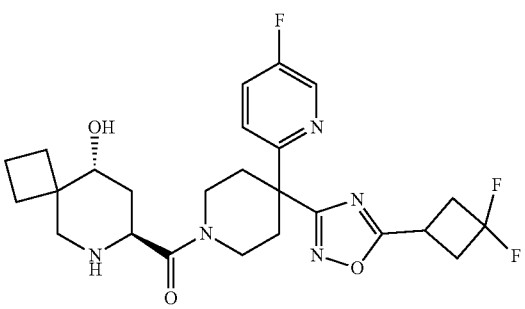
(Ex. 45)
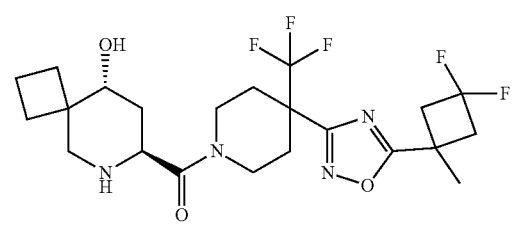
(Ex. 47)
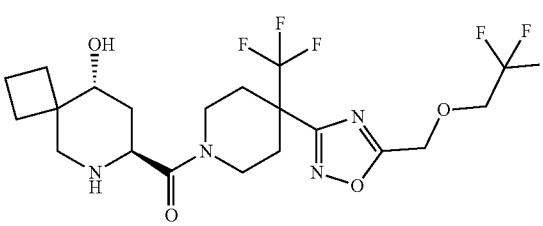
(Ex. 48)
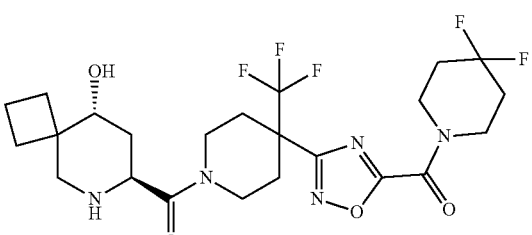
(Ex. 49)
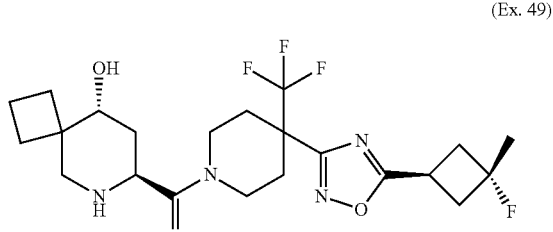
(Ex. 50)
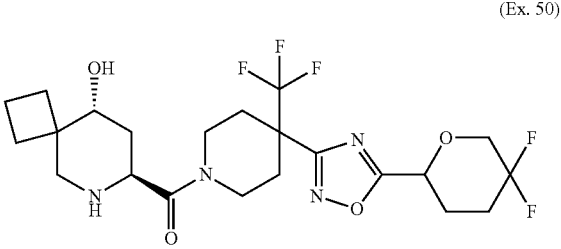

(Ex. 53) 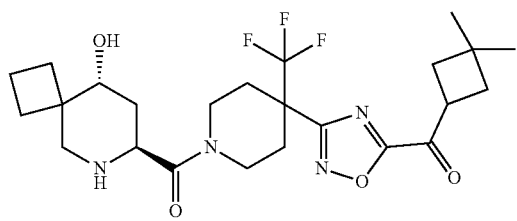
(Ex. 62) 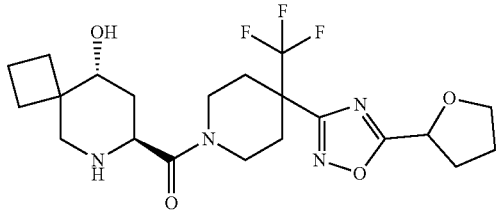
(Ex. 55) 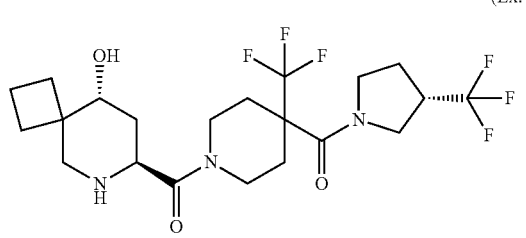
(Ex. 63) 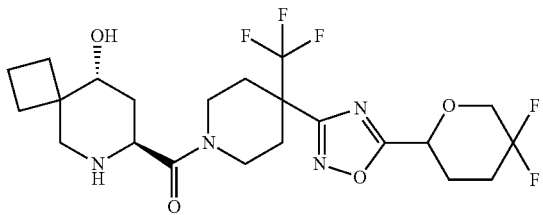
(Ex. 58) 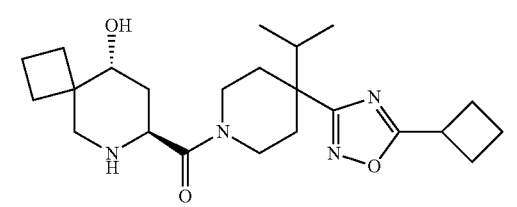
(Ex. 64) 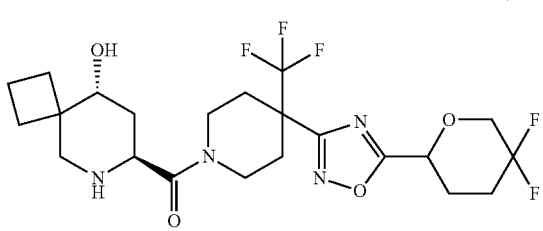
(Ex. 59) 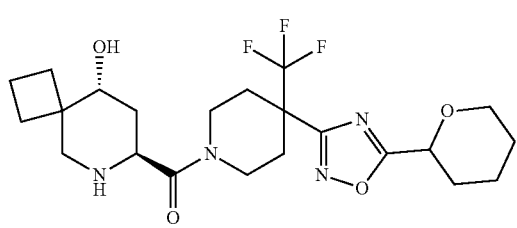
(Ex. 65) 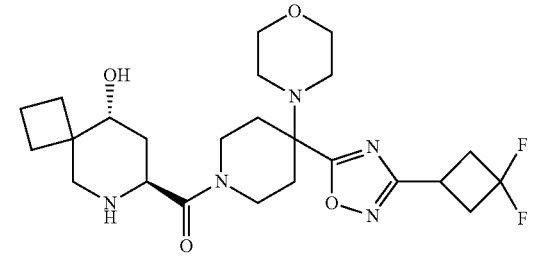
(Ex. 60) 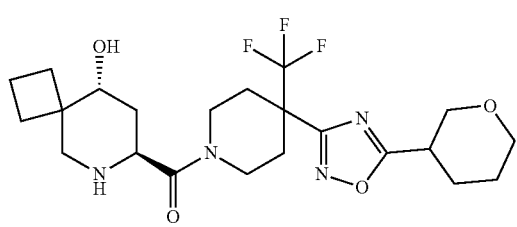
(Ex. 66) 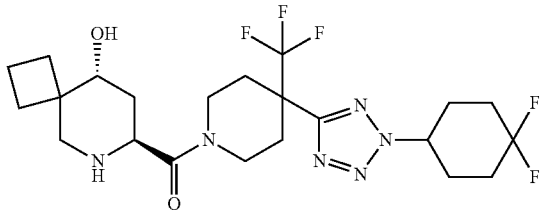
(Ex. 61) 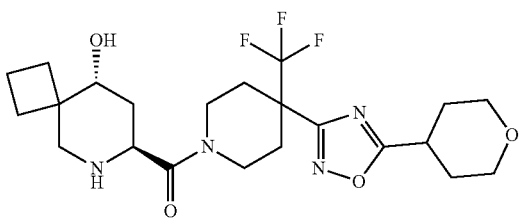
(Ex. 67) 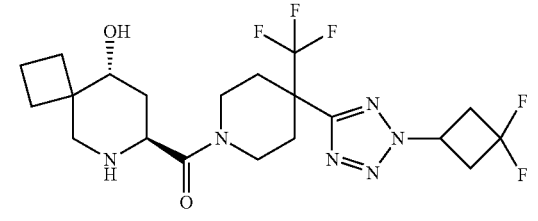

(Ex. 68)
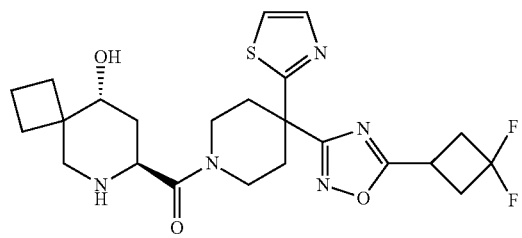
(Ex. 69)
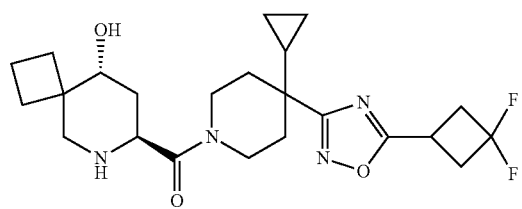
(Ex. 70)
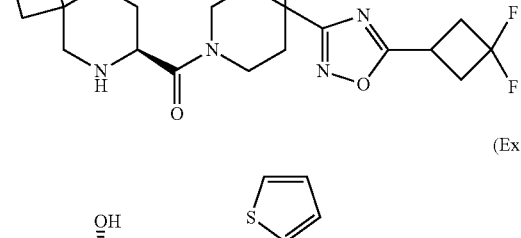
(Ex. 71)
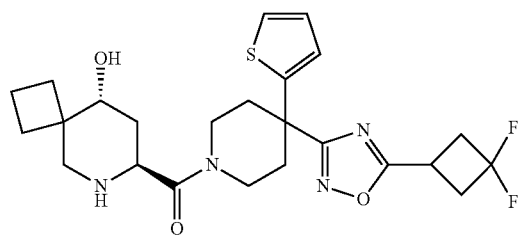
(Ex. 72)
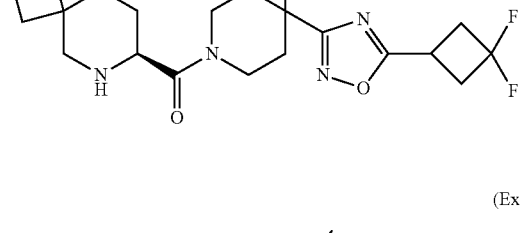
(Ex. 74)
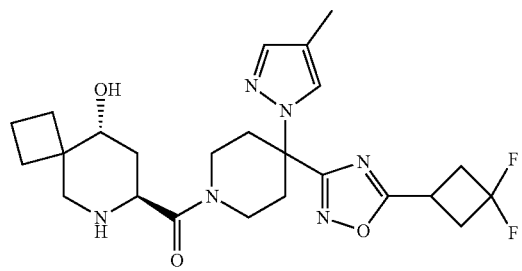
(Ex. 79)
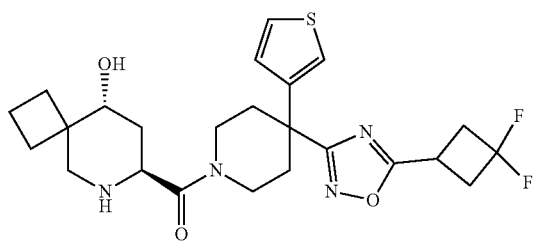
(Ex. 81)
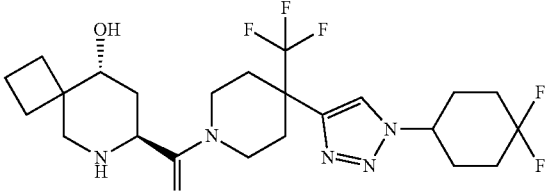
(Ex. 82)
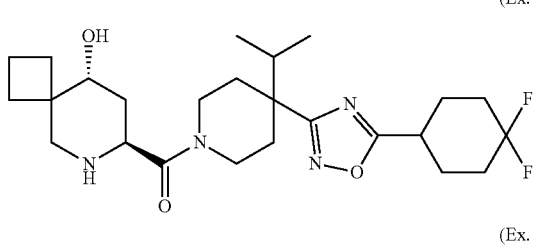
(Ex. 83)
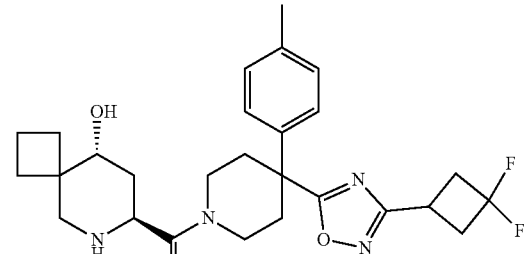
(Ex. 89)
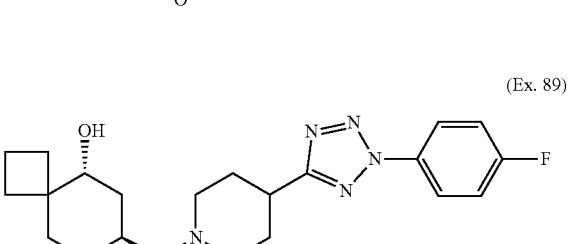
(Ex. 91)
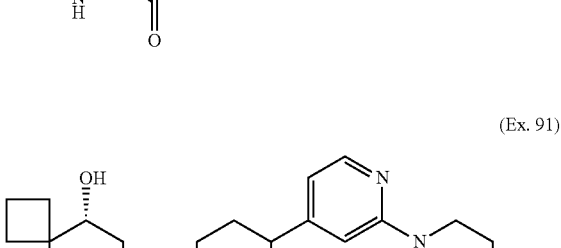

211
-continued (Ex. 92)
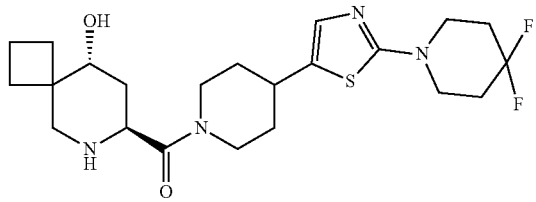

(Ex. 93)
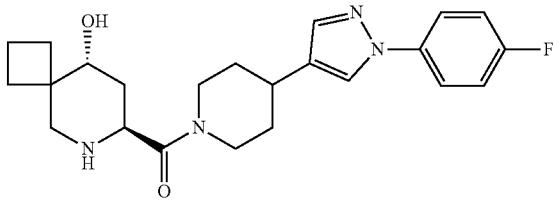

(Ex. 94)
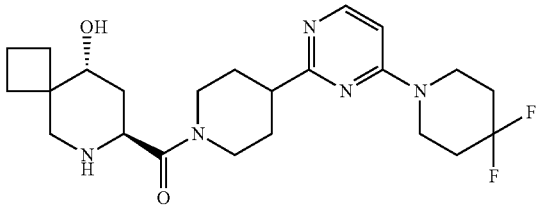

(Ex. 95)
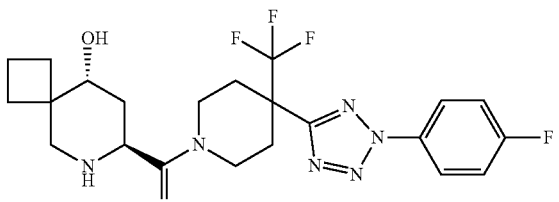

(Ex. 96)
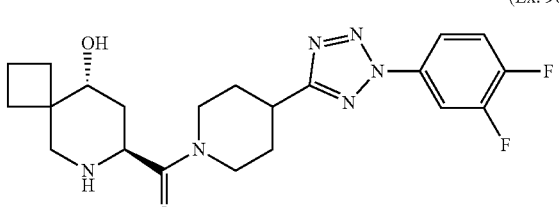

(Ex. 97)
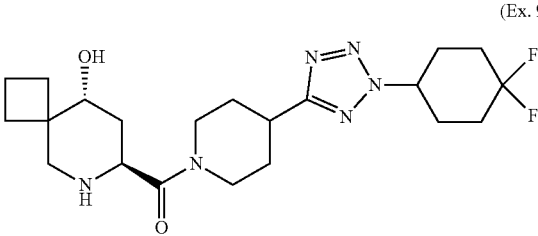

(Ex. 98)
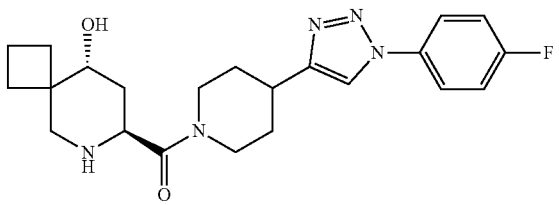

212
-continued (Ex. 99)
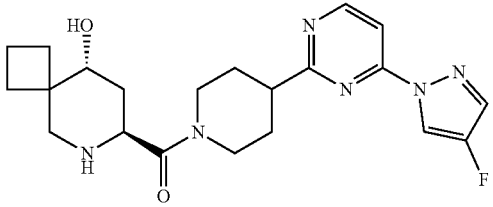

(Ex. 100)
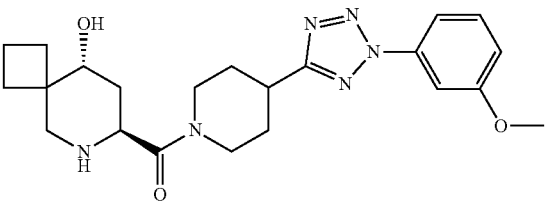

(Ex. 101)
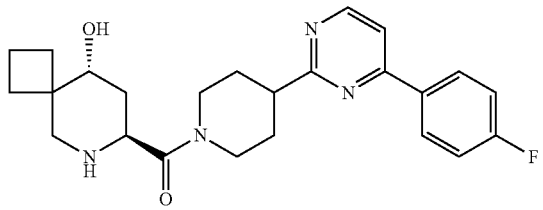 [SMILES: O=C([C@@H]1C[C@@H](O)C2(CCC2)CN1)N1CCC(c2nccc(-c3ccc(F)cc3)n2)CC1]

(Ex. 102)
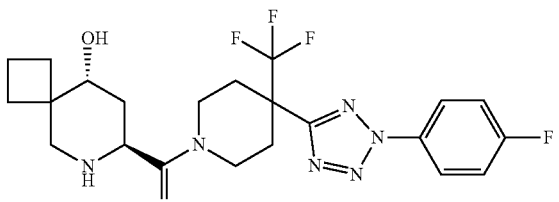

(Ex. 104)
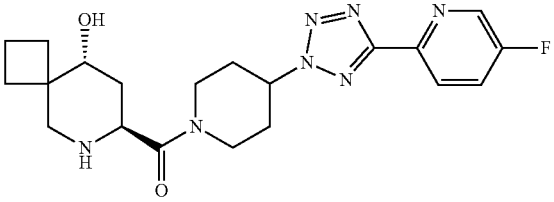

(Ex. 105)
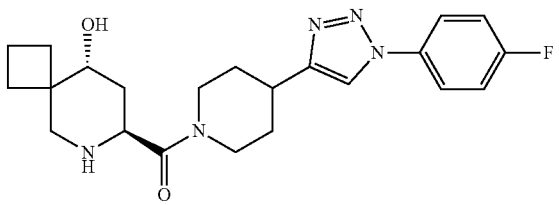

or a salt thereof.

13. The compound of claim 9 or the salt thereof, wherein Y is $C_{1-4}$ alkyl optionally substituted with 1 to 5 independently selected halogens.

14. The compound of claim 13 or the salt thereof, wherein Z is $C_{3-6}$ cycloalkyl, or a 4- to 6-membered non-aromatic heterocycle;
wherein the $C_{3-6}$ cycloalkyl and the 4- to 6-membered non-aromatic heterocycle may be substituted with 1 to 3 substituents independently selected from halogen, —OH, —O—(C$_{1-4}$ alkyl), oxo, amino, cyano, nitro, and C$_{1-4}$ alkyl which may be substituted with 1 to 5 independently selected halogens.

15. The compound of claim 1 or the salt thereof, wherein the compound is

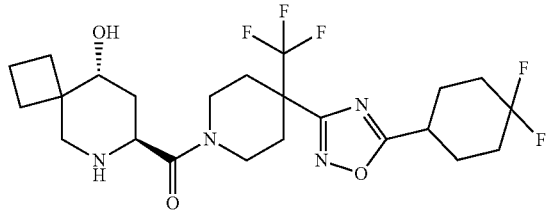 [SMILES: O=C([C@@H]1C[C@@H](O)C2(CCC2)CN1)N1CCC(c2noc(C3CCC(F)(F)CC3)n2)(C(F)(F)F)CC1]

or a salt thereof.

16. The compound of claim 1 or the salt thereof, wherein the compound is

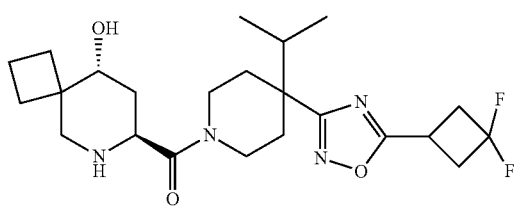 [SMILES: CC(C)C1(c2noc(C3CC(F)(F)C3)n2)CCN(C(=O)[C@@H]2C[C@@H](O)C3(CCC3)CN2)CC1]

or a salt thereof.

17. The compound of claim 1 or the salt thereof, wherein the compound is

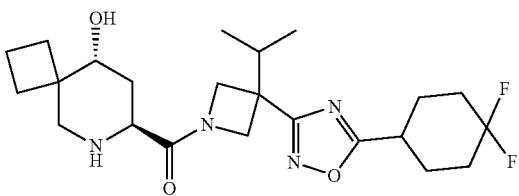 [SMILES: CC(C)C1(c2noc(C3CCC(F)(F)CC3)n2)CN(C(=O)[C@@H]2C[C@@H](O)C3(CCC3)CN2)C1]

or a salt thereof.

18. The compound of claim 1 or the salt thereof, wherein the compound is

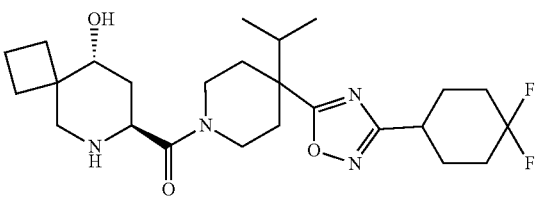 [SMILES: CC(C)C1(c2nc(C3CCC(F)(F)CC3)no2)CCN(C(=O)[C@@H]2C[C@@H](O)C3(CCC3)CN2)CC1]

or a salt thereof.

19. The compound of claim 1 or the salt thereof, wherein the compound is

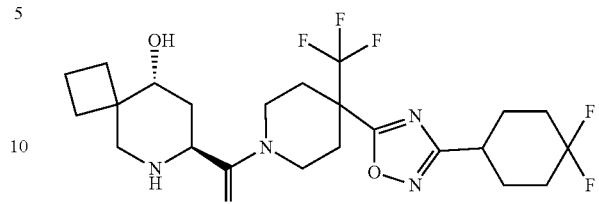

or a salt thereof.

20. The compound of claim 1 or the salt thereof, wherein the compound is

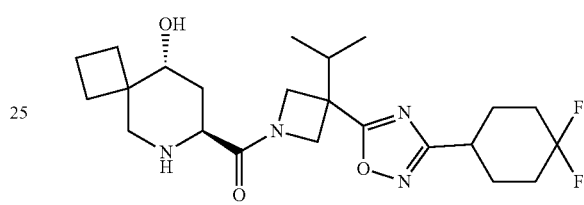

or a salt thereof.

21. The compound of claim 1 or the salt thereof, wherein the compound is

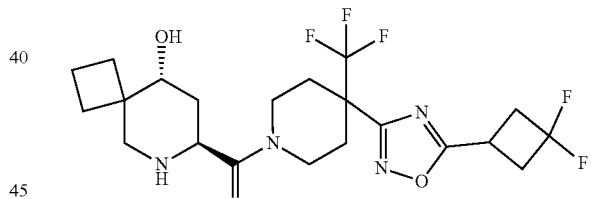

or a salt thereof.

22. The compound of claim 1 or the salt thereof, wherein the compound is

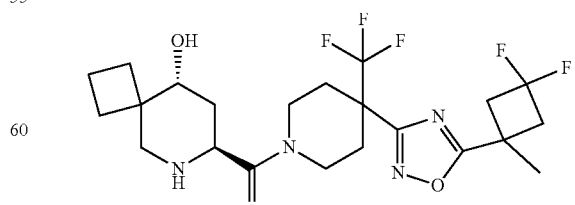

or a salt thereof.

23. The compound of claim 1 or the salt thereof, wherein the compound is

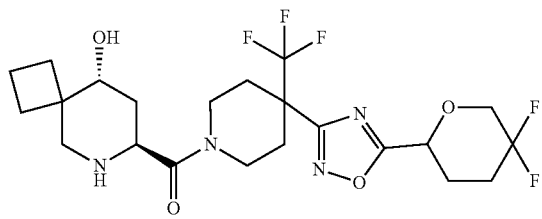 [SMILES: O=C([C@@H]1C[C@@H](O)C2(CCC2)CN1)N1CCC(c2noc(C3CCC(F)(F)CO3)n2)(C(F)(F)F)CC1]

or a salt thereof.

24. The compound of claim 1 or the salt thereof, wherein the compound is

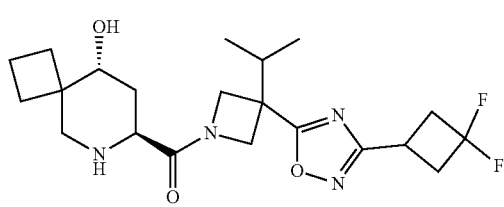 [SMILES: CC(C)C1(c2nc(C3CC(F)(F)C3)no2)CN(C(=O)[C@@H]2C[C@@H](O)C3(CCC3)CN2)C1]

or a salt thereof.

25. The compound of claim 1 or the salt thereof, wherein the compound is

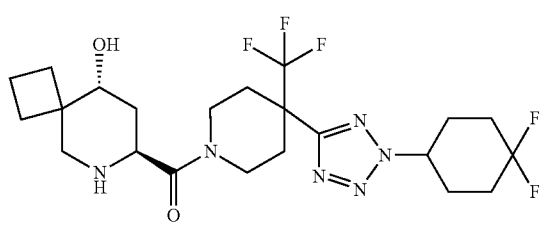 [SMILES: O=C([C@@H]1C[C@@H](O)C2(CCC2)CN1)N1CCC(c2nnn(C3CCC(F)(F)CC3)n2)(C(F)(F)F)CC1]

or a salt thereof.

26. The compound of claim 1 or the salt thereof, wherein the compound is

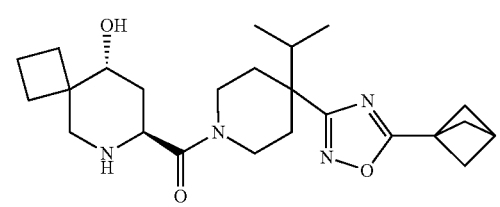 [SMILES: CC(C)C1(c2noc(C34CC(C3)C4)n2)CCN(C(=O)[C@@H]2C[C@@H](O)C3(CCC3)CN2)CC1]

or a salt thereof.

27. The compound of claim 1 or the salt thereof, wherein the compound is

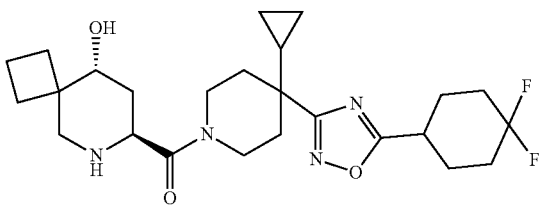 [SMILES: O=C([C@@H]1C[C@@H](O)C2(CCC2)CN1)N1CCC(c2noc(C3CCC(F)(F)CC3)n2)(C2CC2)CC1]

or a salt thereof.

28. The compound of claim 1 or the salt thereof, wherein the compound is

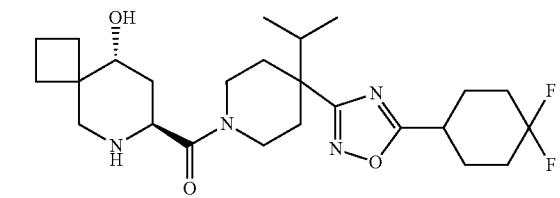 [SMILES: CC(C)C1(c2noc(C3CCC(F)(F)CC3)n2)CCN(C(=O)[C@@H]2C[C@@H](O)C3(CCC3)CN2)CC1]

or a salt thereof.

29. The compound of claim 1 or the salt thereof, wherein the compound is

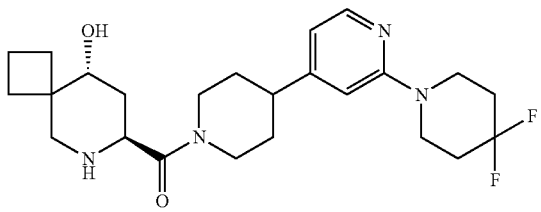 [SMILES: O=C([C@@H]1C[C@@H](O)C2(CCC2)CN1)N1CCC(c2ccnc(N3CCC(F)(F)CC3)c2)CC1]

or a salt thereof.

30. The compound of claim 1 or the salt thereof, wherein the compound is

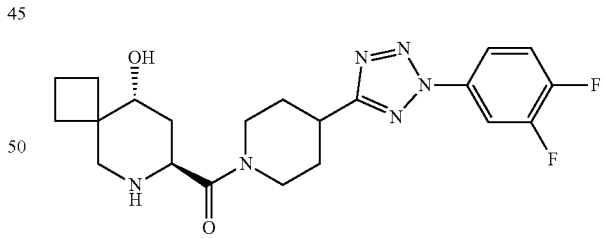

or a salt thereof.

* * * * *